US010712896B2

(12) United States Patent
Lee et al.

(10) Patent No.: US 10,712,896 B2
(45) Date of Patent: Jul. 14, 2020

(54) IMAGE DISPLAY APPARATUS AND IMAGE DISPLAY METHOD

(71) Applicant: SAMSUNG ELECTRONICS CO., LTD., Suwon-si (KR)

(72) Inventors: Jin-ha Lee, Seoul (KR); Seung-cheon Baek, Yongin-si (KR); Varun Nigam, Kanpur (IN); Jun-Seong Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 365 days.

(21) Appl. No.: 14/930,789

(22) Filed: Nov. 3, 2015

(65) Prior Publication Data
US 2016/0188156 A1 Jun. 30, 2016

(30) Foreign Application Priority Data

Dec. 26, 2014 (KR) ........................ 10-2014-0191136

(51) Int. Cl.
*G06F 3/0481* (2013.01)
*H04N 21/431* (2011.01)
*H04N 5/445* (2011.01)
*H04N 21/422* (2011.01)
*H04N 5/44* (2011.01)
*G06F 3/0482* (2013.01)

(52) U.S. Cl.
CPC ........ *G06F 3/04812* (2013.01); *G06F 3/0482* (2013.01); *H04N 5/4403* (2013.01); *H04N 5/44582* (2013.01); *H04N 21/42204* (2013.01); *H04N 21/4316* (2013.01); *H04N 2005/4428* (2013.01)

(58) Field of Classification Search
None
See application file for complete search history.

(56) References Cited

U.S. PATENT DOCUMENTS 5,677,708 A 10/1997 Matthews, III et al.
5,736,974 A 4/1998 Selker
(Continued)

FOREIGN PATENT DOCUMENTS

CN 1425151 A 6/2003
EP 1435619 A2 7/2004
(Continued)

OTHER PUBLICATIONS

International Search Report and Written Opinion, issued by International Searching Authority in corresponding International Application No. PCT/KR2015/011409, dated Feb. 4, 2016. (PCT/ISA/220, PCT/ISA/210 & PCT/ISA/237).

(Continued)

*Primary Examiner* — Christopher J Fibbi
(74) *Attorney, Agent, or Firm* — Sughrue Mion, PLLC

(57) ABSTRACT

According to an aspect of an exemplary embodiment, an image display method may include displaying, on a display, an item list including a plurality of items and a cursor; detecting a user input for moving the cursor; and moving the cursor based on the user input and changing a property of at least one item of the plurality of items included in the item list based on a spatial relationship between the at least one item and the cursor.

28 Claims, 36 Drawing Sheets

(56) References Cited

U.S. PATENT DOCUMENTS

| | | | | |
|---|---|---|---|---|
| 6,118,493 | A | * | 9/2000 | Duhault ............ H04N 5/44591 |
| | | | | 348/563 |
| 7,434,177 | B1 | | 10/2008 | Ording et al. |
| 7,526,738 | B2 | | 4/2009 | Ording et al. |
| 8,156,526 | B2 | * | 4/2012 | Lee ................... H04N 5/44543 |
| | | | | 725/40 |
| 8,176,434 | B2 | | 5/2012 | Saul et al. |
| 8,640,044 | B2 | | 1/2014 | Ording et al. |
| 8,745,535 | B2 | | 6/2014 | Chaudhri et al. |
| 9,405,446 | B1 | * | 8/2016 | Haitani ............... G06F 3/04842 |
| 2008/0104544 | A1 | | 5/2008 | Collins et al. |
| 2009/0064225 | A1 | | 3/2009 | Lee |
| 2009/0153389 | A1 | | 6/2009 | Kerr et al. |
| 2010/0053473 | A1 | * | 3/2010 | Wang .................... G03B 21/00 |
| | | | | 348/744 |
| 2010/0277337 | A1 | | 11/2010 | Brodersen et al. |
| 2011/0083148 | A1 | | 4/2011 | Sakaguchi et al. |
| 2011/0107220 | A1 | | 5/2011 | Perlman |
| 2011/0310123 | A1 | * | 12/2011 | Matsubara ......... H04N 5/44582 |
| | | | | 345/634 |
| 2012/0317513 | A1 | | 12/2012 | Mochizuki et al. |
| 2014/0123161 | A1 | | 5/2014 | van Coppenolle et al. |
| 2014/0143723 | A1 | * | 5/2014 | Ording ................ G06F 3/04842 |
| | | | | 715/823 |
| 2014/0201672 | A1 | * | 7/2014 | Borzello ............... G06F 3/0482 |
| | | | | 715/779 |
| 2014/0245336 | A1 | | 8/2014 | Lewis, II et al. |
| 2014/0362294 | A1 | * | 12/2014 | Majid ................... H04N 5/445 |
| | | | | 348/564 |

FOREIGN PATENT DOCUMENTS

| | | | | |
|---|---|---|---|---|
| EP | 1694037 | A1 | * | 8/2006 ........ H04M 1/72544 |
| EP | 1694037 | A1 | * | 8/2006 ........ H04M 1/72544 |
| EP | 2259576 | A1 | | 12/2010 |
| EP | 2704032 | A2 | | 3/2014 |
| EP | 3 032 839 | A1 | | 6/2016 |
| KR | 10-0209841 | B1 | | 7/1999 |
| RU | 2491609 | C2 | | 8/2013 |

OTHER PUBLICATIONS

Communication dated Feb. 16, 2016, from the European Patent Office in counterpart European Application No. 15200678.9.

Communication dated Mar. 3, 2016, from the European Patent Office in counterpart European Application No. 15200678.9.

Communication dated Feb. 15, 2017 by the European Patent Office in European Patent Application No. 15200678.9.

"Image Flipping Display Effect by Hovering JS Mouse thereon", http://down.admin5.com/texiao/107519.html, Source Code, Feb. 8, 2014. (2 pages total).

Communication dated Apr. 20, 2018 by the European Patent Office in counterpart European Patent Application No. 18155592.1.

Communication dated Apr. 25, 2018 by the State Intellectual Property Office of P.R. China in counterpart Chinese Patent Application No. 201510983197.X.

Communication dated Dec. 6, 2018, issued by the State Intellectual Property Office of P.R. China in counterpart Chinese Application No. 201510983197.X.

Communication dated Jan. 28, 2019, issued by the Federal Institute of Industrial Property of Russian Federation in counterpart Russian Application No. 2017126614.

Search Report dated Jan. 28, 2019, issued by the Federal Institute of Industrial Property of Russian Federation in counterpart Russian Application No. 2017126614.

Office Action dated Mar. 5, 2019 by the State Intellectual Property Office of P.R. China in counterpart Chinese Patent Application No. 201510983197.X.

* cited by examiner

FIG. 7

| transH | Meaning |
|---|---|
| −1.0 | i) When a first item from among the plurality of items is located on the left side of the highlighted item and is not adjacent to the highlighted item<br>ii) When the first item from among the plurality of items is located on the left side of and a current cursor is located at a center line of the highlighted item or located on the right side of the center line of the highlighted item |
| −1.0 ~ −0.5 | When a second item from among the plurality of items is located on the left side of the highlighted item and the current cursor is located between the center line of the highlighted item and a center line of the second item (i.e., on the left side of the center line of the highlighted item) |
| −0.5 ~ 0.5 | When a third item from among the plurality of items is the highlighted item<br>   i) When the cursor is located on a center line of the third item<br>   ii) When the cursor is located on the left side of the center line of the third item<br>   iii) When the cursor is located on the right side of the center line of the third item |
| 0.5 ~ 1.0 | When a fourth item from among the plurality of items is located on the right side of the highlighted item and the cursor is located between the center line of the highlighted item and a center line of the fourth item (i.e., on the right side of the center line of the highlighted item) |
| 1.0 | i) When a fifth item from among the plurality of items is located on the right side of the highlighted item and is not adjacent to the highlighted item<br>ii) When the fifth item from among the plurality of items is located on the right side of the highlighted item and a current cursor is located at a center line of the highlighted item or located on the left side of the center line of the highlighted item |

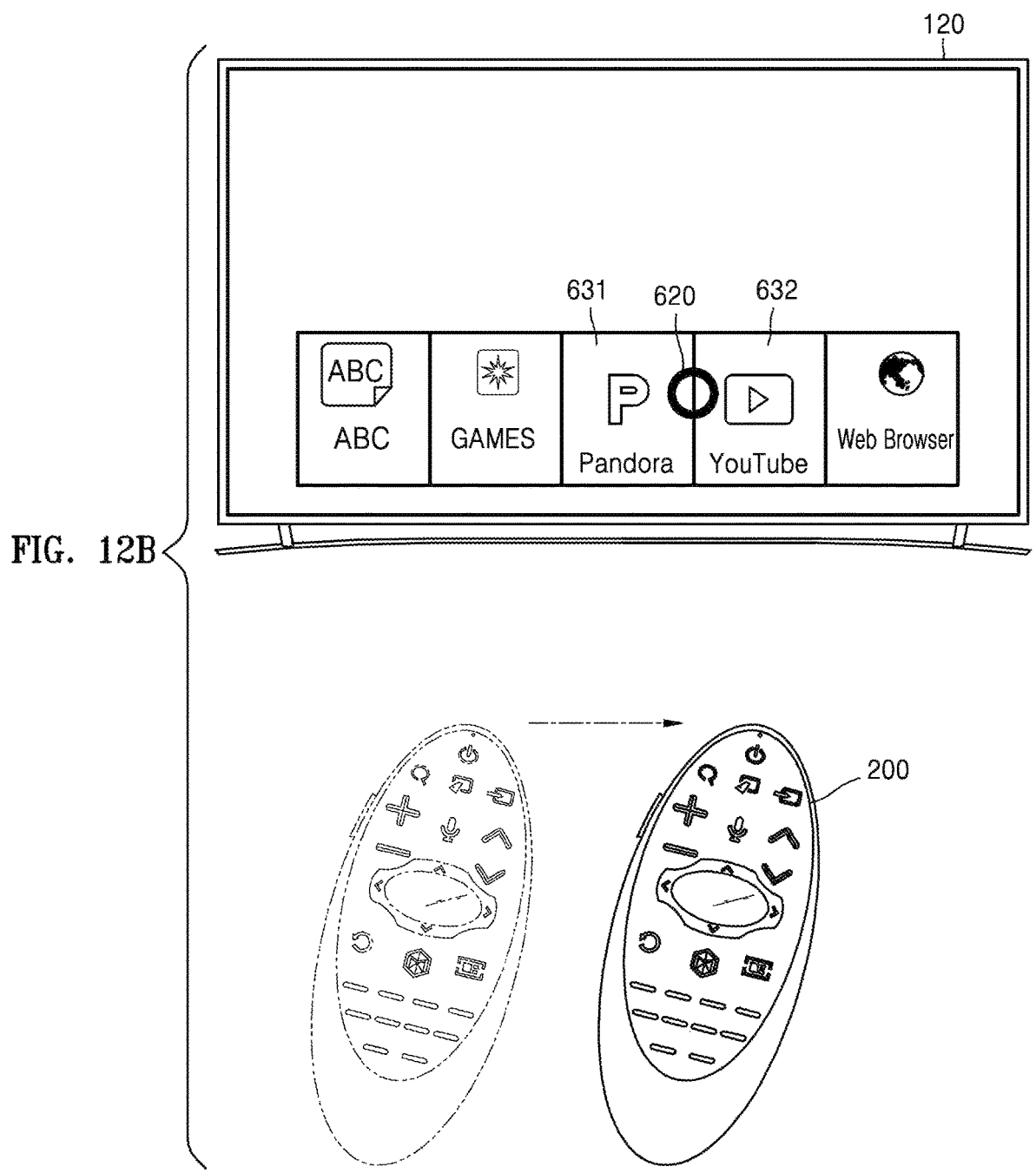

FIG. 15

| Property strain | Meaning |
|---|---|
| 0.0 | When the cursor is located on the deactivation area |
| 0.0 ~ 1.0 | When the cursor is located on the second area included in the activation area |
| 1.0 | When the cursor is located on the first area included in the activation area |

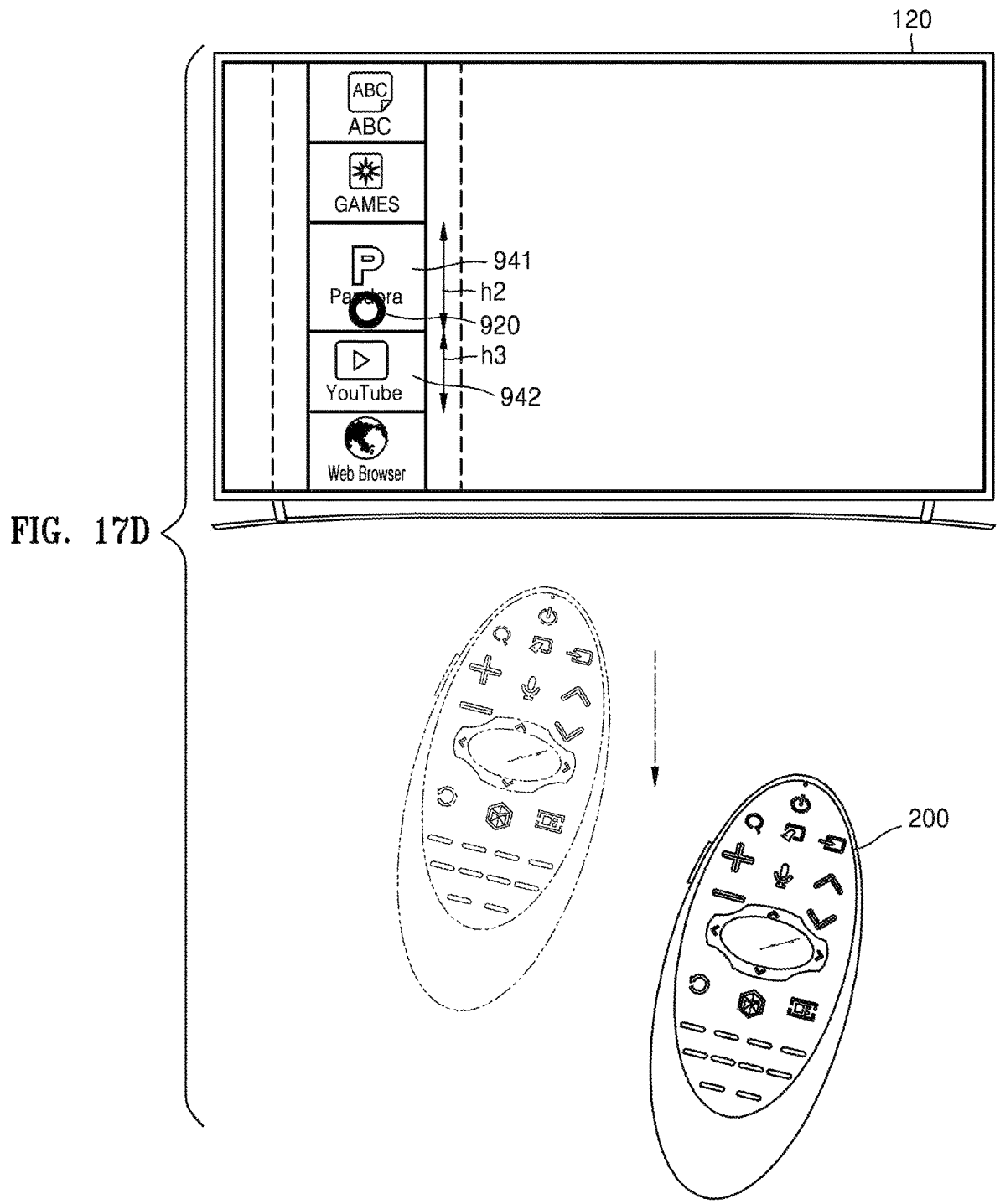

IMAGE DISPLAY APPARATUS AND IMAGE DISPLAY METHOD

CROSS-REFERENCE TO RELATED PATENT APPLICATION

This application claims priority from Korean Patent Application No. 10-2014-0191136, filed on Dec. 26, 2014, in the Korean Intellectual Property Office, the disclosure of which is incorporated herein in its entirety by reference.

BACKGROUND

1. Field

One or more exemplary embodiments relate to an image display apparatus and an image display method, and more particularly, to an image display apparatus and an image display method which display an image by changing properties of a highlighted item and items near the highlighted item from an item list that includes a plurality of items.

2. Description of the Related Art

Image display apparatuses may display an image that can be viewed by users. Users can view a broadcast via an image display apparatus. Image display apparatuses display, on a display included therein, a broadcast selected by a user from among broadcasting signals transmitted by a broadcasting station. Currently, most countries around the world have switched from analog broadcasting to digital broadcasting.

In digital broadcasting, a digital image signal and a digital audio signal are transmitted. When compared to analog broadcasting, digital broadcasting is resilient against external noise, thus having little data loss, and is favorable to error correction, and provides high-resolution and high-definition screen images. In addition, digital broadcasting can provide a bidirectional service, in contrast with analog broadcasting.

Smart TVs providing various types of content in addition to a digital broadcasting function have been recently provided. Smart TVs aim to analyze and provide user needs without manipulations of a user instead of being manually operated according to a selection of a user.

SUMMARY

One or more exemplary embodiments include an image display apparatus and method capable of consecutively changing properties of items included in an item list and displaying the items according to a location relationship between the items and a cursor.

Additional aspects will be set forth in part in the description which follows and, in part, will be apparent from the description, or may be learned by practice of the presented exemplary embodiments.

According to an aspect of an exemplary embodiment, an image display method may be provided. The method may include displaying, on a display, an item list including a plurality of items and a cursor; detecting a user input for moving the cursor; and moving the cursor based on the user input and changing a property of at least one item of the plurality of items included in the item list based on a spatial relationship between the at least one item and the cursor.

The changing the property of the at least one item may include continuously changing the property of the at least one item according to a changing distance between the at least one item and the cursor.

The changing the property of the at least one item may include changing a property of at least one of a first item and a second item adjacent to the first item from among the plurality of items, when the cursor is located on the first item.

The changing the property of the at least one item may include changing at least one of a size of the at least one item, a width of the at least one item, a height of the at least one item, an image of the at least one item, an opacity of the image of the at least one item, and a location of content included in the at least one item.

The changing the property of the at least one item may include, when the cursor is located on a center line of the at least one item, changing a width of the at least one item to a maximum width; and when the cursor is moved from the center line, continuously decreasing the width of the at least one item as the cursor moves farther from the center line.

The changing the property of the at least one item may include when the cursor is located at a center line of a first item of the plurality of items, changing a width of the first item to a maximum width, when the cursor is moved from the center line of the first item to a center line of a second item of the plurality of items that is adjacent to the first item, continuously decreasing the width of the first item as the cursor moves farther from the center line, and when the cursor is located at the center line of the second item, changing the width of the first item to a minimum width.

The changing the property of the at least one item may include when the cursor is located at the center line of the first item, changing a width of the second item to the minimum width; when the cursor is moved from the center line of the first item to the center line of the second item, continuously increasing the width of the second item as the cursor moves from the center line of the first item to the center line of the second item; and when the cursor is located at the center line of the second item, changing the width of the second item to the maximum width.

The changing the property of the at least one item may include when the cursor is located on a center line of the at least one item, changing an opacity of a first image of the at least one item to a maximum value; and when the cursor is moved from the center line of the at least one item, continuously decreasing the opacity of the first image as the cursor moves farther from the center line.

The changing the property of the at least one item may include when the cursor is located on the center line of the at least one item, changing an opacity of a second image of the at least one item to a minimum value, and when the cursor is moved from the center line of the at least one item, continuously increasing the opacity of the second image as the cursor moves farther from the center line.

The changing of the property of the at least one item may include when the cursor is located at a center line of a first item of the plurality of items, changing an opacity of a first image of the first item to a maximum value and changing an opacity of a second image of the first item to a minimum value; and when the cursor is moved from the center line of the first item, continuously decreasing the opacity of the first image and continuously increasing the opacity of the second image as the cursor moves from the center line of the first item to a center line of a second item of the plurality of items that is adjacent to the first item, and when the cursor is located on the center line of the second item, changing the opacity of the first image to the minimum value and the opacity of the second image to the maximum value.

The changing the property of the at least one item may include when the cursor is located at the center line of the first item, changing an opacity of a third image of the second item to the minimum value and changing an opacity of a fourth image of the second item to the maximum value; and when the cursor is moved from the center line of the first item, increasing the opacity of the third image and decreasing the opacity of the fourth image as the cursor moves from the center line of the first item to the center line of the second item; and when the cursor is located on the center line of the second item, changing the opacity of the third image to the maximum value and the opacity of the fourth image to the minimum value.

The changing of the property of the at least one item may include determining whether the cursor is located in an activation area of the item list; and changing a property of the at least one item, when it is determined that the cursor is located in the activation area of the item list.

The activation area may include a first area on which the item list is displayed, and a second area on which the item list is not displayed, and the changing the property of the at least one item may include determining whether the cursor is located on the first area or the second area; and when it is determined that the cursor is located on the first area, changing the at least one item to have a first property, and when it is determined that the cursor is located on the second area, changing the at least one item to have a second property.

According to another aspect of an exemplary embodiment, a display apparatus may be provided. The display apparatus may include a display configured to display an item list including a plurality of items and a cursor; a sensor configured to detect a user input for moving the cursor; and a controller configured to control the display to move the cursor based on the user input and change a property of at least one of the plurality of items based on a spatial relationship between the at least one item and the cursor.

The controller may be configured to continuously change the property of the at least one item according to a changing distance between the at least one item and the cursor.

The controller may be configured to change a property of at least one of a first item and a second item of the plurality of items adjacent to the first item, when the cursor is located on the first item.

The controller may be configured to change at least one of a size of the at least one item, a width of the at least one item, a height of the at least one item, an image of the at least one item, an opacity of the image of the at least one item, and a location of content included in the at least one item.

When the cursor is located on a center line of the at least one item, the controller may be configured to change a width of the at least one item to a maximum width; and when the cursor is moved from the center line of the at least one item, the controller may be configured to continuously decrease the width of the at least one item as the cursor moves farther from the center line.

When the cursor is located at the center line of a first item of the plurality of items, the controller may be configured to change a width of the first item to a maximum width; when the cursor is moved from the center line of the first item to a center line of a second item of the plurality of items that is adjacent to the first item, the controller may be configured to continuously decrease the width of the first item as the cursor moves farther from the center line; and when the cursor is located at the center line of the second item, the controller may be configured to change the width of the first item to a minimum width.

When the cursor is located at the center line of the first item, the controller may be configured to change a width of the second item to the minimum width; when the cursor is moved from the center line of the first item to the center line of the second item, the controller may be configured to continuously increase the width of the second item as the cursor moves from the center line of the first item to the center line of the second item; and when the cursor is located at the center line of the second item, the controller may be configured to change the width of the second item to the maximum width.

When the cursor is located on a center line of the at least one item, the controller may be configured to change an opacity of a first image of the at least one item to a maximum value; and when the cursor is moved from the center line of the at least one item the controller is configured to continuously decrease the opacity of the first image as the cursor moves farther from the center line.

When the cursor is located on a center line of the at least one item, the controller may be configured to change an opacity of a second image of the at least one item to the minimum value, and when the cursor is moved from the center line of the at least one item, the controller is configured to continuously increase the opacity of the second image as the cursor moves farther from the center line.

When the cursor is located at a center line of a first item of the plurality of items, the controller may be configured to change an opacity of a first image of the first item to a maximum value and change an opacity of a second image of the first item to a minimum value, and when the cursor is moved from the center line of a first item, the controller may be configured to continuously decrease the opacity of the first image and continuously increase the opacity of the second image as the cursor moves from the center line of the first item to a center line of a second item adjacent to the first item; and when the cursor is located on the center line of the second item, the controller is configured to change the opacity of the first image to the minimum value and the opacity of the second image to the maximum value.

When the cursor is located at the center line of the first item, the controller may be configured to change an opacity of a third image of the second item to the minimum value and changes an opacity of a fourth image of the second item to the maximum value; and when the cursor is moved from the center line of the first item to the center line of the second item, the controller may be configured to increase the opacity of the third image and decrease the opacity of the fourth image as the cursor moves from the center line of the first item to the center line of the second item; and when the cursor is located on the center line of the second item, the controller may be configured to change the opacity of the third image to the maximum value and the opacity of the fourth image to the minimum value.

The controller may be configured to determine whether the cursor is located on an activation area of the item list and change a property of the at least one item when it is determined that the cursor is located in the activation area of the item list.

The activation area may include a first area on which the item list is displayed, and a second area on which the item list is not displayed, and the controller may be configured to determine whether the cursor is located on the first area or the second area, change the at least one item to have a first property when it is determined that the cursor is located on the first area, and change the at least one item to have a second property when it is determined that the cursor is located on the second area.

According to another aspect of an exemplary embodiment, a method for displaying an item list may be provided. The method may include displaying, on a display, an item list including a plurality of items, the plurality of items including a first item having a first item location and a first item parameter, and a second item having a second item location and a second item parameter; displaying, on the display, a cursor at a cursor location; receiving user input related to the cursor; changing the cursor location in response to the user input; determining a first distance between the cursor location and the first item location or determining a second distance between the cursor location and the second item location; and modifying the first parameter and the second parameter based on at least one of the first distance and the second distance.

Modifying the first parameter and the second parameter based on at least one of the first distance and the second distance may include modifying the first parameter in proportion to the first distance and the second parameter in proportion to the second distance.

The first parameter may be a first width of the first item, and the second parameter may be a second width of the second item.

Modifying the first parameter and the second parameter based on at least one of the first distance and the second distance may include continuously increasing the first width when the first distance increases and continuously decreasing the first width when the first distance decreases; and continuously increasing the second width when the second distance increases and continuously decreasing the second width when the second distance decreases.

BRIEF DESCRIPTION OF THE DRAWINGS

These and/or other aspects will become apparent and more readily appreciated from the following description of the exemplary embodiments, taken in conjunction with the accompanying drawings in which:

FIG. 7 is a table for explaining a first parameter transH which is used to consecutively change a property of an item, according to an exemplary embodiment;

FIGS. 12A-12C illustrate an example in which positions of pieces of content included in a plurality of items are changed as a cursor moves, according to an exemplary embodiment;

FIG. 15 is a table for explaining a second parameter which is used to change the properties of items, according to an exemplary embodiment;

FIGS. 17A-17G illustrate an example in which heights of a plurality of items are changed as a cursor moves, according to an exemplary embodiment;

DETAILED DESCRIPTION

Figure 1:
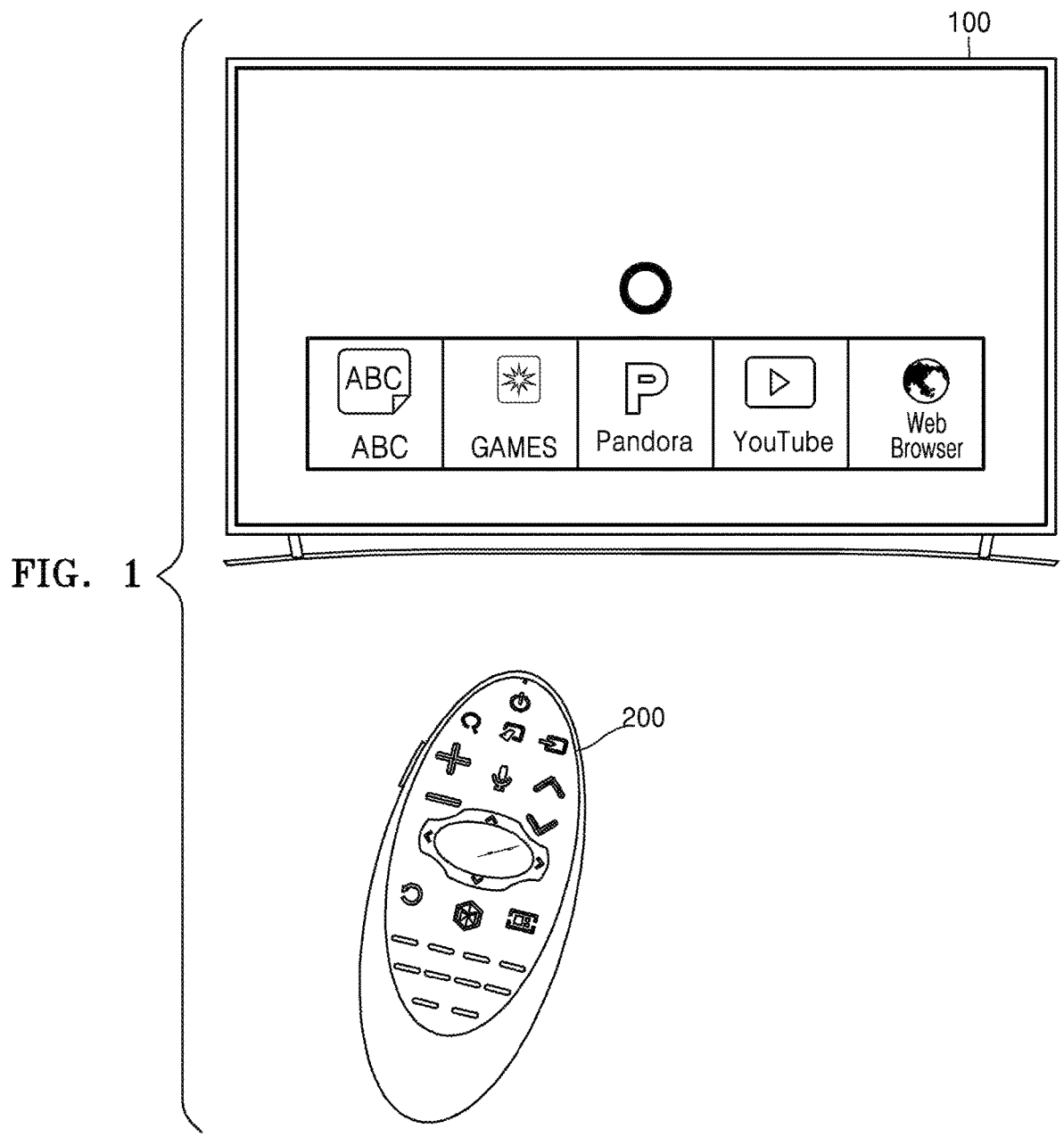
FIG. 1 illustrates an image display apparatus and a control apparatus according to an exemplary embodiment.

Reference will now be made in detail to exemplary embodiments, examples of which are illustrated in the accompanying drawings, wherein like reference numerals refer to the like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Hereinafter, the terms used in the specification will be briefly described, and then the exemplary embodiments will be described in detail.

Although general terms widely used at present were selected for describing the exemplary embodiments in consideration of the functions thereof, these general terms may vary according to intentions of one of ordinary skill in the art, case precedents, the advent of new technologies, and the like. Terms arbitrarily selected by the applicant may also be used in a specific case. In this case, their meanings need to be given in the detailed description. Hence, the terms must be defined based on their meanings and the content of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

Expressions such as "at least one of" do not necessarily modify an entirety of a following list and do not necessarily modify each member of the list, such that "at least one of a, b, and c" should be understood as including only one of a, only one of b, only one of c, or any combination of a, b, and c.

Exemplary embodiments are described in detail herein with reference to the accompanying drawings so that this disclosure may be easily performed by one of ordinary skill in the art. The exemplary embodiments may, however, be embodied in many different forms and should not be construed as being limited to the exemplary embodiments set forth herein. In the drawings, parts irrelevant to the description are omitted for simplicity of explanation, and like numbers refer to like elements throughout.

FIG. 1 illustrates an image display apparatus 100 and a control apparatus 200 according to an exemplary embodiment.

As shown in FIG. 1, the image display apparatus 100 may be a TV, but is not limited thereto. The image display apparatus 100 may be an electronic device including a display. For example, the image display apparatus 100 may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. In particular, exemplary embodiments of the image display apparatus 100 may be easily implemented in a display apparatus having a large display such as a TV. However, the exemplary embodiments are not limited thereto. The image display apparatus 100 may be fixed or movable, or a digital broadcast receiver.

The image display apparatus 100 may be implemented by using not only a flat display apparatus but also a curved display apparatus having a curvature or a flexible display apparatus with an adjustable curvature. An output resolution of the display apparatus 100 may be, for example, a high definition (HD), a full HD, an ultra HD, or a resolution that is clearer than an ultra HD.

The control apparatus 200 may be any of various types of devices for controlling the image display apparatus 100, such as a remote controller or a mobile phone.

The control apparatus 200 may control the image display apparatus 100 via short-range communication including infrared or Bluetooth. The control apparatus 200 may control a function of the display apparatus 100 by using at least one selected from keys (including buttons) included in the control apparatus 200, a touch pad, a microphone capable of receiving voices of users, and a sensor capable of recognizing motions of the control apparatus 200.

The control apparatus 200 includes a power on/off button for turning on or off the image display apparatus 100. The control apparatus 200 may change a channel of the image display apparatus 100, adjust the volume of the image display apparatus 100, select terrestrial broadcasting/cable broadcasting/satellite broadcasting of the image display apparatus 100, or perform setting of the display apparatus 100, according to a user input.

Alternatively, the control apparatus 200 may be a pointing device. For example, when the control apparatus 200 receives a certain key input, the control apparatus 200 may function as a pointer.

The image display apparatus 100 may be controlled by a user input for moving the control apparatus 200 upward, downward, leftward, or rightward, or tilting the control apparatus 200 in any random direction. Information about a motion of the control apparatus 200 that is sensed via the sensor of the control apparatus 200 may be transmitted to the image display apparatus 100. The image display apparatus 100 may calculate coordinates of a cursor on the display based on the motion information of the control apparatus 200, and move the cursor according to the calculated coordinates. Accordingly, the cursor on the display of the image display apparatus 100 may be moved or various menus displayed on the display of the image display apparatus 100 may be activated.

When the control apparatus 200 includes a touchpad, according to a displacement value of a subject moving on the touchpad, for example, a user's finger, the cursor on the display of the image display apparatus 100 may be moved or various menus displayed on the display of the image display apparatus 100 may be selectively activated.

The term "user" used herein denotes a person who controls a function or operation of the image display apparatus 100 by using the control apparatus 200. Examples of the user may include a viewer, a manager, or an installation engineer.

According to an exemplary embodiment, the image display apparatus 100 may display, on the display, an item list including a plurality of items and a cursor that indicates a location of a user input.

The image display apparatus 100 may move the cursor according to an input received via the control apparatus 200, and consecutively change a property of at least one item from among a plurality of items based on a location relationship between the at least one item and the cursor. Throughout this description, consecutively change may mean, for example, continuously increasing or continuously decreasing, or any other type of change in a continuous manner.

Figure 2:
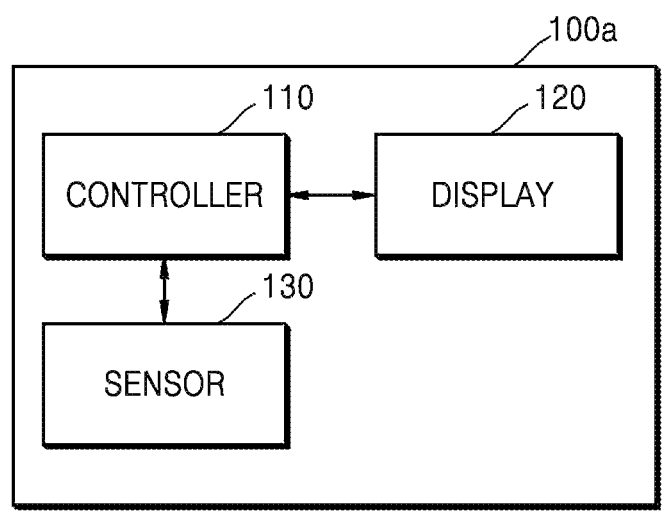
FIG. 2 is a block diagram of a structure of an image display apparatus according to an exemplary embodiment.

FIG. 2 is a block diagram of a structure of an image display apparatus 100a according to an exemplary embodiment. The image display apparatus 100a of FIG. 2 may be an exemplary embodiment of the image display apparatus 100 of FIG. 1.

Referring to FIG. 2, the image display apparatus 100a may include a controller 110, a display 120, and a sensor 130.

The display 120 may generate a driving signal by converting an image signal, a data signal, an on-screen display (OSD) signal, and a control signal that are processed by the controller 110. The display 120 may be a plasma display panel (PDP), a liquid-crystal display (LCD), an organic light-emitting device (OLED), a flexible display, or a 3-dimensional (3D) display. The display 120 may be configured as a touch screen, and thus may serve as an input device as well as an output device.

According to an exemplary embodiment, the display 120 may display an item list that includes a plurality of items. The display 120 may also display a cursor that indicates a location of a user input on the display 120.

The sensor 130 may sense a user input and transmit a signal corresponding to the sensed user input to the controller 110. Examples of the user input received from the control apparatus 200 and sensed by the sensor 130 may include turning power on/off, selecting channels, raising and lowering channels, and setting a screen. The sensor 130 may also sense a user input for moving the cursor displayed on the display 120.

The controller 110 may process an image signal and transmit the processed image signal to the display 120. Accordingly, an image corresponding to the processed image signal may be displayed on the display 120. The controller 110 may control the image display apparatus 100a via a user command detected by the sensor 130 or an internal program.

According to an exemplary embodiment, the controller 110 may move the cursor displayed on the display 120 according to the detected user input. The controller 110 may change a property of an item according to a location relationship between the item and the cursor according to an exemplary embodiment.

Based on a distance between the item and the cursor, the controller 110 may consecutively change the property of the item. According to the location relationship between the item and the cursor, the controller 110 may change at least one of a size of the item, a width thereof, a height thereof, an image thereof, an opacity of the image thereof, and a location of content included in the item.

When the cursor is located at the center of the item, the controller 110 may maximize a width of the item. When the cursor is moved away from the center of the item, the controller 110 may consecutively decrease the width of the item.

When the cursor is located at the center of a first item, the controller 110 may maximize a width of the first item. When the cursor is moved from the center of the first item to the center of a second item that is adjacent to the first item, the controller 110 may consecutively decrease the width of the first item. When the cursor is located at the center of the second item, the controller 110 may minimize the width of the first item.

When the cursor is located at the center of the first item, the controller 110 may minimize a width of the second item. When the cursor is moved from the center of the first item to the center of a second item that is adjacent to the first item, the controller 110 may consecutively increase the width of the second item. When the cursor is located at the center of the second item, the controller 110 may maximize the width of the second item.

In other exemplary embodiments, when the cursor is located at the center of the item, the controller 110 may maximize an opacity of a first image of the item. When the cursor is moved away from the center of the item, the controller 110 may consecutively decrease the opacity of the first image.

When the cursor is located at the center of the item, the controller 110 may minimize an opacity of a second image of the item. When the cursor is moved away from the center of the item, the controller 110 may consecutively increase the opacity of the second image.

When the cursor is located at the center of the first item from among the plurality of items, the controller 110 may maximize an opacity of a first image of the first item and minimize an opacity of a second image of the first item. When the cursor is moved from the center of the first item to the center of the second item that is adjacent to the first item, the controller 110 may consecutively decrease the opacity of the first image and consecutively increase the opacity of the second image. When the cursor is located at the center of the second item, the controller 110 may minimize the opacity of the first image and maximize the opacity of the second image.

When the cursor is located at the center of the first item, the controller 110 may minimize an opacity of a third image of the second item, which is adjacent to the first item, and maximize an opacity of a fourth image of the second item. When the cursor is moved from the center of the first item to the center of the second item, the controller 110 may increase the opacity of the third image and decrease the opacity of the fourth image. When the cursor is located at the center of the second item, the controller 110 may maximize the opacity of the third image and minimize the opacity of the fourth image.

The controller 110 may determine whether the cursor is located at an activation area of the item list. When the cursor is located at the activation area of the item list, the controller 110 may change a property of at least one item included in the item list. The activation area may include a first area on which the item list is displayed, and a second area on which the item list is not displayed. The controller 110 determines whether the cursor is located on the first area or the second area. When the controller 110 determines that the cursor is located on the first area, the controller 110 may change the at least one item to have a first property. When the controller 110 determines that the cursor is located on the second area, the controller 110 may change the at least one item to have a second property.

Figure 3:
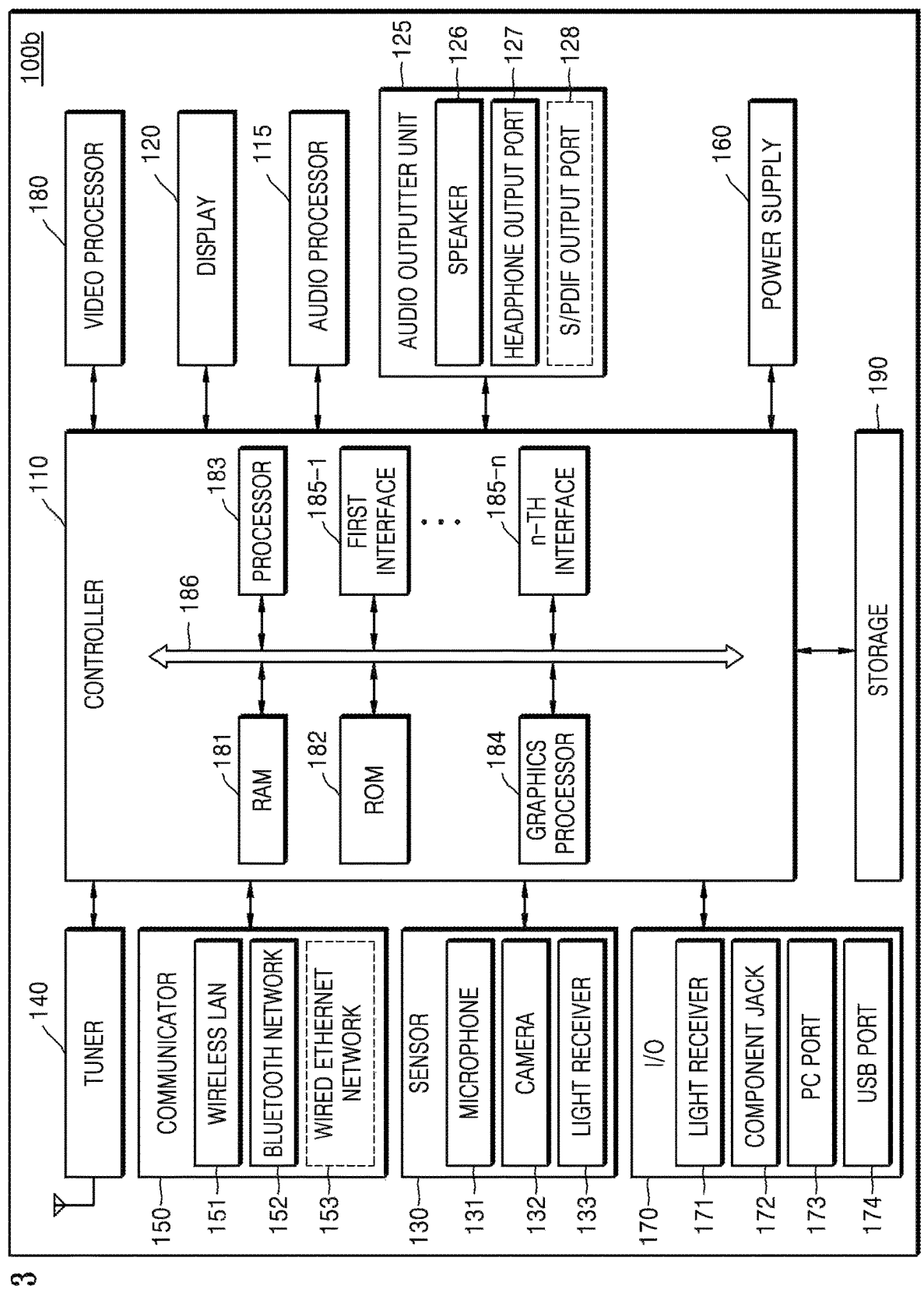
FIG. 3 is a block diagram of a structure of an image display apparatus according to an exemplary embodiment.

FIG. 3 is a block diagram of a structure of an image display apparatus 100*b* according to an exemplary embodiment. The image display apparatus 100*b* of FIG. 3 may be an exemplary embodiment of the image display apparatus 100 of FIG. 1.

Referring to FIG. 3, the display apparatus 100*b* may further include a video processor 180, an audio processor 115, an audio outputter 125, a power supply 160, a tuner 140, a communicator 150, an inputter/outputter (I/O) 170, and a storage 190, in addition to the controller 110, the display 120, and the sensor 130.

With regard to the controller 110, the display 120, and the sensor 130, elements and features as described with reference to FIG. 2 will not be repeated.

The video processor 180 processes video data that is received by the image display apparatus 100*b*. The video processor 180 may perform a variety of image processing, such as decoding, scaling, noise filtering, frame rate transformation, and resolution transformation, on video data.

The display 120 displays video included in a broadcasting signal received via the tuner 140 on the screen thereof, under the control of the controller 110. The display 120 may also display content (for example, a moving picture) that is input via the communicator 150 or the I/O 170. The display 120 may output an image stored in the storage 190 under the control of the controller 110. The display 120 may also display a voice user interface (UI) (e.g., including a voice command word guide) for performing a voice recognition task corresponding to voice recognition, or a motion UI (e.g., including a user motion guide for motion recognition) for performing a motion recognition task corresponding to motion recognition.

The audio processor 115 processes audio data. The audio processor 115 may perform a variety of processing, such as decoding, amplification, or noise filtering, on the audio data. The audio processor 115 may include a plurality of audio processing modules to process audios corresponding to a plurality of pieces of content.

The audio outputter 125 outputs audio included in a broadcasting signal received via the tuner 140, under the control of the controller 110. The audio outputter 125 may also output audio (for example, a voice or a sound) that is input via the communicator 150 or the I/O 170. The audio outputter 125 may also output audio stored in the storage 190 under the control of the controller 110. The audio outputter 125 may include at least one of a speaker 126, a headphone output port 127, and a Sony/Philips Digital Interface (S/PDIF) output port 128. The audio outputter 125 may include a combination of the speaker 126, the headphone output port 127, and the S/PDIF output port 128.

The power supply 160 supplies power that is input from an external power source, to the internal components of the image display apparatus 100*b*, under the control of the controller 110. The power supply 160 may also supply power that is output by one or more batteries located in the image display apparatus 100*b*, to the internal components of the image display apparatus 100*b*, under the control of the controller 110.

The tuner 140 may tune and select only a frequency of a channel which the image display apparatus 100*b* wants to receive from among many radio wave components that are obtained via amplification, mixing, resonance, or the like of a wired or wireless broadcasting signal. The broadcasting signal includes audio, video, and additional information (for example, an electronic program guide (EPG)).

The tuner 140 may receive a broadcasting signal in a frequency band corresponding to a channel number (e.g., cable broadcasting No. 506) according to a user input (for example, a control signal received from the control apparatus 200, e.g., a channel number input, a channel up-down input, and a channel input on an EPG screen image).

The tuner 140 may receive a broadcasting signal from various sources, such as terrestrial broadcasting, cable broadcasting, satellite broadcasting, and Internet broadcasting. The tuner 140 may also receive a broadcasting signal from a source such as analog broadcasting or digital broadcasting. The broadcasting signal received via the tuner 140 is decoded (for example, audio decoding, video decoding, or additional information decoding) and is thus divided into audio, video, and/or additional information. The audio, the video, and/or the additional information may be stored in the storage unit 190 under the control of the controller 110.

The image display apparatus 100b may include a single tuner 140 or a plurality of tuners 140. The tuner 140 may be all-in-one with the display apparatus 100, or implemented as a separate apparatus (for example, a tuner that is connected to a set-top box and the I/O 170) having a tuner that is electrically connected to the image display apparatus 100b.

The communicator 150 may connect the image display apparatus 100b to an external apparatus (for example, an audio apparatus) under the control of the controller 110. The controller 110 may transmit/receive content to/from the external apparatus connected via the communicator 150, download an application from the external apparatus, or perform web-browsing. The communicator 150 may include a wireless local area network (LAN) 151, a Bluetooth network 152, or a wired Ethernet network 153 in correspondence to a performance and a structure of the image display apparatus 100b. The communicator 150 may include a combination of the wireless LAN 151, the Bluetooth network 152, and the wired Ethernet network 153. The communicator 150 may receive a control signal of the control apparatus 200 under the control of the controller 110. The control signal may be implemented as a Bluetooth signal, a radio frequency (RF) signal, or a Wi-Fi signal.

For example, the communicator 150 may receive a signal corresponding to a Bluetooth type user input (for example, touch, pressing, a touch gesture, a voice, or a motion) from the control apparatus 200 via the Bluetooth network 152. The communicator 150 may further include short-range communication (for example, near field communication (NFC) or Bluetooth low energy (BLE)), instead of the Bluetooth network 152.

The sensor 130 senses a voice of a user, an image of the user, or an interaction with the user.

A microphone 131 receives a voice of the user. The microphone 131 may transform the received voice into an electrical signal and output the electrical signal to the controller 110. The user voice may include, for example, a voice corresponding to a menu or function of the image display apparatus 100b. A recognition range of the microphone 131 may, for example, be recommended to be within 4 m from the microphone 131 to a location of the user, and may vary in correspondence to the magnitude of the voice of the user and a surrounding environment (for example, a speaker sound or ambient noise).

According to an exemplary embodiment, the microphone 131 may receive an uttered voice or the like of a user who views the image display apparatus 100b, and output audio data corresponding to the received voice or the like to the controller 110 so that the controller 110 may use the audio data to identify the user.

The microphone 131 may be integrated with or separate from the image display apparatus 100b. The separate microphone 131 may be electrically connected to the image display apparatus 100b via the communicator 150 or the I/O unit 170.

It will be easily understood by one of ordinary skill in the art that the microphone 131 may be excluded according to the performance and structure of the image display apparatus 100b.

A camera 132 receives an image (for example, consecutive frames) corresponding to a motion of the user including a gesture within a recognition range of the camera 132. For example, the recognition range of the camera 132 may, for example, be a distance within 0.1 to 5 m from the camera 132 to the user. The motion of the user may include a part of the body of the user or a motion or the like of the part of the user, such as the face, a facial expression, the hand, the fist, and a finger of the user. The camera 132 may convert a received image into an electrical signal under the control of the controller 110 and output the electrical signal to the controller 110.

According to an exemplary embodiment, the camera 132 may photograph the face or the like of a user who views the image display apparatus 100b, and output a captured face image to the controller 110 so that the controller 110 may use the face image to identify the user.

The controller 110 may select a menu that is displayed on the image display apparatus 100b by using a result of the recognition of the received motion, or perform control corresponding to the result of the motion recognition. For example, the control may be channel adjustment, volume adjustment, indicator movement, or cursor movement.

The camera 132 may include a lens and an image sensor. The camera 132 may support optical zoom or digital zoom by using a plurality of lenses and image processing. The recognition range of the camera 132 may be variously set according to the angle of the camera 132 and surrounding environment conditions. When the camera 132 is comprised of a plurality of cameras, a three-dimensional (3D) still image or a 3D motion may be received by the plurality of cameras.

The microphone 132 may be integrated with or separate from the image display apparatus 100b. A separate device including the separate camera 132 may be electrically connected to the image display apparatus 100b via the communicator 150 or the I/O 170.

It will be easily understood by one of ordinary skill in the art that the camera 132 may be excluded according to the performance and structure of the image display apparatus 100b.

A light receiver 133 receives an optical signal (including a control signal) from the control apparatus 200 via a light window of the bezel of the display 120. The light receiver 133 may receive an optical signal corresponding to a user input (for example, touch, pressing, a touch gesture, a voice, or a motion) from the control apparatus 200. A control signal may be extracted from the received optical signal under the control of the controller 110.

The I/O 170 receives video (for example, a moving picture), audio (for example, a voice or music), and additional information (for example, an EPG from outside the image display apparatus 100b under the control of the controller 110. The I/O unit 170 may include a High-Definition Multimedia Interface (HDMI) port 171, a component jack 172, a PC port 173, or a USB port 174. The I/O 170 may include a combination of the HDMI port 171, the component jack 172, the PC port 173, and the USB port 174.

It will be easily understood by one of ordinary skill in the art that the structure and operation of the I/O unit 170 may be variously implemented according exemplary embodiments.

The controller 110 controls an overall operation of the image display apparatus 100b and signal transfer among the internal components of the image display apparatus 100b and processes data. When there is an input of a user or stored preset conditions are satisfied, the controller 110 may execute an operation system (OS) and various applications that are stored in the storage unit 190.

The controller 110 may include random-access memory (RAM) 181 that stores a signal or data input by an external source of the image display apparatus 100b or is used as a memory area for various operations performed by the image display apparatus 100b, read-only memory (ROM) 182 that stores a control program for controlling the image display apparatus 100b, and a processor 183.

The processor 183 may include a graphics processing unit for performing video graphics processing. The processor 183 may be implemented by using a System On Chip (SoC) into which a core and a GPU are incorporated. The processor 183 may include a single core processor, a dual core processor, a triple core processor, a quad core processor, or the like.

The processor 183 may include a plurality of processors. For example, the processor 183 may be implemented by using a main processor and a sub-processor operating in a sleep mode.

A graphics processor 184 generates a screen image including various objects, such as an icon, an image, and a text, by using an arithmetic unit and a rendering unit. The arithmetic unit calculates attribute values, such as a coordinate value, a shape, a size, a color, and the like, with which each object is to be displayed according to layouts of the screen image, based on the user interaction sensed by the sensor 130. The rendering unit generates screen images of various layouts including objects, based on the attribute values calculated by the arithmetic unit. The screen images generated by the rendering unit are displayed on a display area of the display 120.

First through n-th interfaces 185-1 through 185-n are connected to the above-described components of the image display apparatus 100b. One of the first through n-th interfaces 185-1 through 185-n may be a network interface that is connected to an external apparatus via a network.

The RAM 181, the ROM 182, the processor 183, the graphics processor 184, and the first through n-th interfaces 185-1 through 185-n may be connected to each other via an internal bus 186.

The term "a controller of an image display apparatus" used in the present exemplary embodiment includes the processor 183, the ROM 182, and the RAM 181.

The storage 190 may store various data, programs, or applications for driving and controlling the image display apparatus 100b under the control of the controller 110. The storage 190 may store input/output signals or data corresponding to driving of the video processor 180, the display 120, the audio processor 115, the audio outputter 125, the power supply 160, the tuner 140, the communicator 150, the sensor 130, and the I/O 170. The storage 190 may store a control program for controlling the image display apparatus 100b and the controller 180, an application initially provided by a manufacturer or downloaded from outside the display apparatus 100, a graphical user interface (GUI) associated with the application, objects (for example, an image text, an icon, and a button) for providing the GUI, user information, a document, databases, or related pieces of data.

According to an exemplary embodiment, the term "storage" may include the storage 190, the ROM 182 or the RAM 181 of the controller 110, or a memory card (e.g., a micro SD card or a USB memory) mounted in the image display apparatus 100b. The storage 190 may include a non-volatile memory, a volatile memory, a hard disk drive (HDD), or a solid state drive (SSD).

The storage 190 may include a broadcasting receiving module, a channel control module, a volume control module, a communication control module, a voice recognition module, a motion recognition module, a light receiving module, a display control module, an audio control module, an external input control module, a power control module, a power control module of a wirelessly (for example, Bluetooth) connected external apparatus, a voice database (DB), or a motion DB. These modules and the DBs of the storage 190 may be implemented as software in order to perform a broadcasting reception control function of the image display apparatus 100b, a channel control function, a volume control function thereof, a communication control function thereof, a voice recognition function thereof, a motion recognition function thereof, a light receiving control function thereof a display control function thereof, an audio control function thereof, an external input control function thereof, a power control function thereof, or a power control function of the wirelessly (for example, Bluetooth) connected external apparatus. The controller 110 may perform these functions by using the software stored in the storage unit 190.

The image display apparatus 100b having the display 120 may be electrically connected to an external apparatus (for example, a set-top box) having a tuner. For example, the image display apparatus 100b may be implemented by using an analog TV, a digital TV, a 3D TV, a smart TV, an LED TV, an OLED TV, a plasma TV, a monitor, or the like, but it will be easily understood by one of ordinary skill in the art that exemplary embodiments are not limited thereto.

The image display apparatus 100b may include a sensor (for example, an illumination sensor or a temperature sensor) for detecting an internal or external state of the image display apparatus 100b.

The block diagrams of the image display apparatuses 100a and 100b shown in FIGS. 2 and 3 are only exemplary embodiments. Components illustrated in FIGS. 2 and 3 may be combined or omitted according to the specifications of the image display apparatus 100 when being actually implemented, or additional components may be included in the block diagrams of FIGS. 2 and 3. In other words, two or more components are combined into a single component, or a single component may be divided into two or more components. A function performed in each block is only an example to explain exemplary embodiments, and a detailed operation or device of each block does not limit the scope of the exemplary embodiments.

Figure 4:
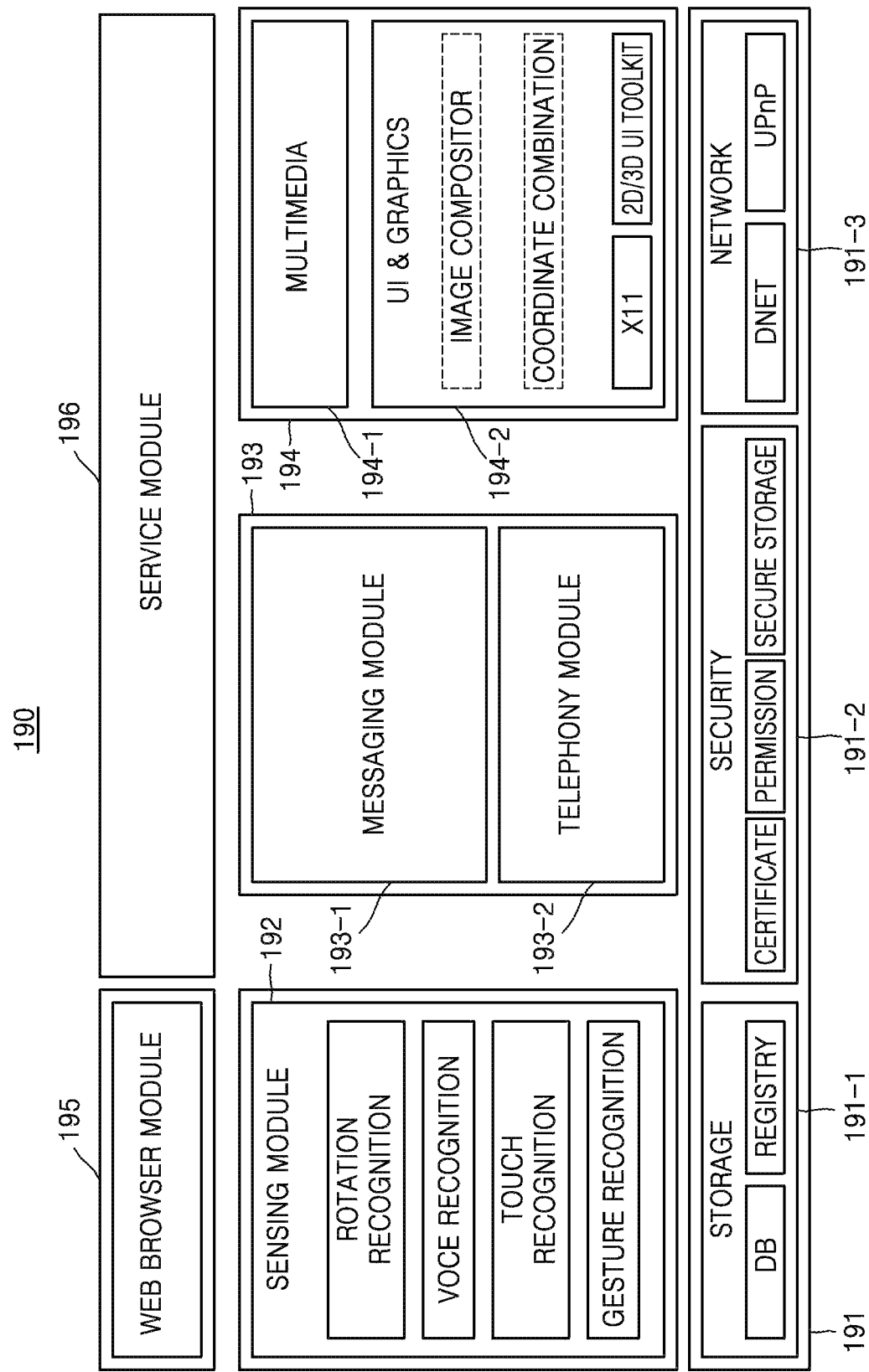
FIG. 4 is a block diagram of a software structure stored in a storage included in the image display apparatus of FIG. 3.

FIG. 4 is a block diagram of a software structure stored in the storage 190 of FIG. 3.

Referring to FIG. 4, the storage 190 may store software including a base module 191, a sensing module 192, a communication module 193, a presentation module 194, a web browser module 195, and a service module 196.

The base module 191 is a base module which processes a signal that is received from each hardware included in the image display apparatus 100 and transmits a processed signal to an upper layer module. The base module 191 includes a storage module 191-1, a security module 191-2, and a network module 191-3. The storage module 191-1 is a program module which manages a DB or a registry. The processor 183 may access the DB included in the storage unit 190 by using the storage module 191-1 and read various pieces of data from the DB. The security module 191-2 is a program module which supports certification, permission, secure storage, and the like of hardware. The network module 191-3 supports network connection, and includes a DNET module, an UPnP module, or the like.

The sensing module 192 collects information from various sensors and analyzes and manages the collected information. The sensing module 192 may include a head direction recognition module, a face recognition module, a voice recognition module, a motion recognition module, an NFC recognition module, and the like.

The communication module 193 performs communication with an external source. The communication module 193 may include a messaging module 193-1, such as a messenger program, a short message service (SMS) & multimedia message service (MMS) program, or an e-mail program, and a telephony module 193-2 including a call info aggregator program module, a VoIP module, or the like.

The presentation module 194 constructs a display screen image. The presentation module 194 includes a multimedia module 194-1 for reproducing and outputting multimedia content, and a UI rendering module 194-2 performing a UI and graphical processing. The multimedia module 194-1 may include a player module, a camcorder module, a sound processing module, and the like. Accordingly, the multimedia module 194-1 produces and reproduces a screen image and a sound by reproducing various types of multimedia content. The UI rendering module 194-2 may include an image composition module that composes an image, a coordinate combination module which combines coordinates on a screen on which an image is to be displayed, an X11 module which receives various events from hardware, and a 2-dimensional (2D)/3-dimensional (3D) UI toolkit which provides a tool for constructing a 2D or 3D UI.

The web browser module 195 accesses a web server by performing web browsing. The web browser module 195 may include various modules, such as a web view module which constructs a web page, a download agent module which performs downloading, a bookmark module, and a Webkit module.

The service module 196 includes various applications for providing various services. In detail, the service module 196 may include various program modules, such as an SNS program, a content reproduction program, a game program, an electronic book program, a calendar program, an alarm management program, and other Widgets.

FIG. 4 illustrates various program modules, but some of the illustrated program modules may be omitted or modified, or other program modules may be added to the illustrated various program modules, according to the type and characteristics of the image display apparatus 100. For example, a location-based module for supporting a location-based service by interacting with hardware, such as a global positioning system (GPS) chip, may be further included in the storage 190.

Figure 5:
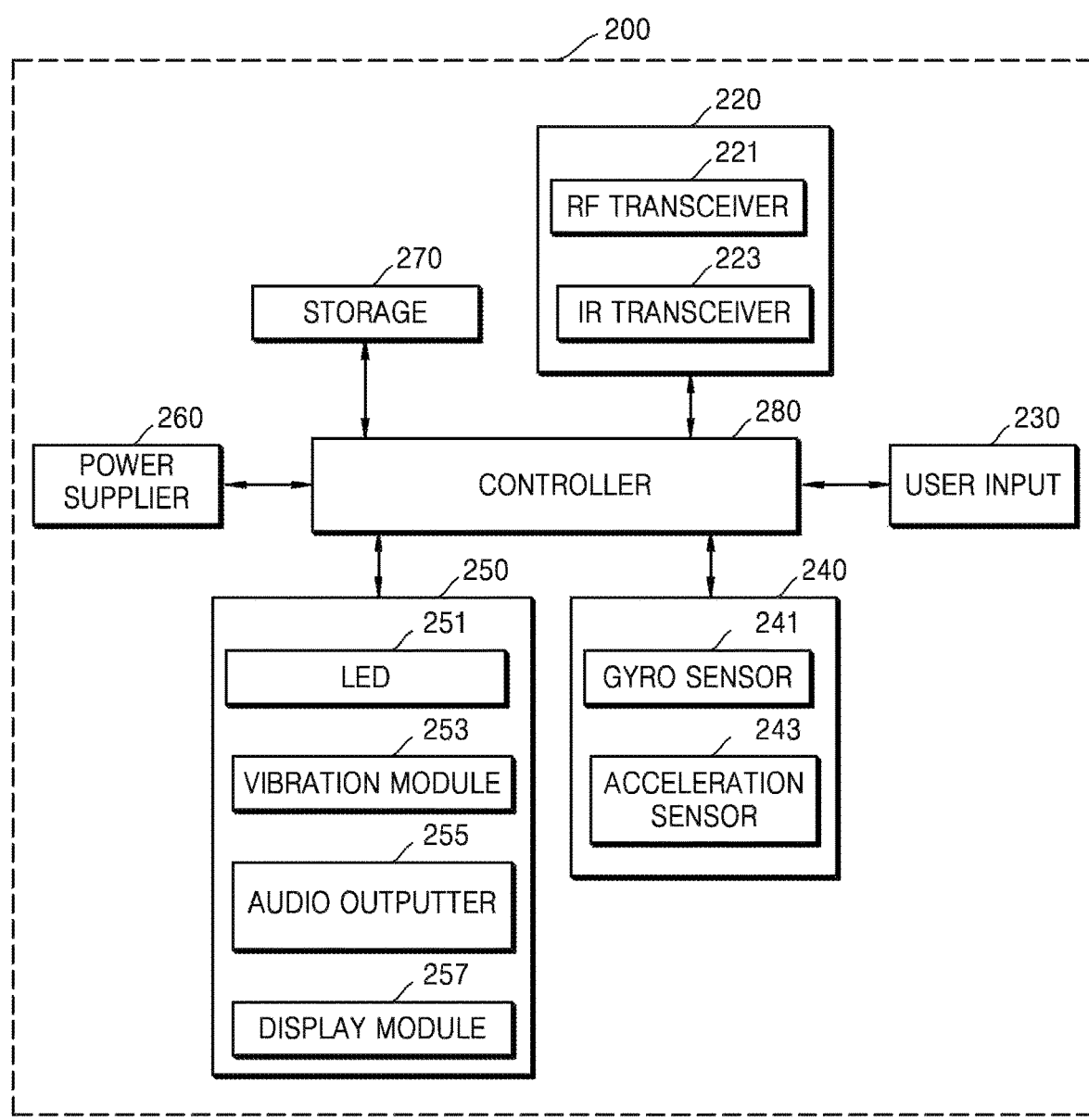
FIG. 5 is a block diagram of a control apparatus according to an exemplary embodiment.

FIG. 5 is a block diagram of a control apparatus 200 according to an exemplary embodiment.

Referring to FIG. 5, the control apparatus 200 may include a wireless communicator 220, a user input 230, a sensor 240, an outputter 250, a power supplier 260, a storage 270, and a controller 280.

The wireless communicator 220 may transmit and receive signals to and from any of the above-described image display apparatuses 100, 100a, and 100b. The wireless communicator 220 may include an RF transceiver 221 that may transmit and receive signals to and from the image display apparatus 100 according to an RF communication standard. The wireless communicator 220 may also include an IR transceiver 223 that may transmit and receive to and from the image display apparatus 100 according to an IR communication standard.

According to the present exemplary embodiment, the control apparatus 200 transmits a signal including information about motions and the like of the control apparatus 200 to the image display apparatus 100 via the RF transceiver 221.

The control apparatus 200 may receive a signal transmitted by the image display apparatus 100 via the RF transceiver 221. If necessary, the control apparatus 200 may also transmit commands for turning power on/off, changing channels, and changing the volume, to the image display apparatus 100 via the IR transceiver 223.

The user input 230 may include a keypad, buttons, a touchpad, or a touch screen. The user may manipulate the user input 230 to input commands related to the image display apparatus 100 to the control apparatus 200. When the user input 230 includes hard key buttons, the user may input the commands related to the image display apparatus 100 to the control apparatus 200 by pushing the hard key buttons. When the user input 230 includes a touch screen, the user may input the commands related to the image display apparatus 100 to the control apparatus 200 by touching soft keys on the touch screen.

For example, the user input 230 may include 4 direction buttons or 4 directional keys. The four direction buttons or four direction keys may be used to control a window, an area, an application, or an item displayed on the display 120. Four direction buttons or keys may be used to indicate up, down, left, and right movements. It will be understood by one of ordinary skill in the art that the user input 230 may include two direction keys or two direction buttons instead of four direction buttons or four direction keys.

The user input 230 may also include various types of input units that may be manipulated by the user, such as a scroll key or a jog key.

The user input 230 may also include a touchpad. The user input 230 may receive a user input for dragging, touching, or flipping via the touchpad of the control apparatus 200. The image display apparatus 100 may be controlled according to a type of received user input (for example, a direction in which a drag command is input or time when a touch command is input).

The sensor 240 may include a gyroscopic (gyro) sensor 241 or an acceleration sensor 243. The gyro sensor 241 may sense information about movements of the control apparatus 200. For example, the gyro sensor 241 may sense the information about the movements of the control apparatus 200, based on x-, y-, z-axes. The acceleration sensor 243 may sense information about movement speed of the control apparatus 200. The gyro sensor 241 may additionally include a distance estimation sensor that may sense a distance between the control apparatus 200 and the image display apparatus 100.

The outputter 250 may output an image signal or an audio signal which corresponds to a manipulation of the user input 230 or a signal received by the image display apparatus 100. The user may recognize whether the user input 230 is manipulated or whether the image display apparatus 100 is controlled, via the outputter 250.

For example, the output unit 250 may include an LED 4251, a vibration module 253, an audio outputter 255, and a display 257, which emits light, vibrates, outputs sound, and outputs an image, respectively, when the user input 230 is manipulated or a signal is transmitted to and received from the image display apparatus 100 via the wireless communicator 220.

The power supplier 260 supplies power to the control apparatus 200. The power supplier 260 may prevent excessive power consumption by not supplying power when the control apparatus 200 does not move for a predetermined period of time. The power supplier 260 may start to supply power again when a predetermined key in the control apparatus 200 is manipulated.

The storage 270 may store programs or application data necessary for control of the control apparatus 200 or an operation thereof.

The controller 280 controls overall operations related to controlling the control apparatus 200. The controller 280 may transmit a signal corresponding to a predetermined key manipulation of the user input 230 or a signal corresponding to a movement of the control apparatus 200 sensed by the sensor 240, to the image display apparatus 100 via the wireless communicator 220.

The image display apparatus 100 may include a coordinate value calculator that calculates coordinates of a cursor that corresponds to an operation of the control apparatus 200.

The coordinate value calculator may calculate coordinates (x,y) of a cursor that is to be displayed on the display 120, by correcting hand shaking or errors from the signal corresponding to the sensed movement of the control apparatus 200.

A signal transmitted by the control apparatus 200 is detected by the sensor 130 and transmitted to the controller 110 of the image display apparatus 100. The controller 110 may determine information about the operations and a key manipulation of the control apparatus 200 based on the signal transmitted by the control apparatus 200, and control the image display apparatus 100 according to the information.

As another example, the control apparatus 200 may estimate coordinates of a cursor which corresponds to an operation of the control apparatus 200 and transmit the coordinates to the image display apparatus 100. In this case, the image display apparatus 100 may transmit information about the coordinates to the controller 110 without a handshake correction or an error correction.

Figure 6:
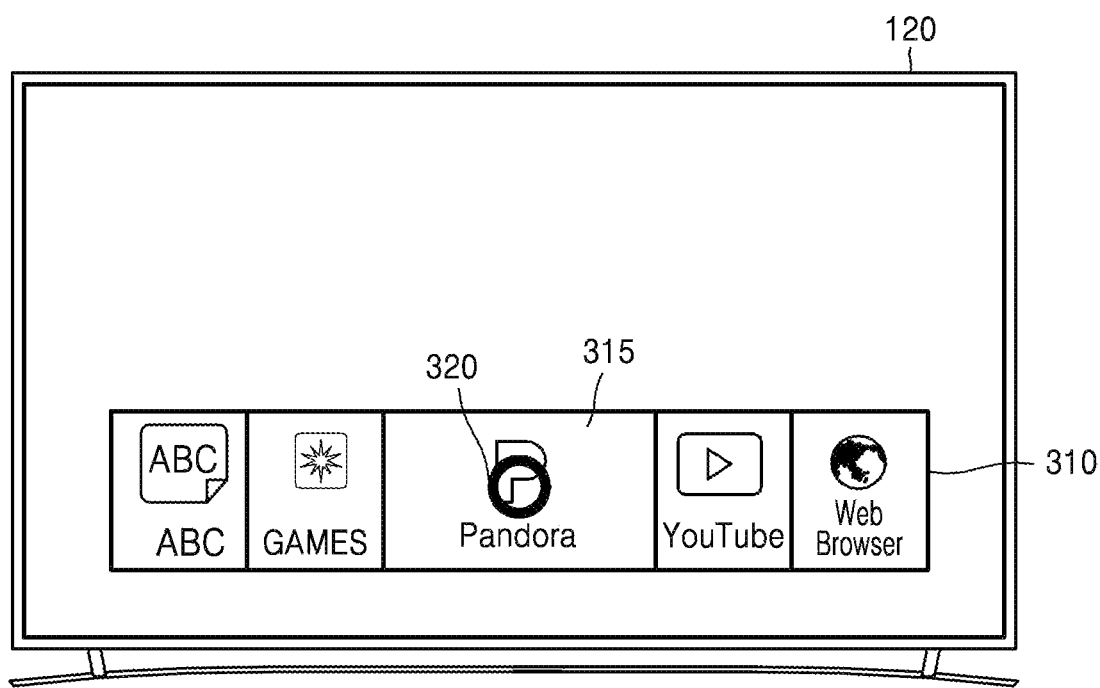
FIG. 6 illustrates an example in which an item list is displayed on a display, according to an exemplary embodiment.

FIG. 6 illustrates an example in which an item list 310 is displayed on the display 120, according to an exemplary embodiment.

Referring to FIG. 6, the display 120 may display the item list 310 including a plurality of items. For example, the display 120 may display a plurality of items that show content. An item that shows content may include an item that shows image content such as movies or dramas, an item that shows audio content such as music, an item that shows applications, an item that shows a broadcasting channel, and an item that shows history information of content executed by a user.

The plurality of items may be displayed by using images. For example, an item that shows image content corresponding to a movie or a drama may be displayed using a poster image of the movie or the drama. An item that shows audio content such as music may be displayed using a poster image of an album that includes the music. An item that shows an application may be displayed using an image representing the application or a previously executed application screen image. An item that shows a broadcasting channel may be displayed using a screen image of the broadcasting channel lastly viewed by the user or an image representing a currently broadcast program of the broadcasting channel. An item that shows history information of content executed by the user may be displayed using a previously executed screen image of the content.

The display 120 may also display an item representing an interface for connecting the image display apparatus 100 to an external apparatus, or a plurality of items representing external apparatuses connected to the image display apparatus 100. For example, the item representing an interface for connecting the image display apparatus 100 to an external apparatus may be an item resembling a port of the image display apparatus 100. For example, the plurality of items representing external apparatuses 170 may include an item resembling an HDMI port, an item resembling a component jack, an item resembling a PC port, and an item resembling a USB port. Alternatively, the plurality of items representing external apparatuses may be a plurality of items representing external apparatuses connected to the interface.

Referring to FIG. 6, the display 120 may display the item list 310 including a plurality of rectangular items, on a lower portion of the display 120. In some exemplary embodiments, the rectangular shape of each item may have a width that is greater than a height. The plurality of items may have the same width, or may have different widths according to the types, properties, and the like of pieces of content that respectively correspond to the plurality of items.

As shown in FIG. 6, the item list 310 may be an array of a plurality of items in a horizontal direction. When a preset number or more of items are included in the item list 310, only some of the items may be displayed on the display 120, and the item list 310 may be scrolled horizontally. When the item list 310 is scrolled horizontally, items that have not been displayed may be displayed. Alternatively, the item list 310 may be an array of a plurality of items in a vertical direction.

Referring to FIG. 6, the display 120 may display a cursor 320 that indicates a location of a user input. The cursor 320 may be moved on the display 120 in correspondence with the detected user input.

Although the cursor 320 is shown as a circle in FIG. 6, a shape and a size of the cursor 320 is not limited thereto. The shape and the size of the cursor 320 may be modified in various ways based on a user input.

The cursor 320 may be located in any one of the plurality of items in the item list 310. When the cursor 320 is located in any one of the plurality of items, for example, an item 315, the item 315 may be highlighted. In an exemplary embodiment, there may be alternative ways to present the highlighted item that does not require the use of highlighting but uses other means, e.g., by displaying an item in the center, an item in focus, a selected item, an item with particular graphics, or an item of interest, etc. In one alternative embodiment, the highlighted item may be referred to as a fovea and thus refer to a central location, in a manner similar to the fovea of an eye. The item 315 may be highlighted by, for example, changing a color of the item 315 or drawing a quadrilateral box on edges of the item 315.

When an item is highlighted, the controller 110 may change a property of the highlighted item and a property of at least one of a plurality of items that are adjacent to the highlighted item. For example, the controller 110 may change a location, a size, a width, a height, and an image of an item, an opacity of the image thereof, and a location of content (e.g., text or an image) included in the item.

According to a location of a cursor within a highlighted item, the controller 110 may change a property of the highlighted item and properties of a plurality of items that are adjacent to the highlighted item. Based on a location relationship between at least one of a plurality of items and the cursor, the controller 110 may consecutively change a property of the at least one item.

When a user input for selecting the highlighted item is detected, the controller 110 may perform an operation corresponding to the selected item. For example, in the case that the highlighted item is an item that shows an application, when an input for selecting the highlighted item is detected, the controller 110 may execute the application. The display 120 may display an execution screen image of the application.

When the sensor 130 detects a key input of the control apparatus 200, the controller 110 may end an operation of the application. For example, when the sensor 130 detects an input for pressing any one of the four direction keys of the control apparatus 200 for a long time, the controller 110 may control the display 120 to stop displaying an execution screen image of the application and to display a screen image including an item list again.

FIG. 7 is a table for explaining a first parameter transH which is used to consecutively change the property of an item, according to an exemplary embodiment.

Each of a plurality of items included in an item list according to an exemplary embodiment has a first parameter transH, and a property of each of the plurality of items may be determined according to the first parameter transH. The property of each of the plurality of items may be consecutively changed according to the first parameter transH.

The table of FIG. 7 shows a criterion for determining the first parameter transH of each of a plurality of items in the case of an item list in which a plurality of items are arranged horizontally. Even in the case of an item list in which a plurality of items are arranged vertically, the first parameter transH of each of the plurality of items may be determined similarly.

Referring to the table of FIG. 7, the first parameter transH of each item may be determined according to a location relationship between the item and a currently highlighted item and a location of a cursor within the currently highlighted item.

For example, when a first item from among the plurality of items is located on the left side of the highlighted item and is not adjacent to the highlighted item, or when the first item from among the plurality of items is located on the left side of the highlighted item and a current cursor is located on the right side of a center line of the highlighted item (for example, in the case of a horizontal item list, the center line may denote a line that halves an item horizontally), the first parameter transH of the first item may be −1. When a second item from among the plurality of items is located on the left side of the highlighted item and the current cursor is located on the left side of the center line of the highlighted item, a first parameter transH of the second item may have a value between −1 and −0.5.

When a third item from among the plurality of items is the highlighted item (when a cursor is located within the third item), a first parameter transH of the third item may have a value between −0.5 and 0.5. For example, when the cursor is located on a center line of the third item, the first parameter transH may have a value of 0. When the cursor is located on the left side of the center line of the third item, the first parameter transH may have a value between −0.5 and 0. When the cursor is located on the right side of the center line of the third item, the first parameter transH of the third item may have a value between 0 and 0.5.

When a fourth item from among the plurality of items is located on the right side of the highlighted item and the cursor is located on the right side of the center line of the highlighted item, a first parameter transH of the fourth item may have a value between 0.5 and 1. When a fifth item from among the plurality of items is located on the right side of the highlighted item and is not adjacent to the highlighted item, or when the fifth item from among the plurality of items is located on the right side of the highlighted item and the cursor is located on the left side of the center line of the highlighted item, a first parameter transH of the fifth item may have a value of 1.

The first parameters transH of the items described above with reference to FIG. 7 are only an example, and exemplary embodiments are not limited thereto. The values of the first parameters transH of the items may be determined in another manner.

Figure 8A:
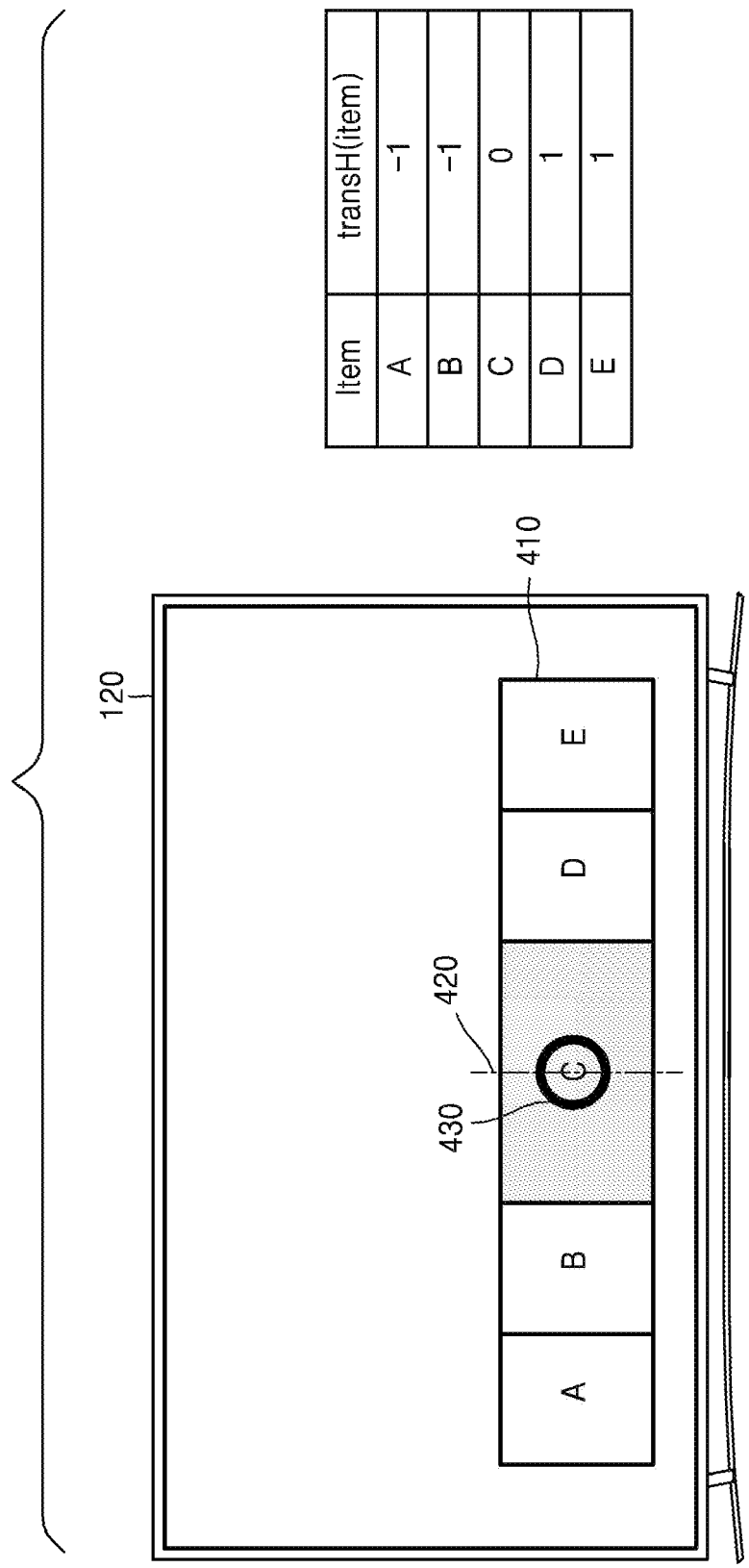
FIGS. 8A-8C illustrate examples in which the values of first parameters transH of a plurality of items are determined according to locations of a cursor within a highlighted item.
Figure 8B:
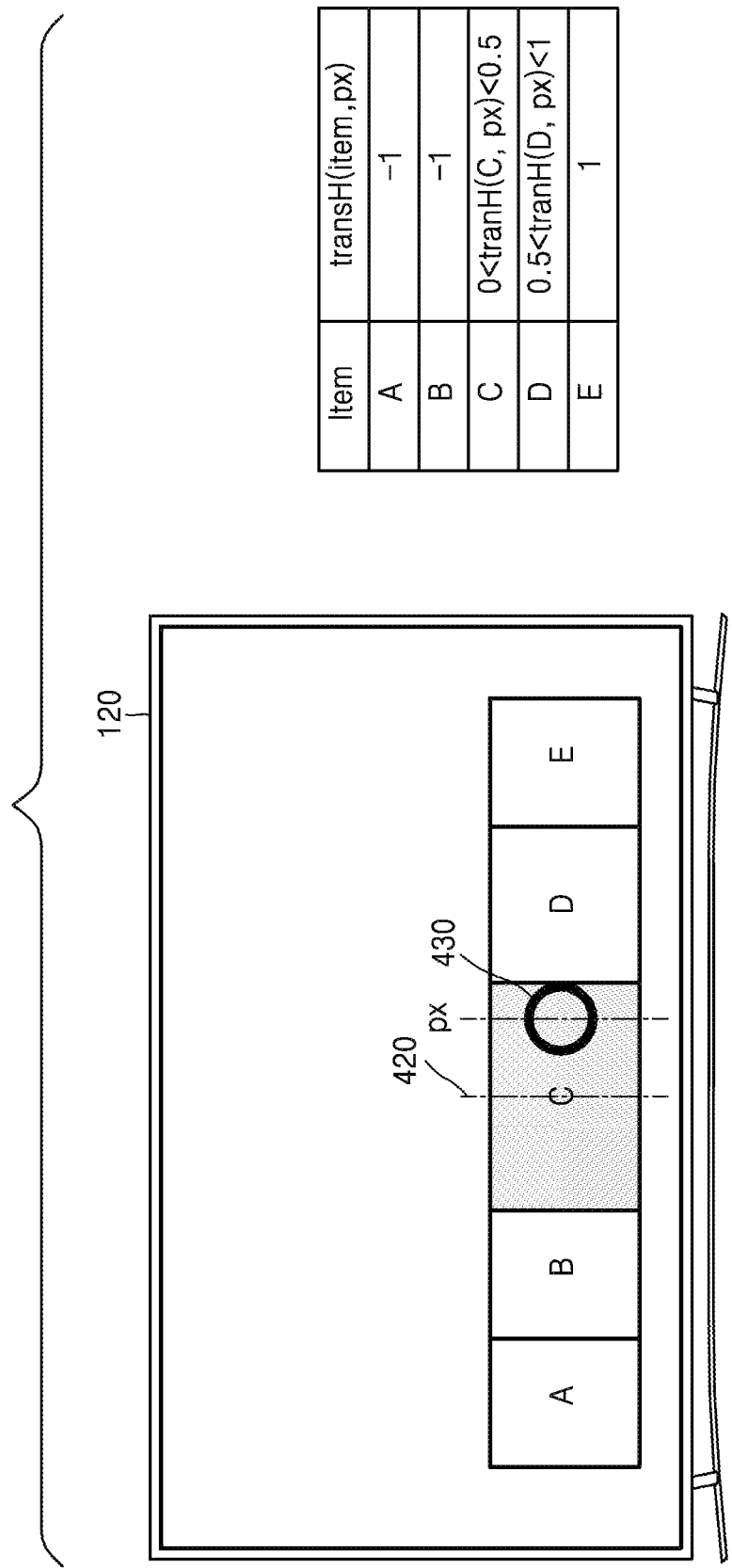
Figure 8C:
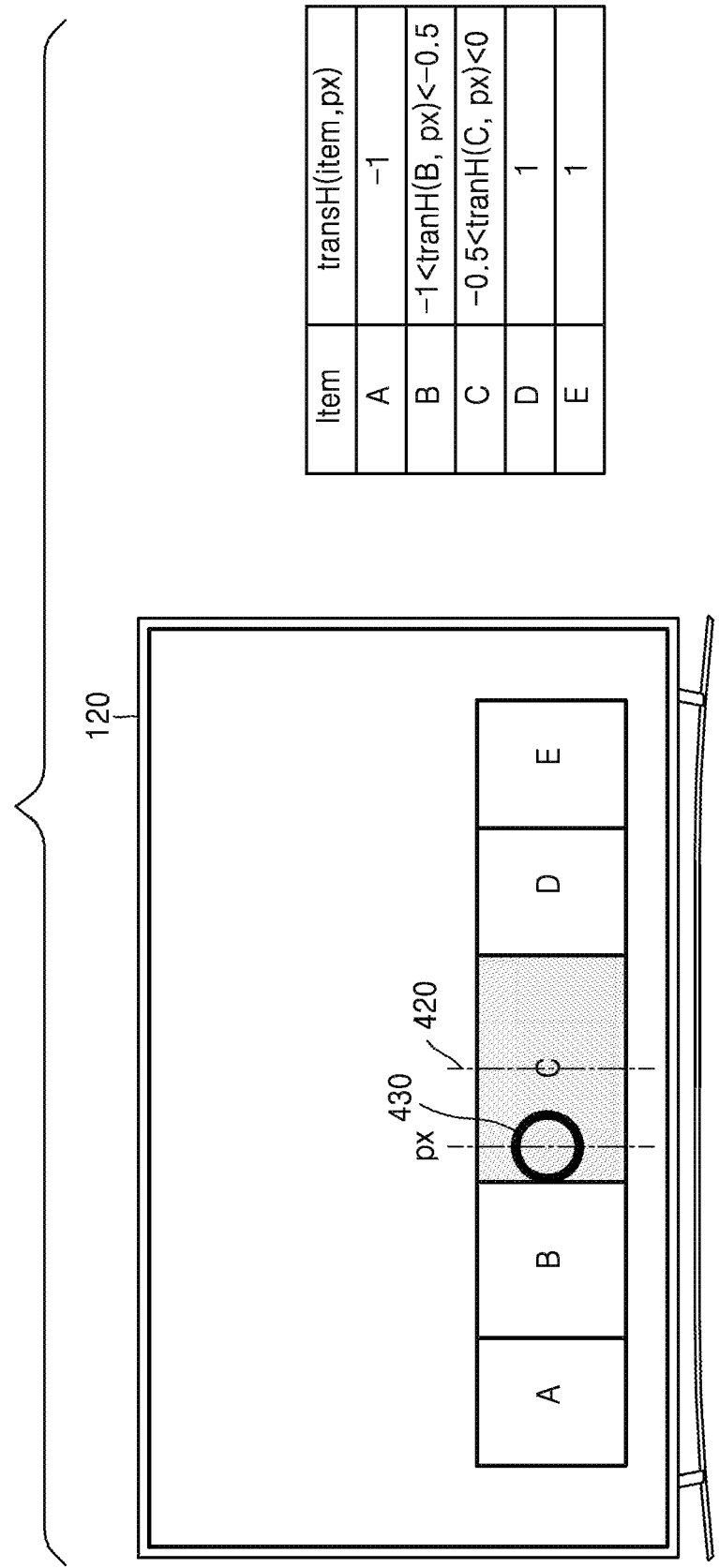

FIGS. 8A-8C illustrate examples in which first parameters transH of a plurality of items are determined according to locations of a cursor within a highlighted item.

Referring to FIG. 8A, the display 120 may display an item list 410 including 5 items (i.e., a first item A, a second item B, a third item C, a fourth item D, and a fifth item E) on a lower end of the display 120. In this case, when a cursor 430 is located on a center line 420 of the third item C, the third item C may be a highlighted item, and a first parameter transH of the third item C may have a value of 0. Since the first item A is located on the left side of the third item C (the highlighted item) and is not adjacent to the third item C (the highlighted item), a first parameter transH of the first item A may have a value of −1. Since the second item B is located on the left side of the third item C (the highlighted item) and the cursor 430 is located on the center line 420 of the third item C (the highlighted item), a first parameter transH of the second item B may have a value of −1. Since the fourth item D is located on the right side of the third item C (the highlighted item) and the cursor 430 is located on the center line 420 of the third item C (the highlighted item), a first parameter transH of the fourth item D may have a value of 1. Since the fifth item E is located on the right side of the third item C (the highlighted item) and is not adjacent to the third item C (the highlighted item), a first parameter transH of the fifth item E may have a value of 1.

Referring to FIG. 8B, when the cursor 430 is located on the right side of the center line 420 of the third item C (the highlighted item), the first parameter transH of the third item C may have a value between 0 and 0.5. In FIGS. 8B and 8C, px indicates a location of the cursor 430. Since the first item A is located on the left side of the third item C (the highlighted item) and is not adjacent to the third item C (highlighted item), the first parameter transH of the first item A may have a value of −1. Since the second item B is located on the left side of the third item C (the highlighted item) and the cursor 430 is located on the right side of the center line

420 of the third item C (the highlighted item), the first parameter transH of the second item B may have a value of −1.

Since the fourth item D is located on the right side of the third item C (the highlighted item) and the cursor 430 is located on the right side of the center line 420 of the third item C (the highlighted item), the first parameter transH of the fourth item D may have a value between 0.5 and 1. Since the fifth item E is located on the right side of the third item C (the highlighted item) and is not adjacent to the third item C (the highlighted item), the first parameter transH of the fifth item E may have a value of 1.

Referring to FIG. 8C, when the cursor 430 is located on the left side of the center line 420 of the third item C (the highlighted item), the first parameter transH of the third item C may have a value between −0.5 and 0. Since the first item A is located on the left side of the third item C (the highlighted item) and is not adjacent to the third item C (the highlighted item), the first parameter transH of the first item A may have a value of −1. Since the second item B is located on the left side of the third item C (the highlighted item) and the cursor 430 is located on the left side of the center line 420 of the third item C (the highlighted item), the first parameter transH of the second item B may have a value between −1 and −0.5.

Since the fourth item D is located on the right side of the third item C (the highlighted item) and the cursor 430 is located on the left side of the center line 420 of the third item C (the highlighted item), the first parameter transH of the fourth item D may have a value of 1. Since the fifth item E is located on the right side of the third item C (the highlighted item) and is not adjacent to the third item C (the highlighted item), the first parameter transH of the fifth item E may have a value of 1.

According to an exemplary embodiment, according to a location relationship between each of the plurality of items and a cursor displayed on the display 120, the value of the first parameter transH of each of the plurality of items may be determined. According to the values of the first parameters transH of the plurality of items, respective properties of the plurality of items may be determined. The property of an item may consecutively vary according to a first parameter transH of the item.

Figure 9:
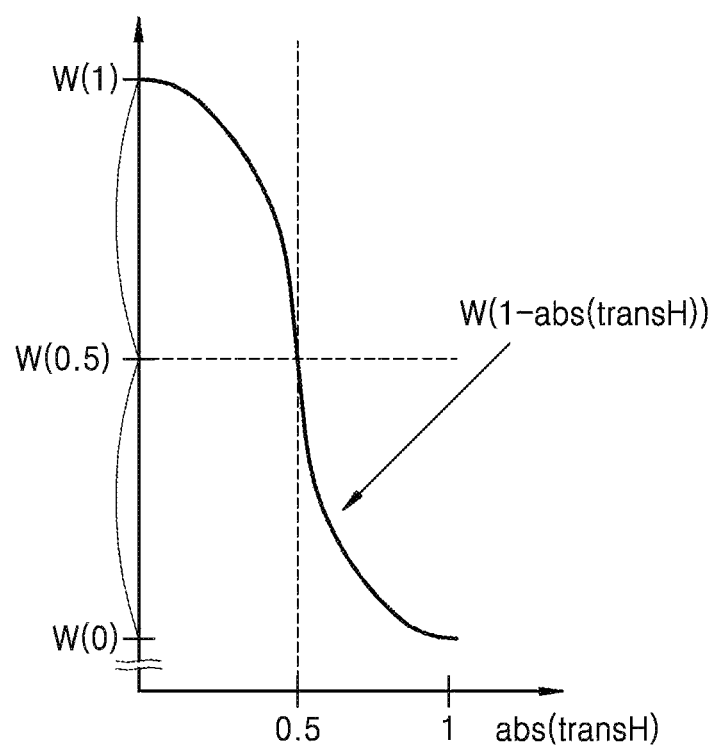
FIG. 9 is a graph showing a width of an item according to the value of a first parameter transH of the item, according to an exemplary embodiment.

FIG. 9 is a graph showing a width of an item according to the value of a first parameter transH of the item, according to an exemplary embodiment.

Referring to FIG. 9, an x axis indicates abs(trasnH), which can represent the absolute value of transH, and a y axis indicates the width of the item. The width of the item may be represented by W(1−abs(transH)). As described above with reference to FIG. 7, since first parameters transH of items have values between −1 and 1, abs(transH) may have a value between 0 and 1. According to an exemplary embodiment, a maximum width of each item may be W(1), and a minimum width of each item may be W(0). Accordingly, a width of each item may be between W(0) and W(1).

According to an exemplary embodiment, when an item is highlighted and a cursor is located on a center line of the highlighted item, the highlighted item may have a maximum width. In other words, when a first parameter transH of an item has a value of 0, a width of the item may be set to be W(1). On the other hand, when an item is not highlighted and is not adjacent to a highlighted item, the item may have a minimum width. In other words, when a first parameter transH of an item has a value of −1 or 1 (i.e., when the value of abs(trasnH) is 1), a width of the item may be set to be W(0).

According to an exemplary embodiment, when a cursor is located on a boundary between a first item and a second item that are adjacent to each other, first parameters transH of the first item and the second item may respectively have values of 0.5 and −0.5. In this case, the first item and the second item may have the same width. Accordingly, W(0.5) may be set to be ½(W(1)+W(0)).

The image display apparatus 100 may change the widths of the plurality of items, based on the graph of FIG. 9. However, the graph of FIG. 9 is only an exemplary embodiment. As the value of abs(transH) changes from 0 to 1, the image display apparatus 100 may change the widths of the plurality of items, based on various graphs that are set so that the width of an item is consecutively changed from W(1) to W(0).

Although the graph of FIG. 9 has been described above as a graph for determining the widths of items according to the values of abs(transH), the graph of FIG. 9 may be used as a graph for determining the sizes, heights, and the like of the items instead of the widths of the items.

FIGS. 10A-10D illustrate an example in which widths of a plurality of items are changed as a cursor moves, according to an exemplary embodiment.

Figure 10A:
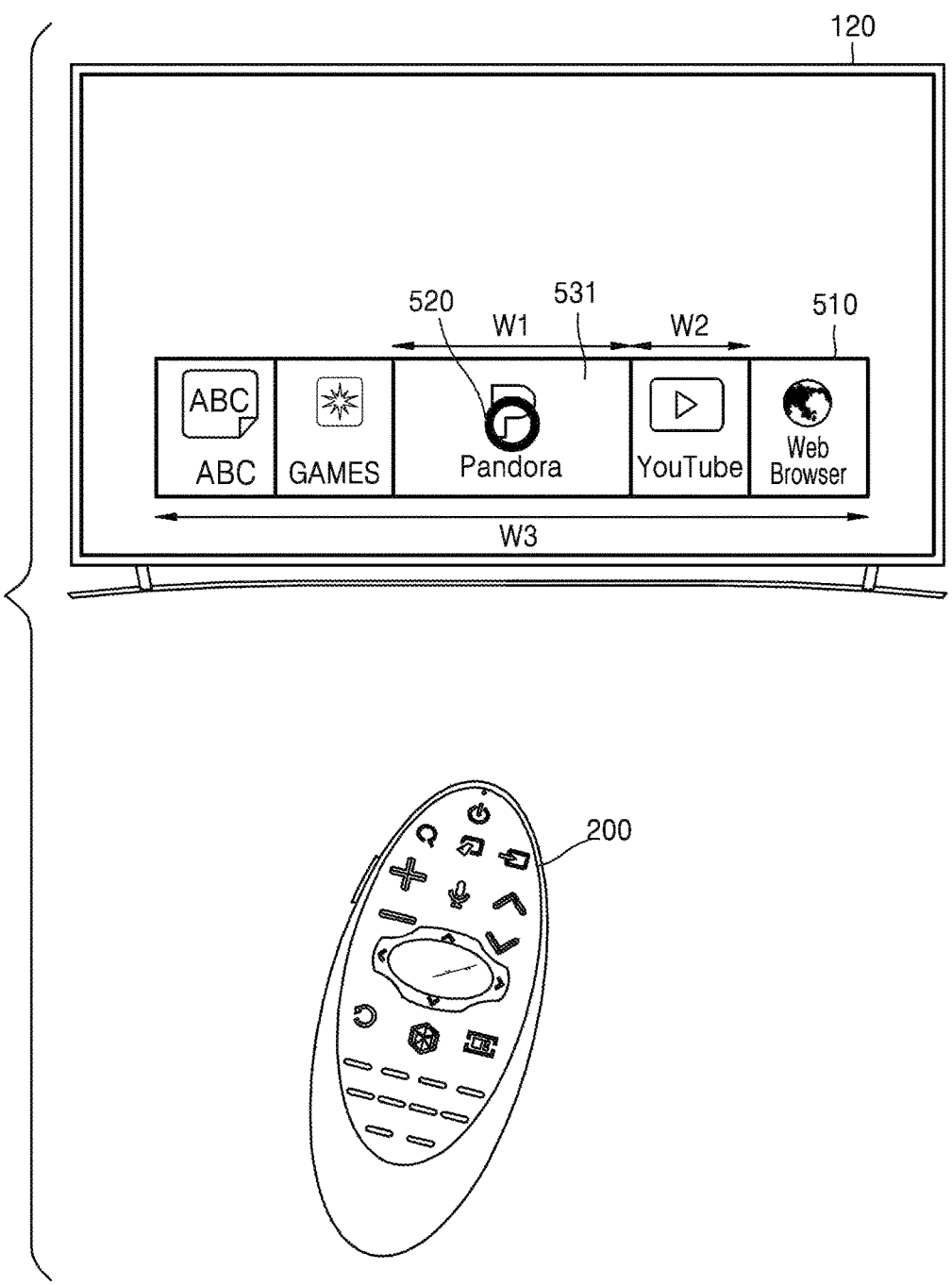
FIGS. 10A-10D illustrate an example in which widths of a plurality of items are changed as a cursor moves, according to an exemplary embodiment.

Referring to FIG. 10A, the display 120 may display an item list 510 including a plurality of items, on a lower end of the display 120. The item list 510 may be an array of the plurality of items in a horizontal direction, and each of the plurality of items may represent content. For convenience of explanation, an item list will now be described as including 5 items.

The display 120 may display a cursor 520 that indicates a location of a user input, and the controller 110 may move the cursor 520 on the display 120 in correspondence with a detected user input. For example, when a predetermined button of a user input unit of the control apparatus 200 is pressed or when the control apparatus 200 detects a movement of a motion sensor (an acceleration sensor or a gyro sensor), the control apparatus 200 may transmit a certain key input to the image display apparatus 100. When the controller 110 receives a certain key input via the control apparatus 200, the controller 110 may display the cursor 520 on the display 120.

When the cursor 520 according to an exemplary embodiment is located on a center line of a first item 531 from among the plurality of items included in the item list 510, a width W1 of the first item 531 may be a maximum width from among widths that the items may have, and the width W1 of the first item 531 may be W(1), which has been described with reference to the graph of FIG. 9. A width W2 of a second item may be a minimum width that may have an item, and the width W2 of the second item may be W(0), which has been described with reference to the graph of FIG. 9.

The image display apparatus 100 may detect a user input for moving or tilting the control apparatus 200 upward, downward, leftward, or rightward. For example, the image display apparatus 100 may detect a moving direction and a moving extent of the control apparatus 200 and move the cursor 520 on the display 120 according to a detected movement. The image display apparatus 100 may also move the cursor 520 on the display 120 according to a direction of a touch input detected by a touch panel of the control apparatus 200.

Figure 10B:
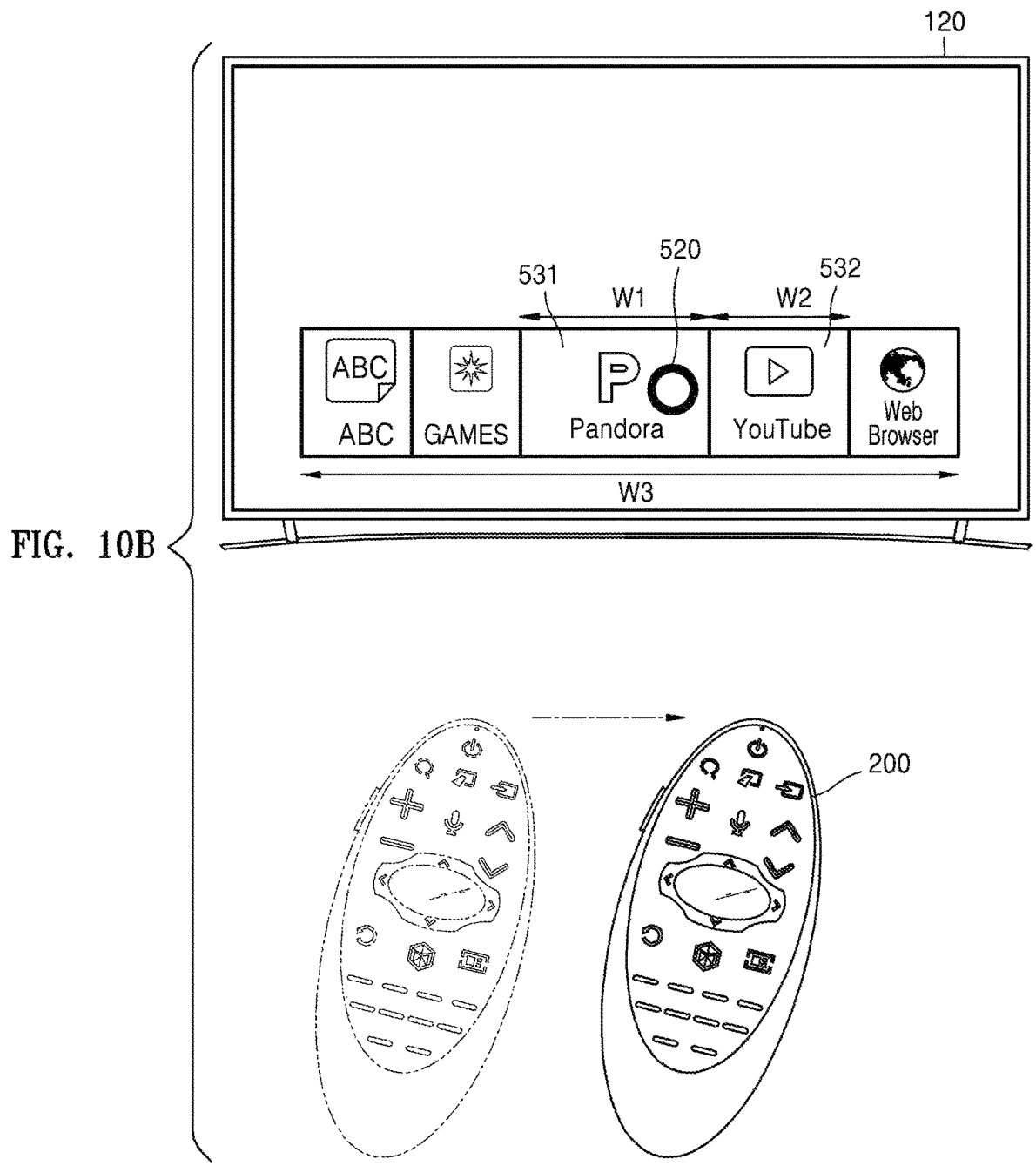

As shown in FIG. 10B, when a user input for moving the control apparatus 200 rightward is detected, the image display apparatus 100 may move the cursor 520 displayed on the display 120 rightward in correspondence with the detected user input. At this time, information about a movement of the control apparatus 200 that is sensed via the sensor of the control apparatus 200 may be transmitted to the image display apparatus 100. The image display apparatus 100 may calculate coordinates of the cursor 520 based on the motion information of the control apparatus 200, and move the cursor 520 on the display 120 according to the calculated coordinates.

As shown in FIG. 10B, as the cursor 520 is moved rightward (as the cursor 520 is farther from the center line of the first item 531 and closer to a second item 532 located on the right side of the first item 531), the image display apparatus 100 may gradually decrease the width of the first item 531 and may gradually increase the width of the second item 532. The width W1 of the first item 531 and the width W2 of the second item 532 may be changed according to the graph of FIG. 9. According to an exemplary embodiment, a decrease degree of the width W1 of the first item 531 may be equal to an increase degree of the width W2 of the second item 532, and thus a width W3 of the item list 510 may be maintained constant between a case where the cursor 520 is located on the center line of the first item 531 (the case of FIG. 10A) and a case where the cursor 520 moves toward the second item 532 (the case of FIG. 10B).

Figure 10C:
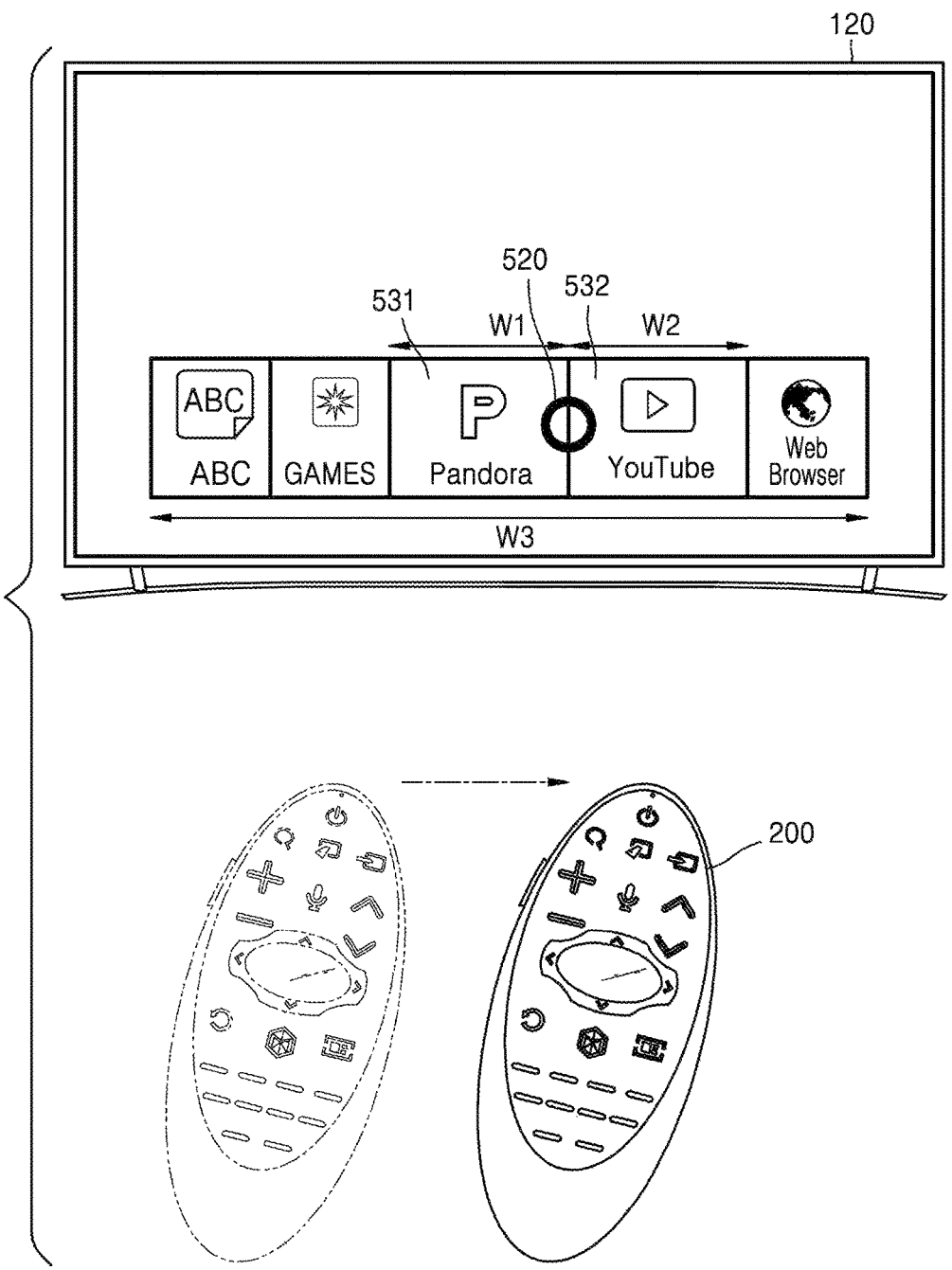

When a user input for continuously moving the control apparatus 200 rightward is detected, the image display apparatus 100 may continuously move the cursor 520 displayed on the display 120 rightward in correspondence with the detected user input. When the cursor 520 continuously moves rightward and is then located on a boundary between the first item 531 and the second item 532 as shown in FIG. 10C, the image display apparatus 100 may change the width W1 of the first item 531 and the width W2 of the second item 532 such that the width W1 of the first item 531 is equal to the width W2 of the second item 532. The width W3 of the item list 510 may be maintained constant.

Figure 10D:
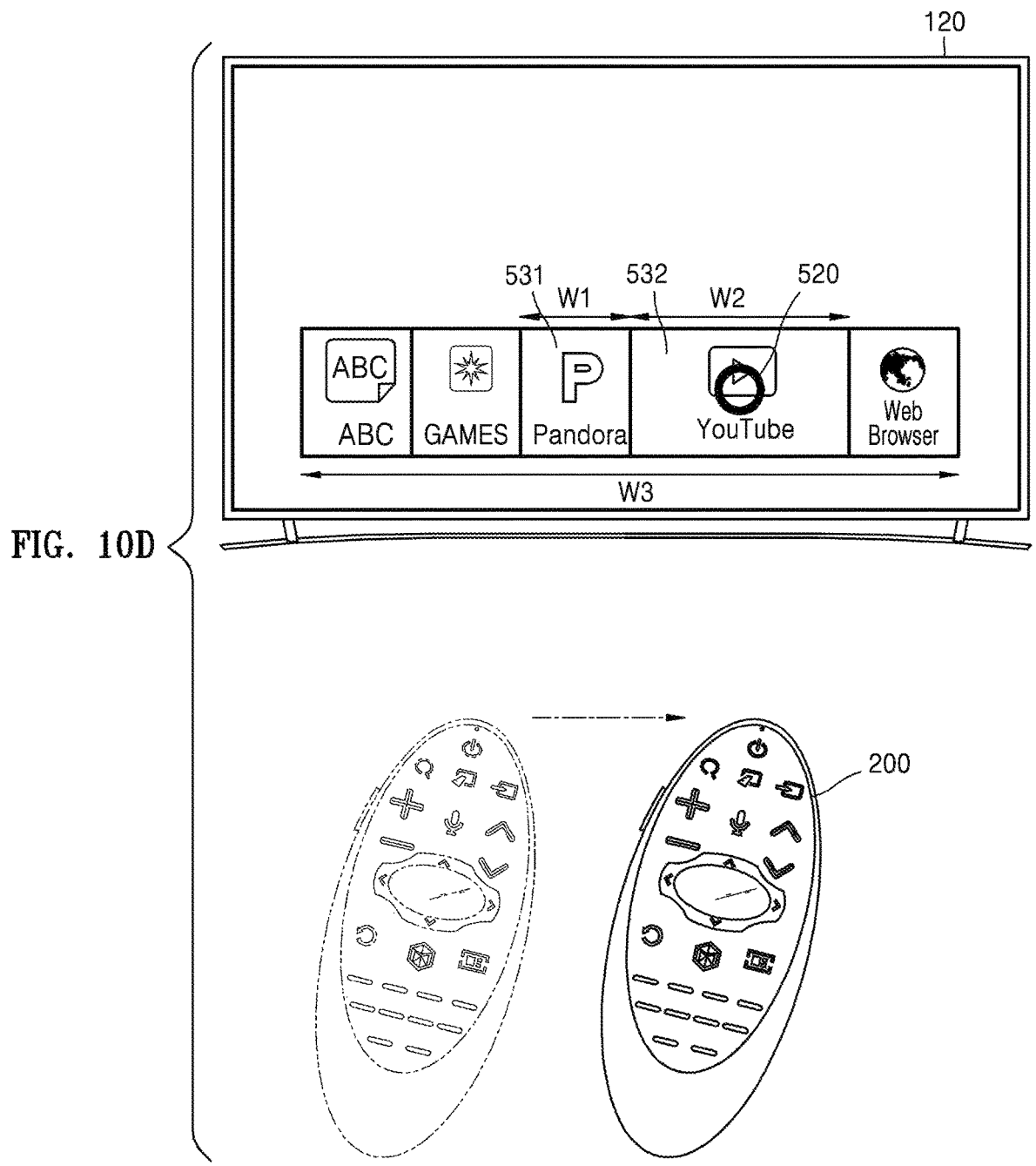

When the cursor 520 continuously moves rightward and is then located on a center line of the second item 532 as shown in FIG. 10D, the image display apparatus 100 may change the width W2 of the second item 532 to a maximum width (e.g., W(1) of FIG. 9) and the width W1 of the first item 531 to a minimum width (e.g., W(0) of FIG. 9). The width W3 of the item list 510 may be maintained constant.

Figure 11:
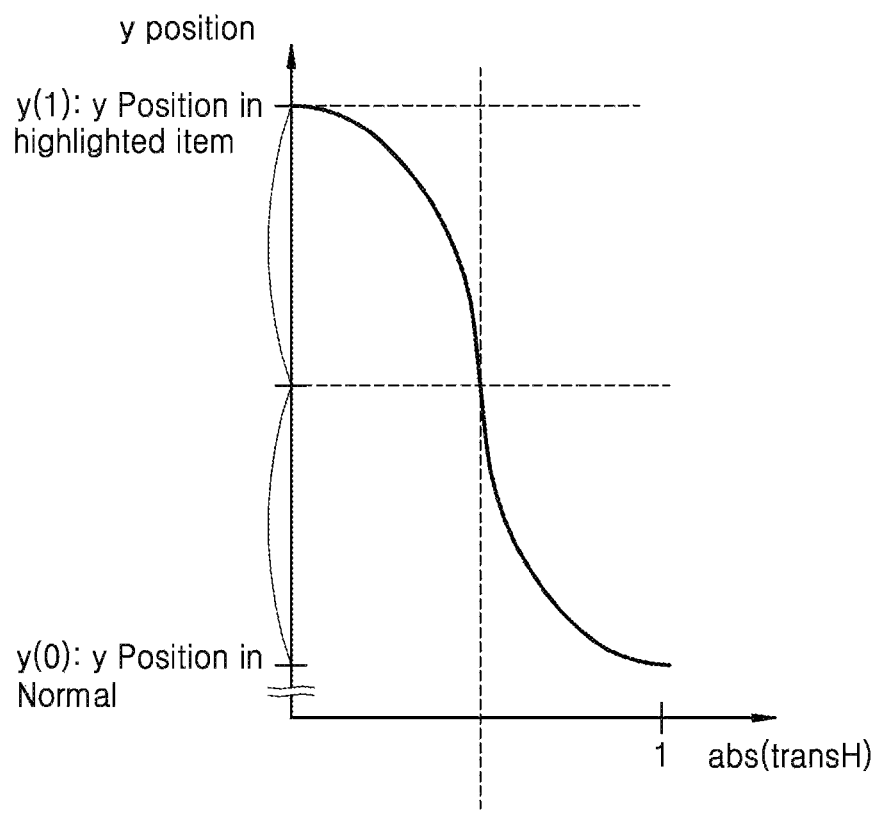
FIG. 11 is a graph showing a position of content included in an item according to the value of a first parameter transH of the item, according to an exemplary embodiment.

FIG. 11 is a graph showing a position of content included in an item according to the value of a first parameter transH of the item, according to an exemplary embodiment.

Referring to FIG. 11, an x axis indicates abs(trasnH) of an item, and an y axis indicates a y coordinate value of content included in the item.

According to an exemplary embodiment, content included in an item may be an image or text. A position of content included in an item on the display 120 may be represented by a 2D coordinate value, and may include an x coordinate value and a y coordinate value. The 2D coordinate value of the content may be determined by using a left upper edge of the display 120 as a basis point. Alternatively, the 2D coordinate value of the content may be determined by using a left upper edge of the item as a basis point. When the 2D coordinate value of the content is determined by using the left upper edge of the display 120 or the item as a basis point, as the y coordinate value increases, the content moves down.

According to an exemplary embodiment, the y coordinate value of the item may range from y(0) to y(1). In other words, a maximum value of the y coordinate of the content included in the item may be y(1), and a minimum value thereof may be y(0).

According to an exemplary embodiment, when an item is highlighted and a cursor is located on a center line of the highlighted item, the y coordinate value of content included in the highlighted item may be set to be a maximum value. In other words, when a first parameter transH of the item has a value of 0, the y coordinate value of the content may be y(1), and the content may be moved down. On the other hand, when an item is not highlighted and is not adjacent to a highlighted item, the y coordinate value of content included in the item may be set to be a minimum value. In other words, when a first parameter transH of the item has a value of −1 or 1 (i.e., when the value of abs(trasnH) is 1), the y coordinate value of the content may be y(0), and the content may be moved upward.

The image display apparatus 100 may change the positions of pieces of content included in the plurality of items, based on the graph of FIG. 11. However, the graph of FIG. 11 is only an exemplary embodiment. As the value of abs(transH) changes from 0 to 1, the image display apparatus 100 may change the position of content included in an item, based on various graphs that are set so that the y coordinate value of the content included in the item consecutively changes from y(1) to y(0).

Although the graph of FIG. 11 has been described above as a graph for determining the y coordinate value of content included in an item, the graph of FIG. 9 may be used as a graph for determining the x coordinate value of content included in an item.

Figure 12A:
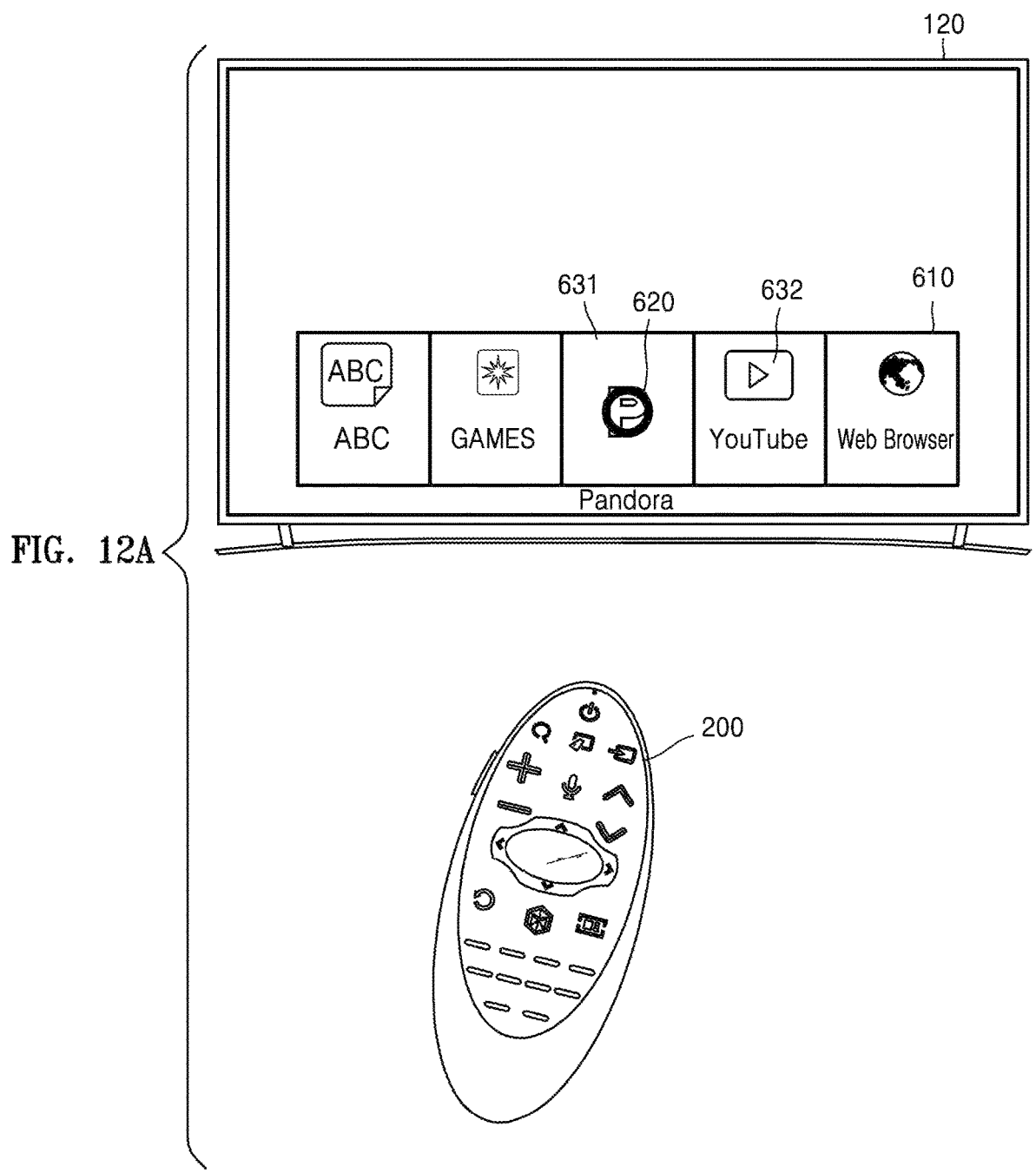
Figure 12C:
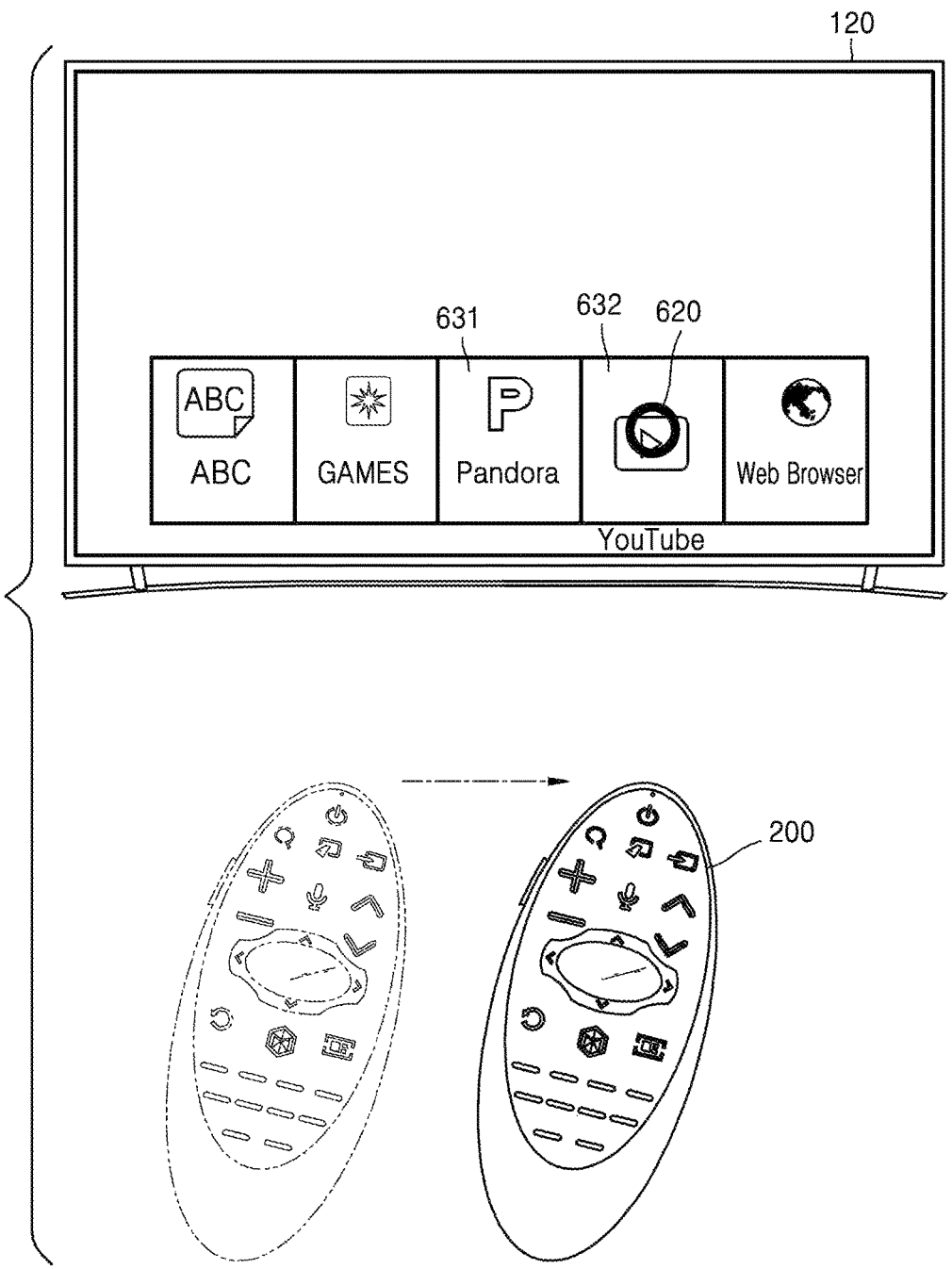

FIGS. 12A-12C illustrate an example in which positions of pieces of content included in a plurality of items are changed as a cursor moves, according to an exemplary embodiment.

Referring to FIG. 12A, the display 120 may display an item list 610 including a plurality of items, on a lower end of the display 120. The item list 610 may be an array of the plurality of items in a horizontal direction, and each of the plurality of items may represent content. For convenience of explanation, an item list will now be described as including 5 items.

The display 120 may display a cursor 620 that indicates a location of a user input, and the controller 110 may move the cursor 620 on the display 120 in correspondence with a detected user input. For example, when the controller 110 receives a certain key input via the control apparatus 200, the controller 110 may display the cursor 620 on the display 120.

When the cursor 620 is located on a center line of a first item 631 from among the plurality of items included in the item list 610, a y coordinate value representing a position of first text content (e.g., "Pandora") included in the first item 631 may be y(1) described with reference to the graph of FIG. 11. A y coordinate value representing a position of second text content (e.g., "YouTube") included in a second item 632 may be y(0) described with reference to the graph of FIG. 11.

As shown in FIG. 12B, when a user input for moving the control apparatus 200 rightward is detected, the image display apparatus 100 may move the cursor 620 displayed on the display 120 rightward in correspondence with the detected user input.

As the cursor 620 is moved rightward (as the cursor 620 is farther from the center line of the first item 631 and closer to the second item 632 located on the right side of the first item 631), the image display apparatus 100 may gradually decrease the y coordinate value of the first text content (e.g., "Pandora") and may gradually increase the y coordinate value of the second text content (e.g., "YouTube"). Thus, the first text content ("Pandora") may gradually move up, and the second text content ("YouTube") may gradually move down. At this time, the y coordinate value of the first text content ("Pandora") and the y coordinate value of the second text content ("YouTube") may be changed according to the graph of FIG. 11.

When the cursor 620 continuously moves rightward and is then located on a boundary between the first item 631 and the second item 632 as shown in FIG. 12B, the image display apparatus 100 may change positions of the first text content ("Pandora") and the second text content ("YouTube") such that the y coordinate value of the first text content ("Pandora") may be equal to the y coordinate value of the second text content ("YouTube").

When the cursor 620 continuously moves rightward and is then located on a center line of the second item 632 as shown in FIG. 12C, the image display apparatus 100 may change the y coordinate value of the first text content ("Pandora") to y(0) and may change the y coordinate value of the second text content ("YouTube") to y(1).

Figure 13:
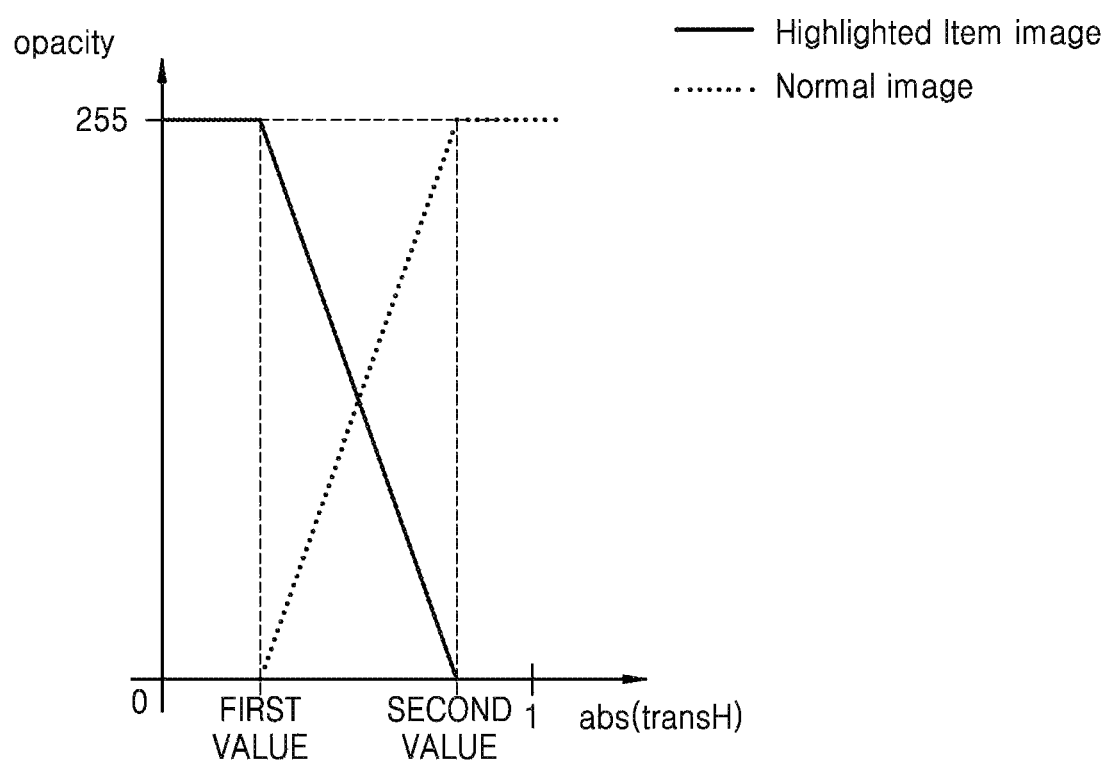
FIG. 13 is a graph showing opacities of a first image and a second image of an item according to the value of a first parameter transH of the item, according to an exemplary embodiment.

FIG. 13 is a graph showing opacities of a first image and a second image of an item according to the value of a first parameter transH of the item, according to an exemplary embodiment.

Referring to FIG. 13, an x axis indicates abs(trasnH) and a y axis indicates opacities of item images.

According to an exemplary embodiment, the item may be displayed based on the first image and the second image. For example, the opacity of the first image and the opacity of the second image may have values between 0 and a preset value (for example, 255). When the opacity of the first image has a maximum value and the opacity of the second image has a value of 0, the item may be displayed as the first image. When the opacity of the first image has a first value that is not 0, and the opacity of the second image has a second value that is not 0, the item may be displayed as a mixture of the first image and the second image, based on the first and second values. When the opacity of the first image has a value of 0 and the opacity of the second image has a maximum value, the item may be displayed as the second image.

According to an exemplary embodiment, when the value of abs(transH) of the item is in between 0 and the first value, the opacity of the first image of the item may be set to have a maximum value (for example, 255) and the opacity of the second image of the item may be set to have a value of 0. For example, when an item is highlighted and a cursor is located on a center line of the highlighted item (when a first parameter transH of the item has a value of 0), the highlighted item may be displayed as the first image (which can indicate that it is the highlighted item).

As the value of abs(transH) of the item changes from the first value to the second value, the opacity of the first image of the item may be set to decrease and the opacity of the second image of the item may be set to increase. Accordingly, as the value of abs(transH) of the item changes from the first value to the second value, the item may be displayed as an image that gradually changes from the first image to the second image.

When the value of a first parameter transH of the item is between the second value and 1, the opacity of the first image of the item may be set to be 0, and the opacity of the second image of the item may be set to be a maximum value. For example, when an item is not highlighted and is not adjacent to a highlighted item (when a first parameter transH of the item has a value of −1 or 1, i.e., when the value of abs(transH) is 1), the item may be displayed as the second image (e.g., a normal image).

The image display apparatus 100 may change images of a plurality of items or opacities of the images, based on the graph of FIG. 13. However, the graph of FIG. 13 is only an exemplary embodiment. As the value of abs(transH) changes from 0 to 1, the image display apparatus 100 may change the images of a plurality of items or opacities of the images, based on various graphs that are set so that the opacity of the first image (the highlighted item image) consecutively changes from a maximum value to 0 and the opacity of the second image (normal image) consecutively changes from 0 to the maximum value.

Figure 14A:
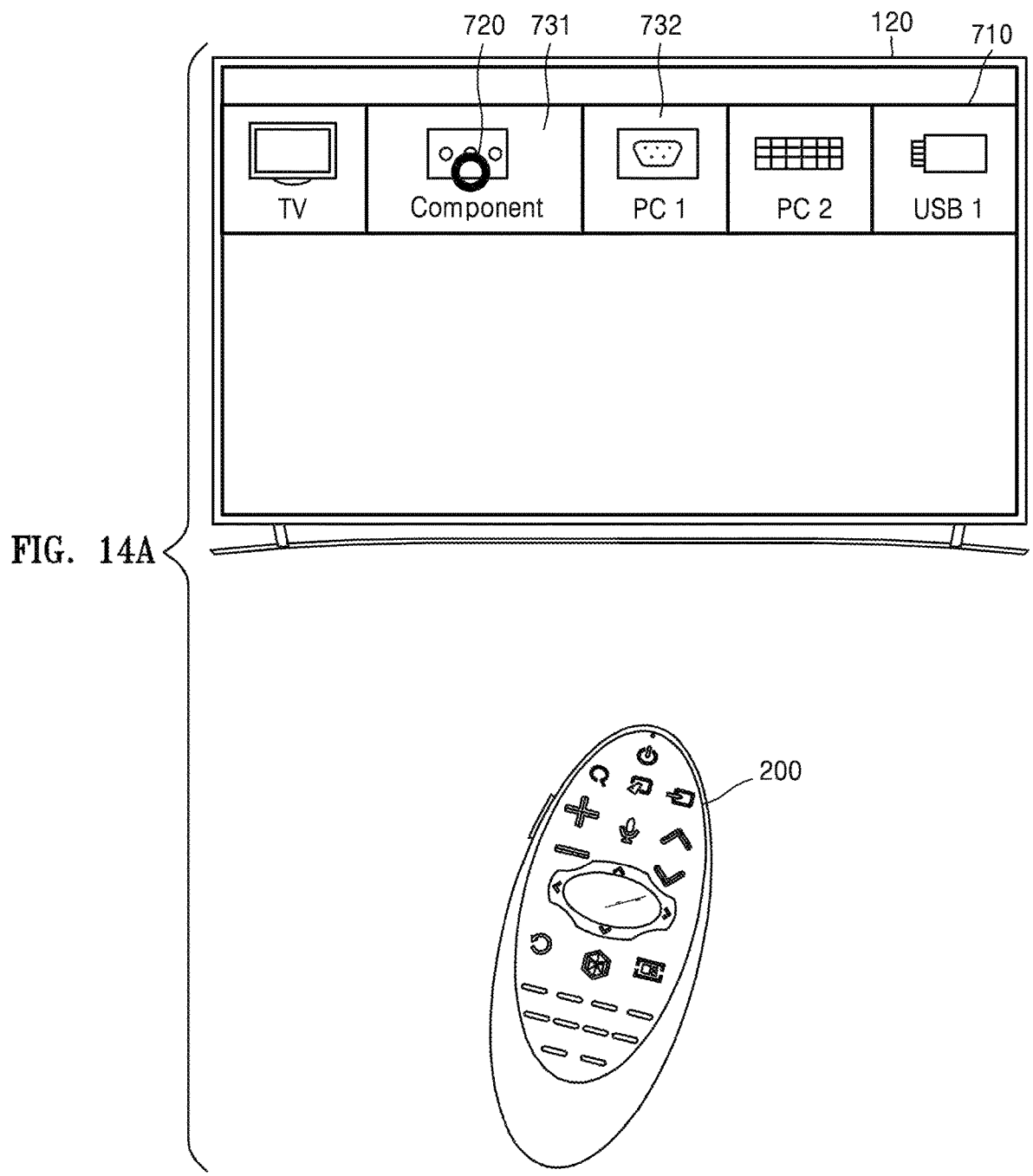
FIGS. 14A-14C illustrate an example in which images of a plurality of items are changed as a cursor moves, according to an exemplary embodiment.
Figure 14B:
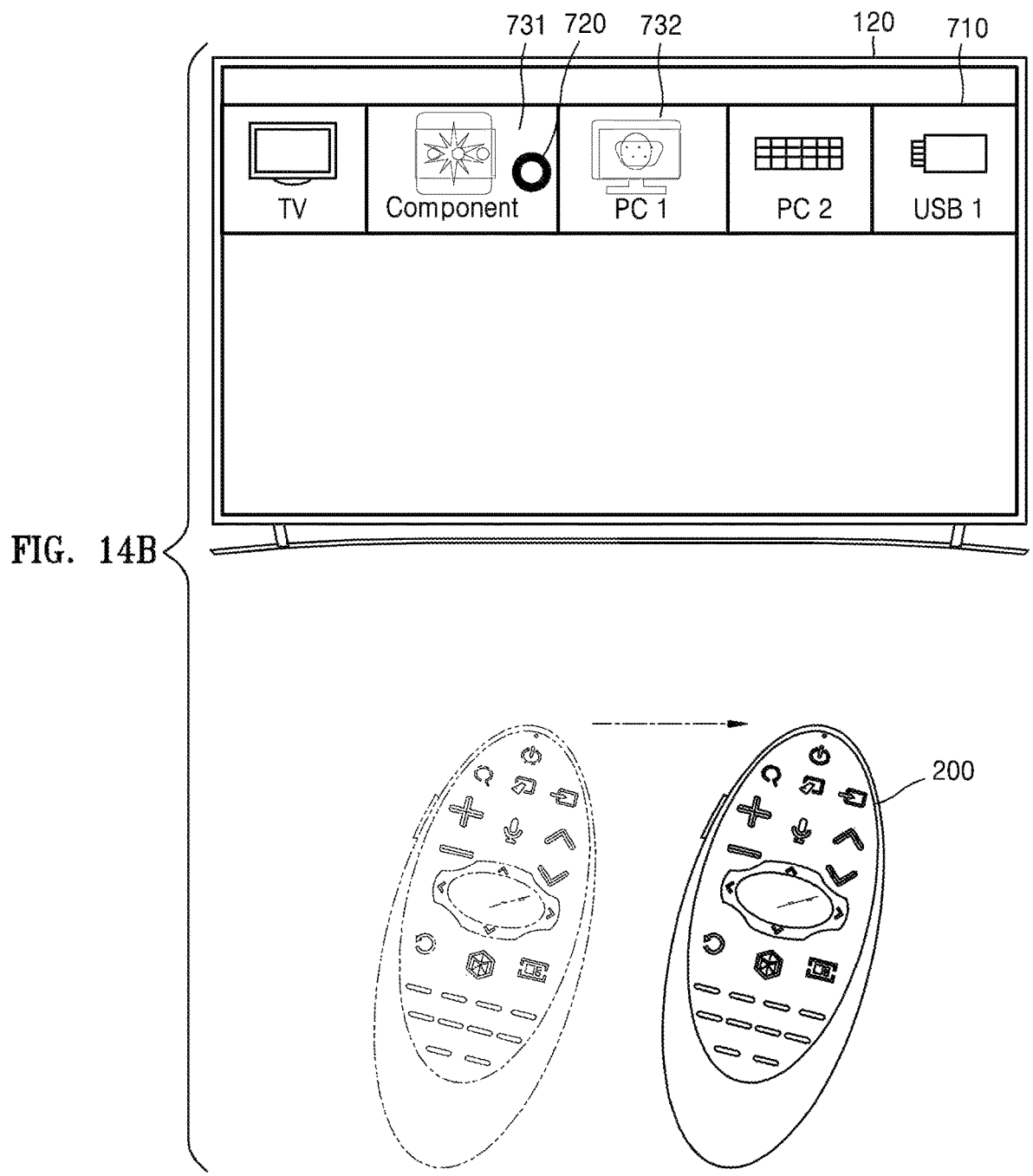
Figure 14C:
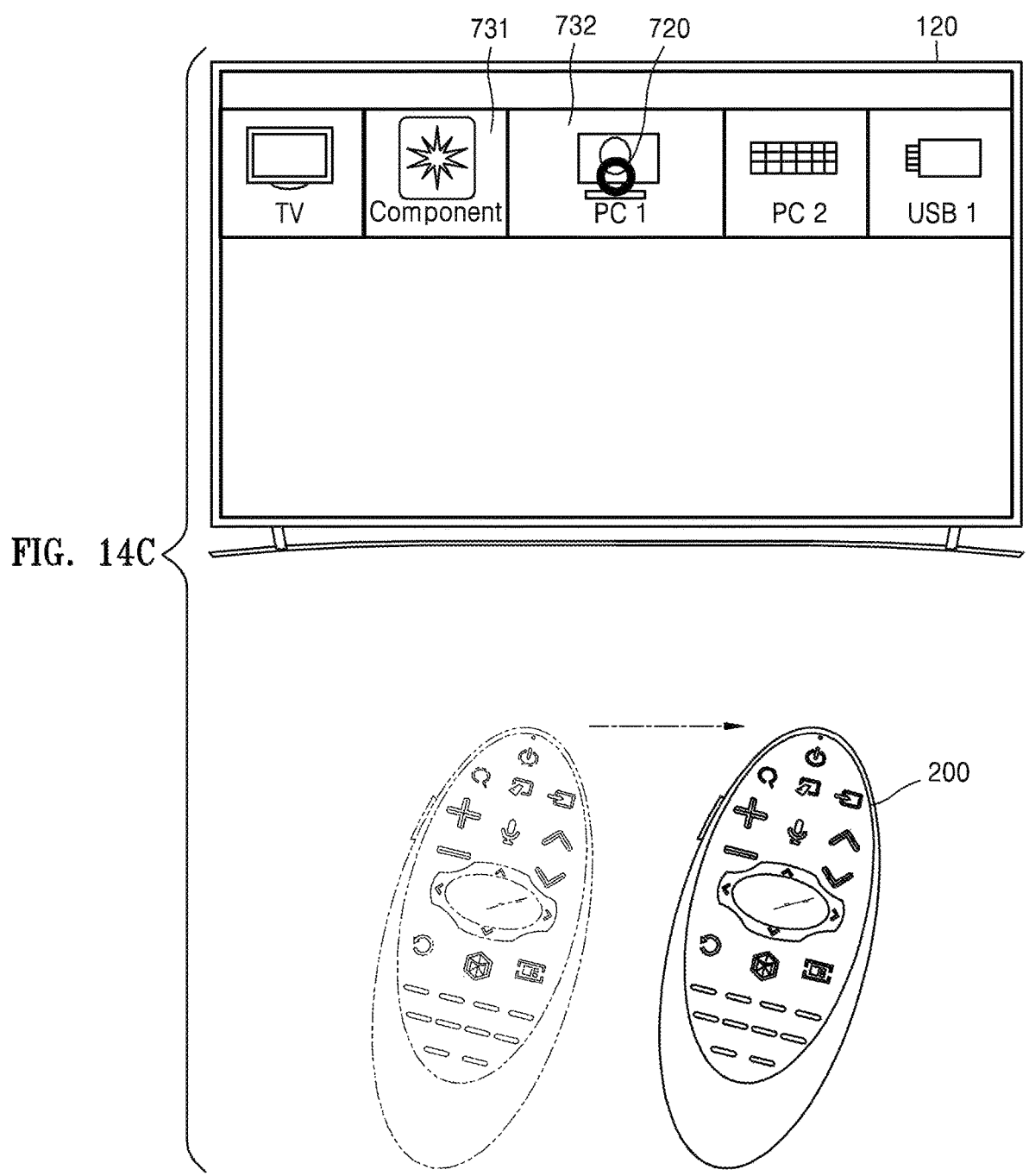

FIGS. 14A-14C illustrate an example in which images of a plurality of items are changed as a cursor moves, according to an exemplary embodiment.

Referring to FIG. 14A, the display 120 may display an item list 710 including a plurality of items, on a lower end of the display 120. The item list 710 may be an array of the plurality of items in a horizontal direction. Each of the plurality of items may include an item representing an interface for connecting the image display apparatus 100 to an external apparatus, or an item representing an external apparatus connected to the image display apparatus 100.

The display 120 may display a cursor 720 that indicates a location of a user input, and the controller 110 may move the cursor 720 on the display 120 in correspondence with a detected user input. For example, when the controller 110 receives a certain key input via the control apparatus 200, the controller 110 may display the cursor 720 on the display 120.

According to an exemplary embodiment, each of the plurality of items may include a normal image and a highlighted item image. For example, a normal image of an item may include an image or text that represents an interface corresponding to the item. A highlighted item image of the item may include a screen image previously executed by the image display apparatus 100 or an image or text stored in an external apparatus corresponding to the item. However, exemplary embodiments are not limited thereto.

For example, when an item is highlighted and a cursor is located on a center line of the highlighted item (when a first parameter transH of the item has a value of 0), the item may be displayed as a highlighted item image. On the other hand, when the first parameter transH of the item has a value of −1 or 1, the item may be displayed as a normal image.

When the value of abs(transH) of the item is greater than 0 and less than 1, opacities of the highlighted item image and the normal image of the item may be determined according to the value of abs(transH) of the item (according to a distance between the center line of the item and the cursor). The item may also be displayed as a mixture of the highlighted item image and the normal image, based on the determined opacities.

For example, referring to FIG. 14A, when the cursor 720 is located on a center line of a first item 731 (for example, a "component" item) from among the plurality of items included in the item list 710, the first item 731 may be displayed as a first image (highlighted item image). In other words, the opacity of the first image (highlighted item image) of the first item 731 may have a maximum value, and the opacity of the second image (normal image) thereof may have a value of 0.

When the cursor 720 is located on the center line of the first item 731, a second item 732 (for example, a "PC 1" item) adjacent to the right side of the first item 731 may be displayed as a fourth image (normal image). In other words, the opacity of the fourth image (normal image) of the second item 732 may have a maximum value, and the opacity of a third image (highlighted item image) thereof may have a value of 0.

As shown in FIG. 14B, when a user input for moving the control apparatus 200 rightward is detected, the image display apparatus 100 may move the cursor 720 displayed on the display 120 rightward in correspondence with the detected user input.

As shown in FIG. 14B, as the cursor 720 is moved rightward (as the cursor 720 is farther from the center line of the first item 731 and closer to a center line of the second item 732), the opacity of the first image (highlighted item image) of the first item 731 may decrease, the opacity of the second image (normal image) thereof may increase, and the first item 731 may be displayed as a mixture of the first and second images, based on the opacities of the first and second images.

As the cursor 720 is moved rightward, the opacity of the third image (highlighted item image) of the second item 732 may increase, the opacity of the fourth image (normal image) thereof may decrease, and the second item 732 may be displayed as a mixture of the third and fourth images, based on the opacities of the third and fourth images.

When the cursor 720 continuously moves rightward and is then located on the center line of the second item 732 as shown in FIG. 14C, the opacity of the first image (highlighted item image) of the first item 731 may have a value of 0 and the opacity of the second image (normal image) of the first item 731 may have a maximum value. Accordingly, the first item 731 may be displayed as the second image (normal image). The opacity of the third image (highlighted item image) of the second item 732 may have a maximum value, and the opacity of the fourth image (normal image) thereof may have a value of 0. Accordingly, the second item 732 may be displayed as the third image (highlighted item image).

FIG. 15 is a table for explaining a second parameter which is used to change the properties of items, according to an exemplary embodiment.

The second parameter r may be a parameter that is further considered in addition to the first parameter transH in order to determine property values of the items. The value of the second parameter r may be determined based on a location of a cursor. For example, the display 120 may include an activation area and a deactivation area of an item, and the activation area may include a first area and a second area. When the cursor is located on the activation area, the value of the second parameter r may be greater than 0 and less than or equal to 1.

Referring to FIG. 15, when the cursor is located on the first area included in the activation area, the second parameter r may have a value of 1. When the cursor is located on the second area included in the activation area, the second parameter r may have a value that is greater than 0 and less than 1. In this case, the value of the second parameter r may be set to be constant within the second area or may be set to vary according to a distance between the cursor and an item list. For example, as the distance between the cursor and the item list decreases, the second parameter r may be set to have a larger value.

On the other hand, when the cursor is located on the deactivation area, the value of the second parameter r may be 0.

Figure 16A:
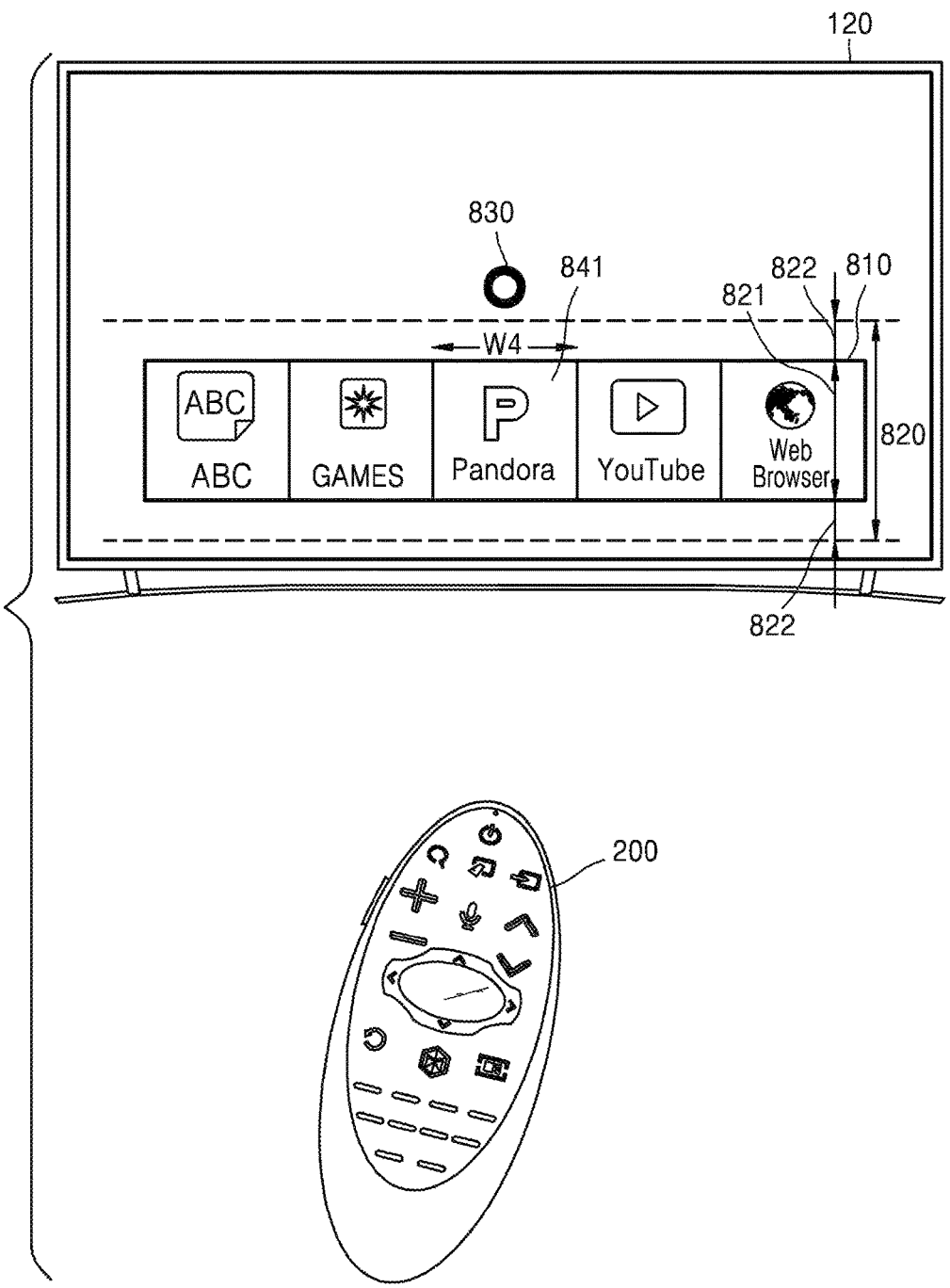
FIGS. 16A-16C illustrate an example in which, when a cursor is moved from a deactivation area to an activation area along a center line of a first item, a width of the first item is changed.

The activation area and the deactivation area will now be described in detail with reference to FIG. 16A. Referring to FIG. 16A, the display 120 may display an item list 810 including a plurality of items arranged in a horizontal direction, on a lower end of the display 120. For example, in the case of an item list in which a plurality of items are arranged in a horizontal direction, an activation area may be defined as an area 820 extended a preset distance in a vertical direction (y-axis direction) from an area on which the item list 810 is displayed. Accordingly, the activation area 820 may be defined based on a y coordinate value of the display 120.

The image display apparatus 100 may set an item list area 821 of the activation area 820, on which the item list 810 is displayed, to be the first area, and may set an area 822 of the activation area 820, on which the item list 810 is not displayed, to be the second area.

The image display apparatus 100 may set an area except for the activation area 820 to be the deactivation area.

On the other hand, in the case of an item list in which a plurality of items are arranged in a vertical direction, an activation area may be defined as an area extended a preset distance in a horizontal direction (x-axis direction) from an item list area on which the item list is displayed.

Figure 16B:
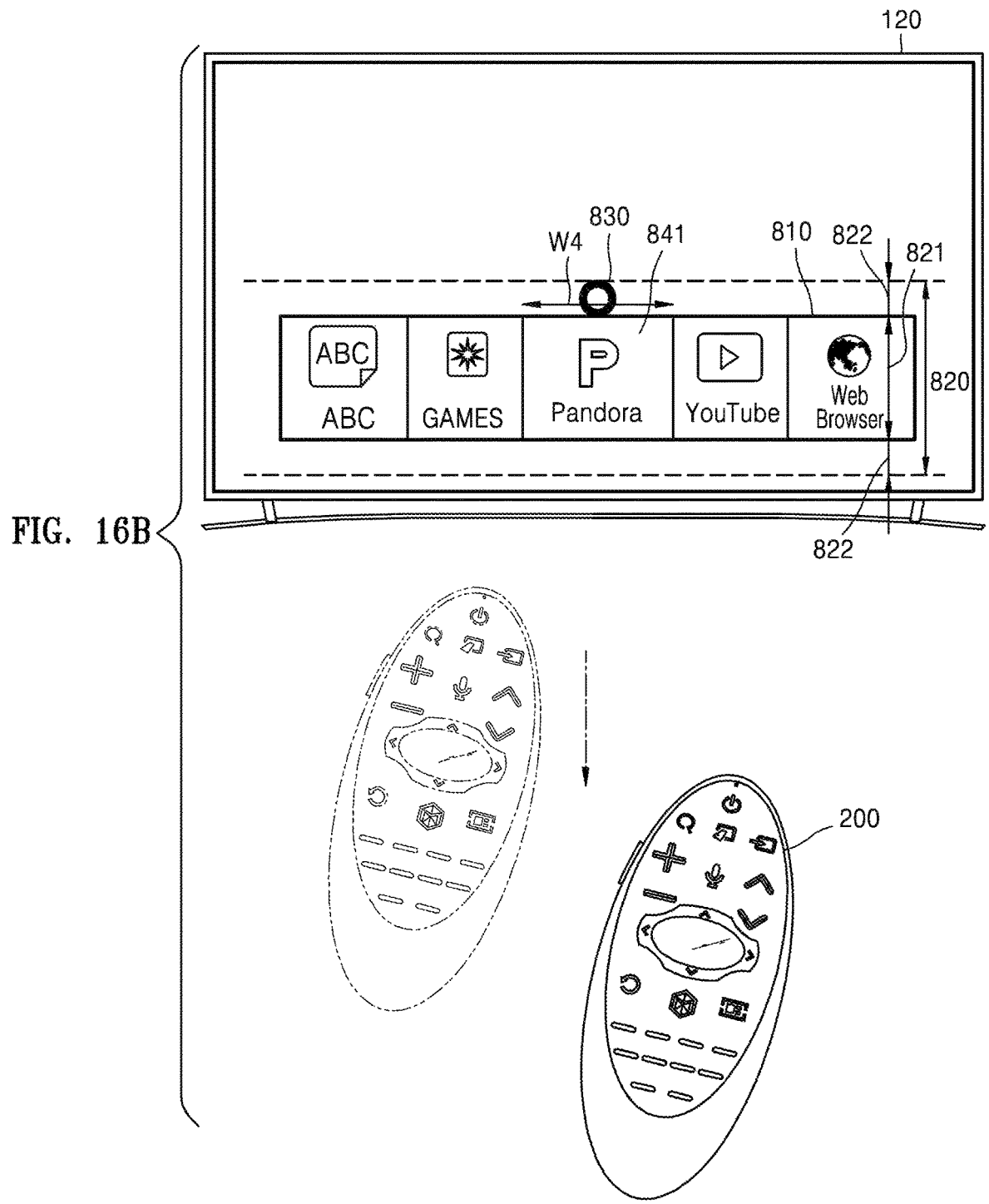
Figure 16C:
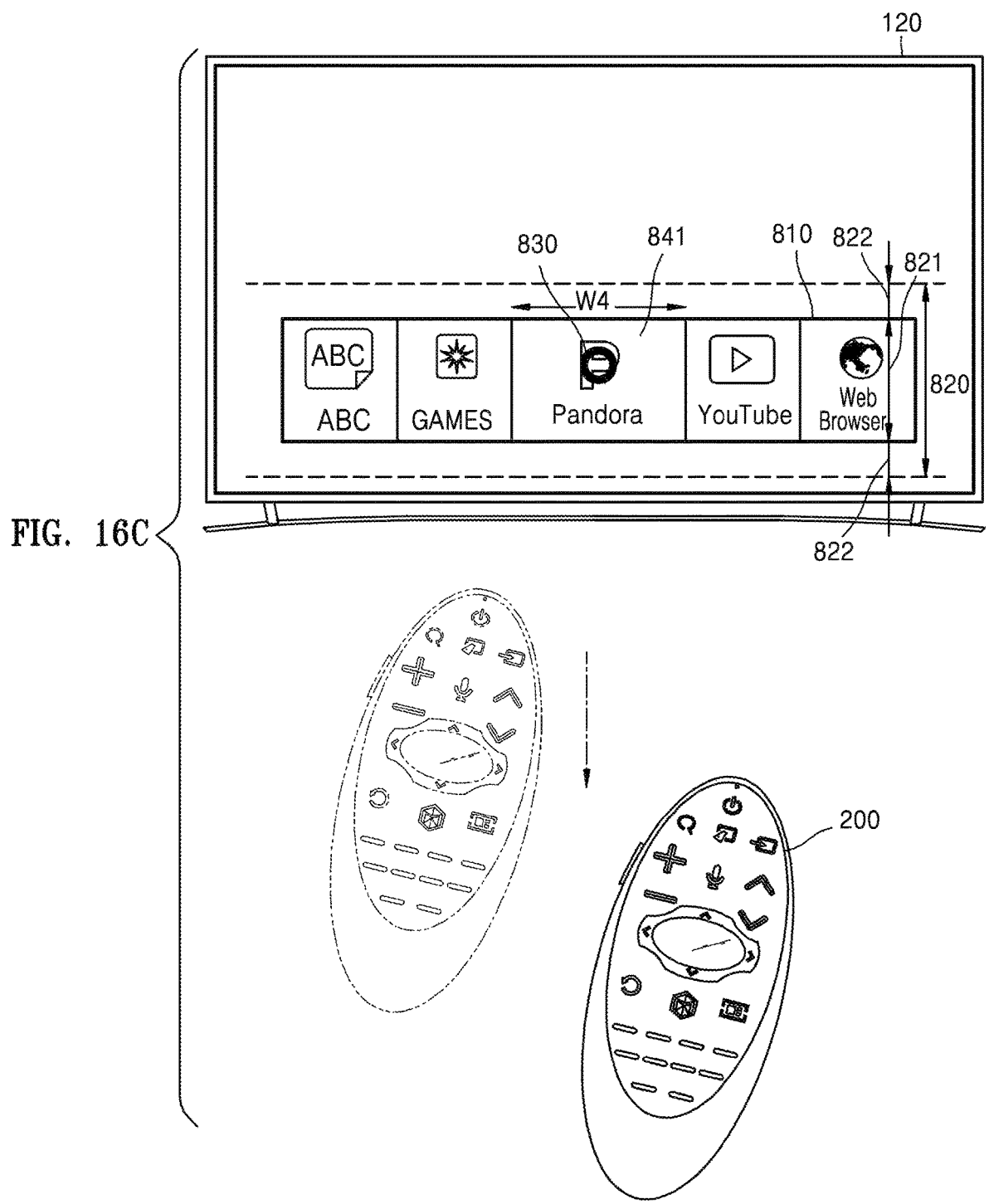

FIGS. 16A-16C illustrate an example in which, when a cursor is moved from a deactivation area to an activation area along a center line of a first item, a width of the first item is changed.

Referring to FIG. 16A, when a cursor 830 is located on a deactivation area of an item (when the second parameter r has a value of 0), the properties of the plurality of items included in the item list 810 do not change. In other words, a width W4 of a first item 841 may be a minimum width W(0).

As shown in FIG. 16B, when a user input for moving the control apparatus 200 downward is detected, the image display apparatus 100 may move the cursor 830 displayed on the display 120 downward in correspondence with the detected user input.

When the cursor 830 moves downward and is then located in the second area 822 of the activation area 820 (when the value of the second parameter r is greater than 0 and less than 1), the property of an item corresponding to the location of the cursor 830 may be changed and displayed.

For example, when the cursor 830 is located on the activation area 820, the image display apparatus 100 may determine an item corresponding to the location of the cursor 830 from among the plurality of items included in the item list 810 and change the width of the determined item.

When a plurality of items are arranged horizontally, the image display apparatus 100 may determine whether an x coordinate value representing the location of the cursor 830 is included in an x coordinate range of each of the plurality of items, and thus determine an item corresponding to the location of the cursor 830. For example, as shown in FIG. 16B, when an x coordinate value representing the location of the cursor 830 is included in an x coordinate range of an area where the first item 841 is displayed, the image display apparatus 100 may determine the first item 841 as the item corresponding to the location of the cursor 830.

The image display apparatus 100 may change the property of the first item 841 corresponding to the cursor 830. As described above with reference to FIG. 9, the width of the first item 841 is changed to w(1−abs(transH)) when considering only the first parameter transH. Thus, when both the first parameter transH and the second parameter r are considered, the width of the first item 841 may be changed to r×W(1−abs(transH)).

For example, when the cursor 830 is located on a center line of the first item 841 within the second area 822, the width W4 of the first item 841 may be a product of the maximum width W(1) and the second parameter r.

In this case, the width of the first item 841 may extend from the center line of the first item 841, and thus items located on the left side of the first item 841 may move leftward and items located on the right side of the first item 841 may move rightward.

When the cursor 830 continuously moves down and is then located on the first area 821 of the activation area 820 as shown in FIG. 16C (when the value of the second parameter r is 1), a property of the first item 841 corresponding to the location of the cursor 830 may be changed to the width w(1−abs(transH)) corresponding to when considering only the first parameter transH described above with reference to FIG. 9.

For example, when the cursor 830 is located on the center line of the first item 841 within the first area 821, the width W4 of the first item 841 may be the maximum width W(1) (=the maximum width W(1)×the second parameter r of 1).

As shown in FIGS. 16A-16C, when the cursor 830 moves from the deactivation area to the activation area 820 while having the same x coordinate value, the value of the second parameter r may increase, and thus a strain of an item property (for example, a width of an item) may increase.

FIGS. 17A-17G illustrate an example in which heights of a plurality of items are changed as a cursor moves, according to an exemplary embodiment.

Figure 17A:
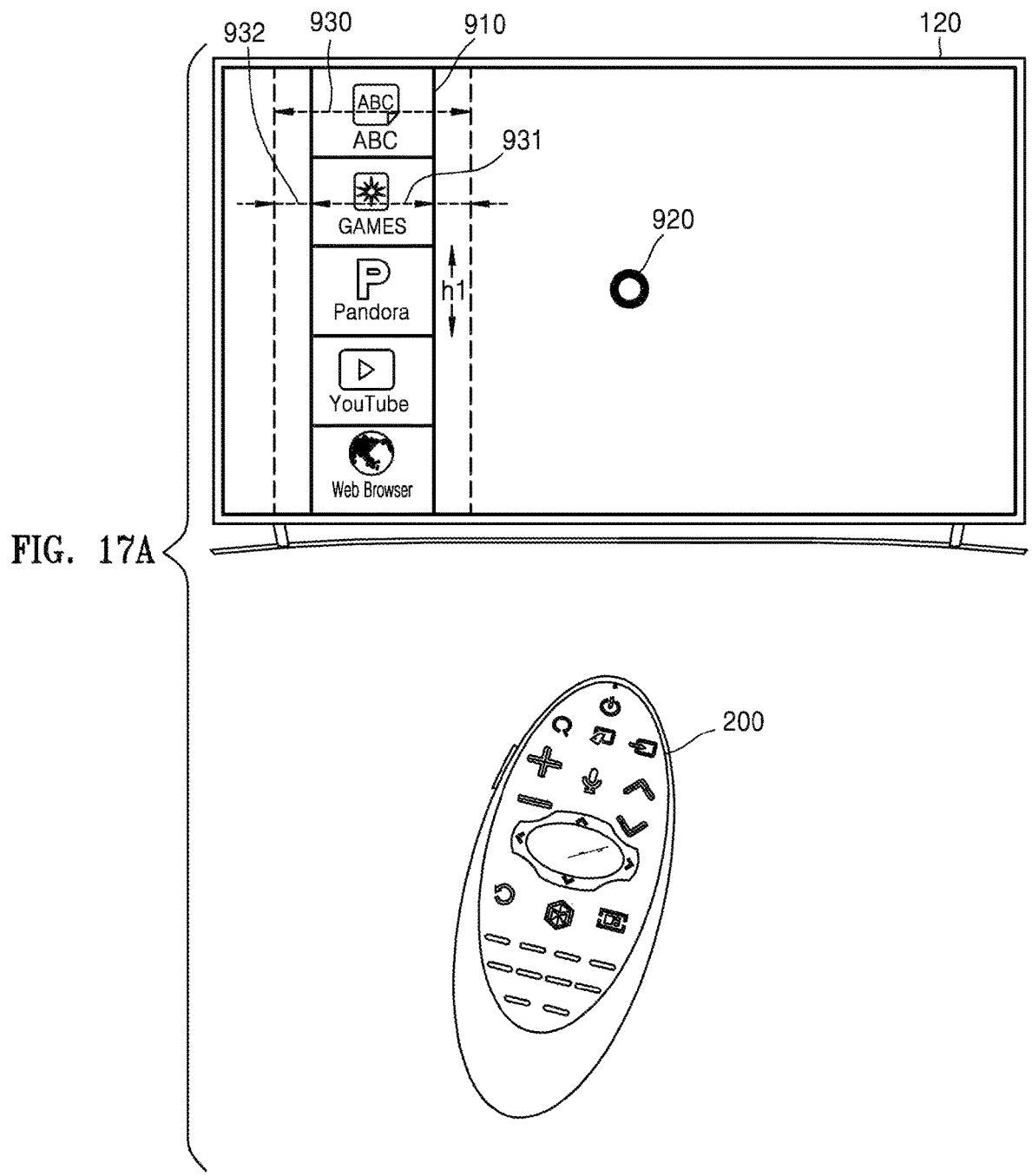

Referring to FIG. 17A, the display 120 may display an item list 910 in which a plurality of items are arranged in a vertical direction. The plurality of items may be items respectively representing pieces of content or items respectively representing external apparatus interfaces.

The display 120 may display a cursor 920 that indicates a location of a user input, and the controller 110 may move the cursor 920 on the display 120 in correspondence with a detected user input. For example, when the controller 110 receives a certain key input via the control apparatus 200, the controller 110 may display the cursor 920 on the display 120. The cursor 920 may be set to be displayed on the center of the display 120.

An activation area 930 may be set to be an area having a preset width extending from the item list 910 in a horizontal direction (y-axis direction). An area of the activation area 930 on which the item list 910 is displayed may be set to be a first area 931 and an area of the activation area 930 on which the item list 910 is not displayed may be set to be a second area 932. An area except for the activation area 930 may be set to be a deactivation area.

As shown in FIG. 17A, when the cursor 920 is located in the deactivation area, a height h1 of each of the plurality of items included in the item list 910 may be a minimum height h(0).

Figure 17B:
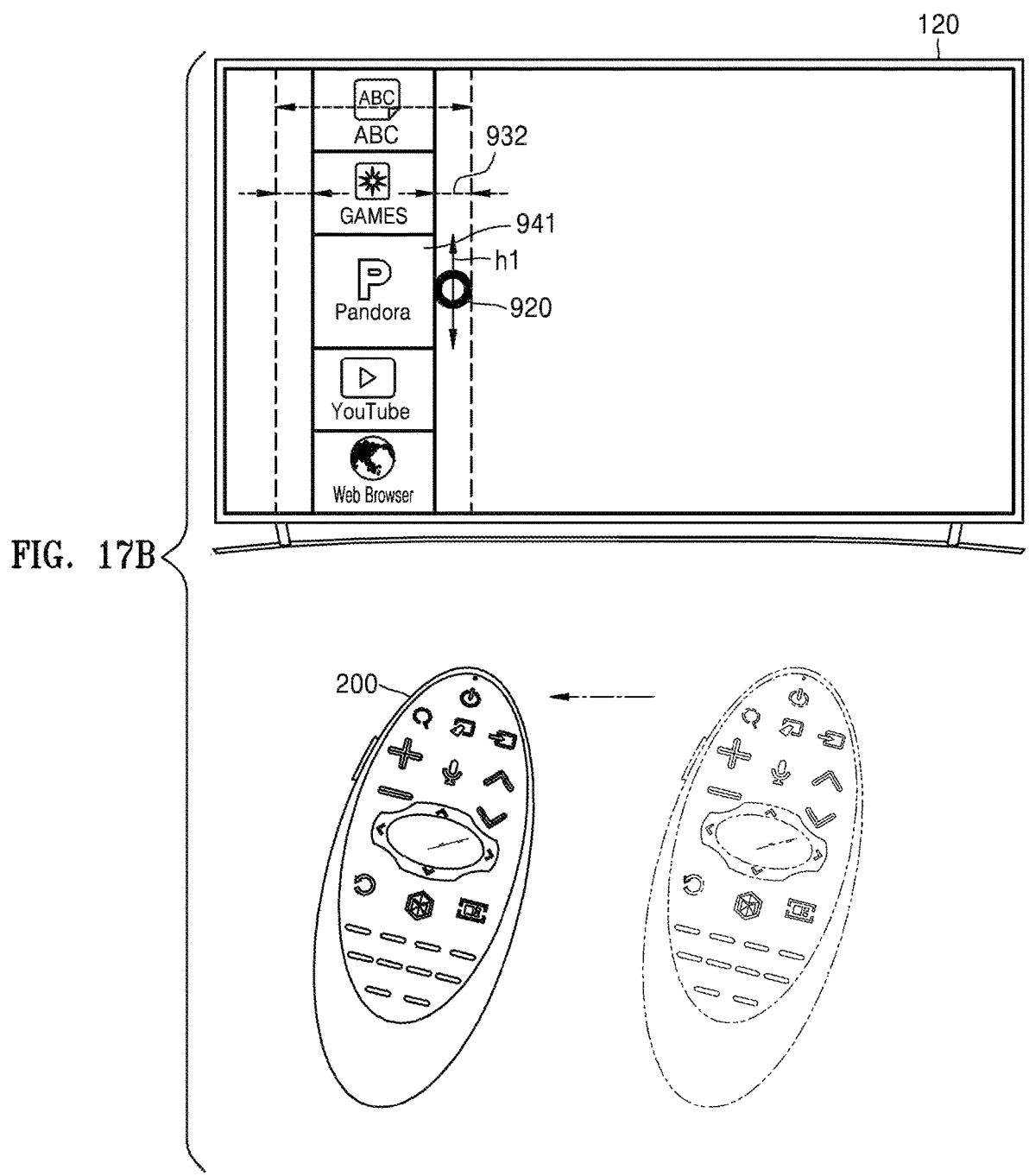

Referring to FIG. 17B, the image display apparatus 100 may move the cursor 920 leftward in correspondence with a detected user input. Accordingly, the cursor 920 is moved to the second area 932 of the activation area 930, and the height of a first item 941 corresponding to the location of the cursor 920 may increase to a height h2. In this case, the height h2 of the first item 941 may be a product of a width corresponding to when only considering the first parameter transH and the value of the second parameter r.

For example, when the cursor 920 is located on a center line of the first item 941 (for example, in the case of a vertical item list, the center line may denote a line that halves an item vertically), the height h2 of the first item 941 may be a product of the maximum height h(1) and the second parameter r. In this case, the height h2 of the first item 941 may extend from the center line of the first item 941, and thus items located above the first item 941 may move upward and items located below the first item 841 may move downward. Heights of the items other than the first item 941 may be the minimum heights h(0).

Figure 17C:
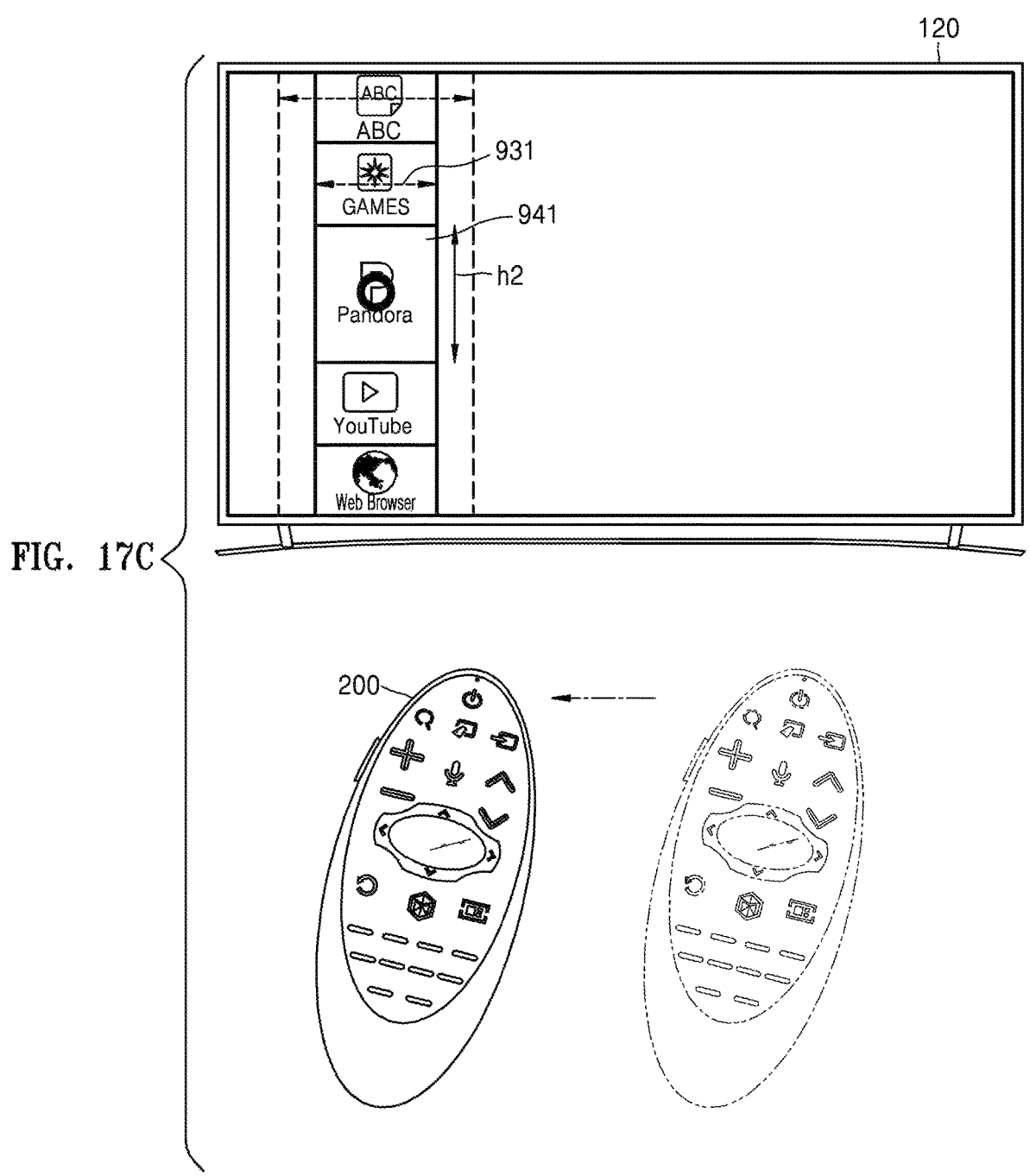

Referring to FIG. 17C, the image display apparatus 100 may move the cursor 920 leftward in correspondence with a detected user input. Accordingly, the cursor 920 may be moved to the first area 931 of the activation area 930, and the height h2 of the first item 941 corresponding to the location of the cursor 920 may increase. In this case, the height h2 of the first item 941 may increase to a height corresponding to when only considering the first parameter transH. Heights of the remaining items may be the minimum heights h(0).

For example, when the cursor 920 is located on a center line of the first item 941 within the first area 931, the height h2 of the first item 941 may increase to a maximum height h(1) (=maximum height h(1)×second parameter r of 1).

Referring to FIG. 17D, in response to a detected user input, the cursor 920 located on the center line of the first item 941 may move downward. As the cursor 920 is moved downward (as the cursor 920 is farther from the center line of the first item 941 and closer to a second item 942 located below the first item 941), the image display apparatus 100 may gradually decrease the height h2 of the first item 941 and may gradually increase a height h3 of the second item 942. In this case, a decrease degree of the height h2 of the first item 941 may be equal to an increase degree of the height h3 of the second item 942.

Figure 17E:
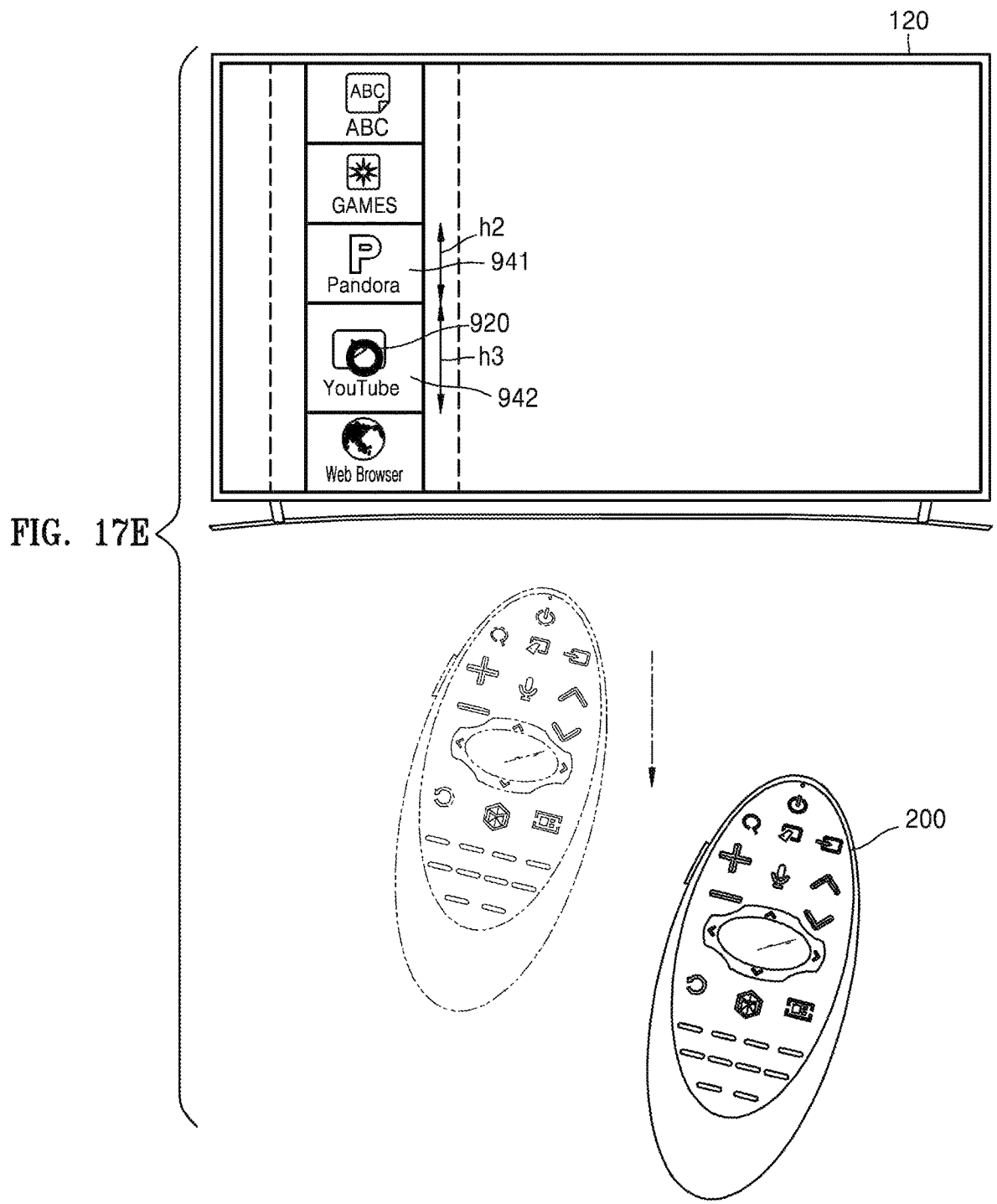

Referring to FIG. 17E, when a user input for continuously moving the control apparatus 200 downward is detected, the image display apparatus 100 may continuously move the cursor 920 displayed on the display 120 downward in correspondence with the detected user input. When the cursor 920 continuously moves downward and is then located on a center line of the second item 942 as shown in FIG. 17E, the image display apparatus 100 may change the height h3 of the second item 942 to the maximum height h(1) and change the height h2 of the first item 941 to the minimum height h(0).

Figure 17F:
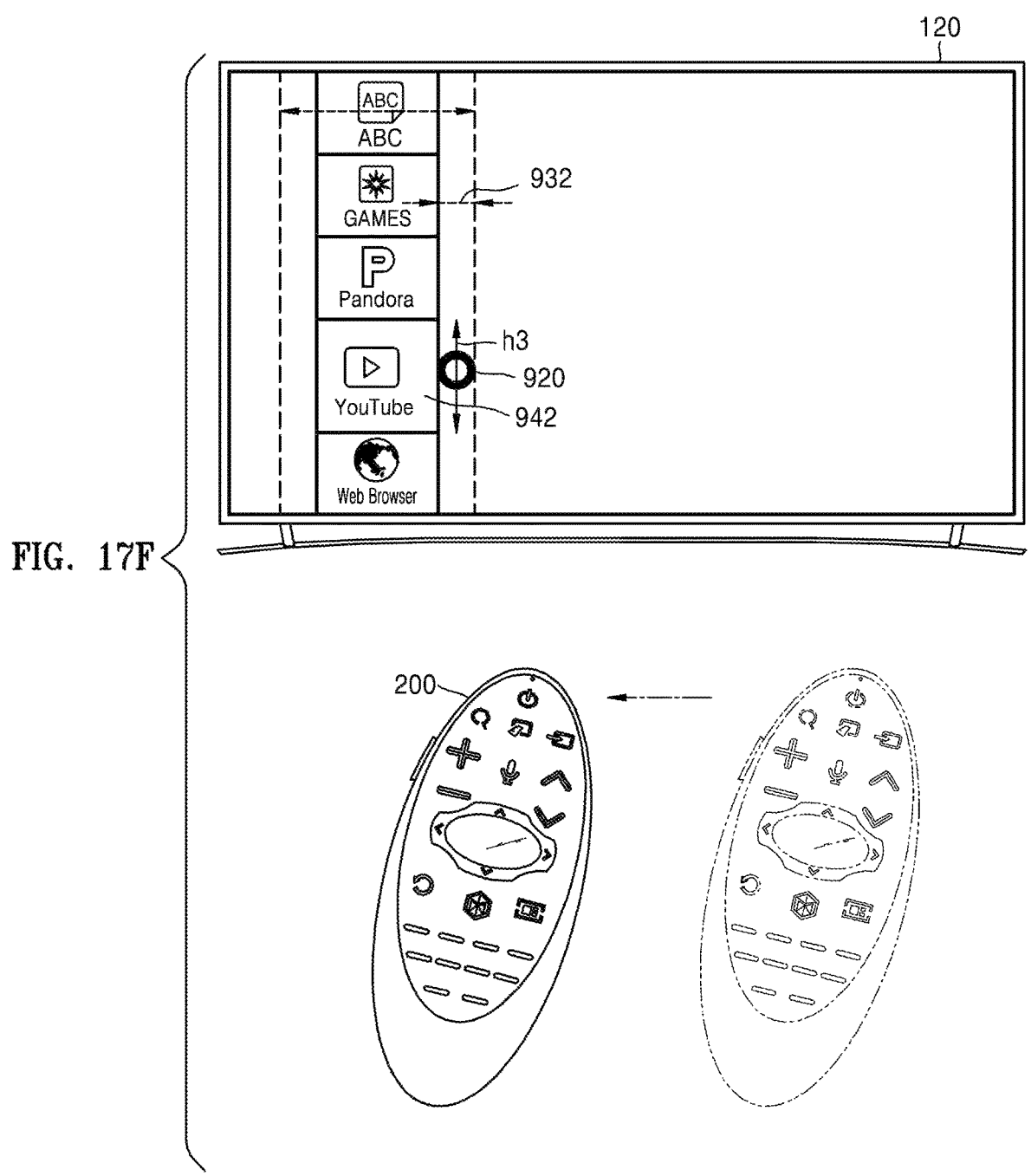

Referring to FIG. 17F, when a user input for continuously moving the control apparatus 200 rightward is detected, the image display apparatus 100 may move the cursor 920 displayed on the display 120 rightward in correspondence with the detected user input. When the cursor 920 moves rightward and is then located on the second area 932 of the activation area 930 as shown in FIG. 17F, the height h3 of the second item 942 may decrease from the maximum height h(1) to a height (maximum height h(1)×second parameter r in second area). In this case, the height h3 of the second item 942 may decrease from the center line of the second item 942, and thus items located above the second item 942 may move downward and items located below the second item 942 may move upward.

Figure 17G:
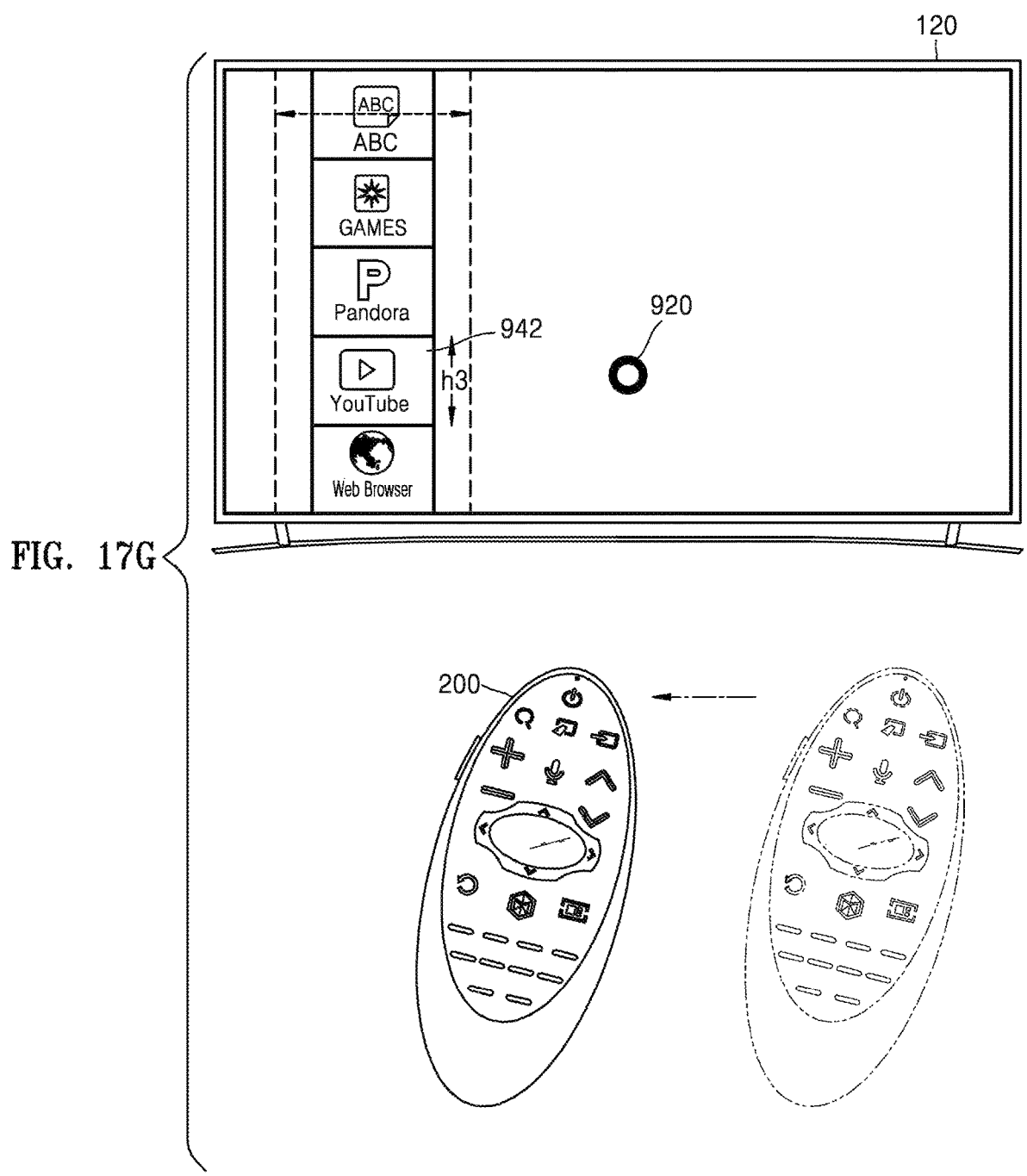

When the cursor 920 continuously moves rightward and is then located in the deactivation area as shown in FIG. 17G, the height h3 of the second item 942 may be changed to the minimum height h(0).

Figure 18:
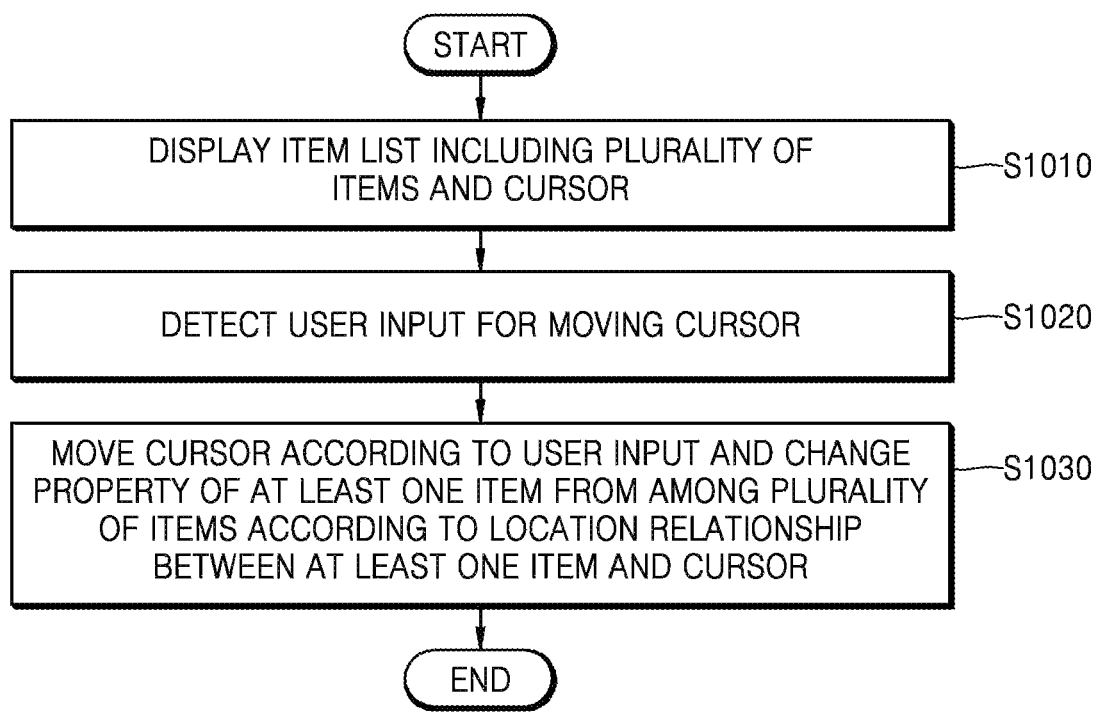
FIG. 18 is a flowchart of an image display method according to an exemplary embodiment.

FIG. 18 is a flowchart of an image display method according to an exemplary embodiment.

Referring to FIG. 18, in operation S1010, the image display apparatus 100 may display an item list including a plurality of items and a cursor that indicates a location of a user input on the display 120.

For example, the item list may include an item representing content, an item representing an interface for connecting the image display apparatus 100 to an external apparatus, or an item representing an external apparatus connected to the image display apparatus 100. The item list may be a list in which a plurality of items are arranged horizontally, or a list in which a plurality of items are arranged vertically.

When the controller 100 receives a certain key input via the control apparatus 200, the controller 110 may display a cursor on the display 120.

In operation S1020, the image display apparatus 100 may detect a user input for moving a cursor.

For example, the image display apparatus 100 may detect a user input for moving or tilting the control apparatus 200 upward, downward, leftward, or rightward.

In operation S1030, the image display apparatus 100 may move the cursor on the display 120 according to the user input and change a property of at least one item from among the plurality of items according to a location relationship between the at least one item and the cursor.

For example, the image display apparatus 100 may detect a moving direction and a moving extent of the control apparatus 200 and move the cursor on the display 120 according to a detected movement. The image display apparatus 100 may also move the cursor 520 on the display 120 according to a direction of a touch input detected by a touch panel of the control apparatus 200.

When the cursor is located in any one of the plurality of items, the item may be highlighted. The image display apparatus 100 may change a property of a highlighted item and a property of at least one selected from items that are adjacent to the highlighted item. The image display apparatus 100 may change a location, a size, a width, a height, and an image of an item, an opacity of the image thereof, and a location of content (e.g., text or an image) included in the item.

According to a location of a cursor within a highlighted item, the image display apparatus 100 may consecutively change a property of the highlighted item and properties of a plurality of items that are adjacent to the highlighted item.

Figure 19:
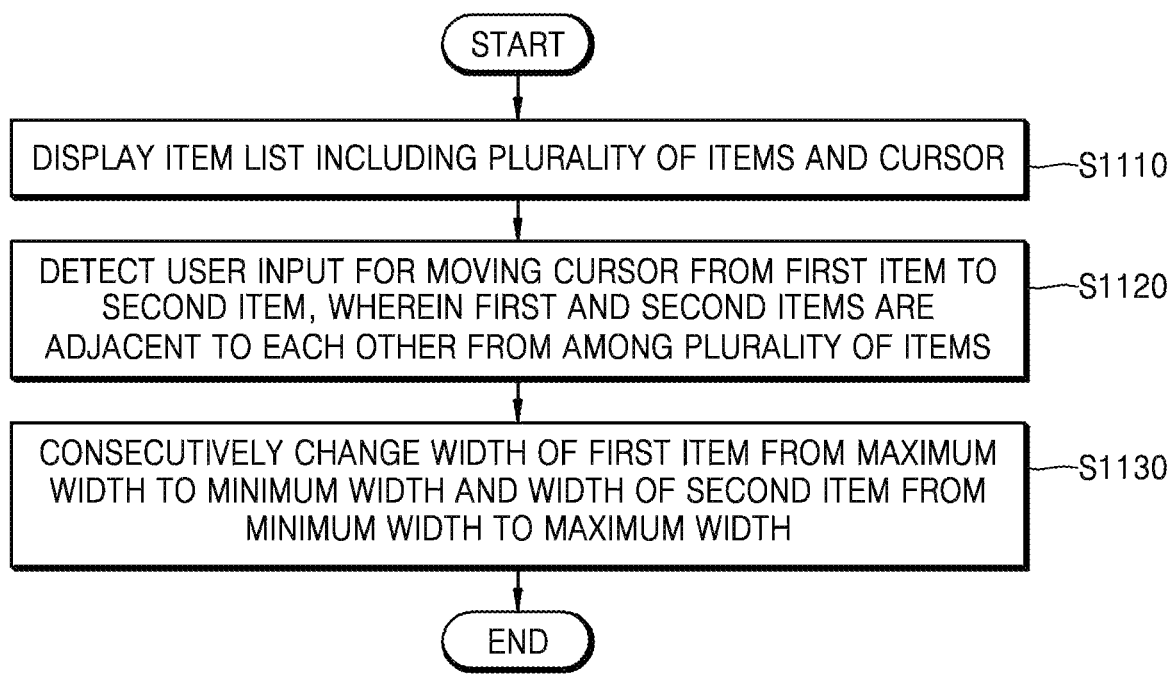
FIG. 19 is a flowchart of an image display method according to an exemplary embodiment.

FIG. 19 is a flowchart of an image display method according to an exemplary embodiment.

Referring to FIG. 19, in operation S1110, the image display apparatus 100 may display an item list including a plurality of items and a cursor that indicates a location of a user input on the display 120.

Since operation S1110 of FIG. 19 corresponds to operation S1010 of FIG. 19, a repeated description thereof will be omitted.

In operation S1120, the image display apparatus 100 may detect a user input for moving the cursor from a first item to a second item, the first and second items being adjacent to each other from among the plurality of items included in the item list.

For example, the image display apparatus 100 may detect a user input for moving the cursor from a center line of the first item to a center line of the second item.

In operation S1130, the image display apparatus 100 may consecutively change a width of the first item from a maximum width to a minimum width and a width of the second item from the minimum width to the maximum width.

For example, when the cursor is located on the center line of the first item, the image display apparatus 100 may set the width of the first item to be the maximum width. When the cursor is moved from the center line of the first item to the center line of the second item, the image display apparatus 100 may consecutively the width of the first item such that, when the cursor is located on the center line of the second item, the first item has the minimum width.

When the cursor is located on the center line of the first item, the image display apparatus 100 may set the width of the second item to be the minimum width. When the cursor is moved from the center line of the first item to the center line of the second item, the image display apparatus 100 may consecutively the width of the second item such that, when the cursor is located on the center line of the second item, the second item has the maximum width.

According to an exemplary embodiment, properties of items included in an item list are consecutively changed according to locations of a cursor, and thus cognitive fatigue of a user may be reduced.

According to an exemplary embodiment, when an item is selected from the item list by using the cursor, accuracy of the item selection may increase.

According to an exemplary embodiment, a graph showing a relationship between a first parameter and an item property is changed variously, and thus a user may be provided with various feelings.

An image display method according to an exemplary embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for exemplary embodiments or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

The exemplary embodiments should be considered in descriptive sense only and not for purposes of limitation. Descriptions of features or aspects within each exemplary embodiment should typically be considered as available for other similar features or aspects in other exemplary embodiments.

While the exemplary embodiments have been particularly shown and described with reference to exemplary embodiments thereof, it will be understood by those of ordinary skill in the art that various changes in form and details may be made therein without departing from the spirit and scope as defined by the following claims.

What is claimed is:

1. An image display method comprising:
    displaying, on a display, a plurality of items and a cursor;
    detecting a user input for moving the cursor, and
    moving the cursor based on the user input and changing a property of at least one item of the plurality of items based on a spatial relationship between the at least one item and the cursor,
    wherein the changing the property comprises changing a size of the at least one item and changing an image displayed in the at least one item, wherein the changing of the size of the at least one item comprises:
in response to moving the cursor in a first direction into a first activation area of the plurality of items, increasing the size of the at least one item from a first size to a second size,
wherein the changing of the image displayed in the at least one item comprises:
in response to moving the cursor in a second direction different from the first direction, from a first item to a second item adjacent to the first item from among the plurality of items, wherein the first item corresponds to a first port receiving an image signal from a first external apparatus and the second item corresponds to a second port receiving an image signal from a second external apparatus,
continuously changing an image displayed in the first item, from a first image based on the image signal received at the first port to a second image representing the first port according to a distance between the cursor and a center of the first item, and continuously changing an image displayed in the second item, from a third image representing the second port to a fourth image based on the image signal received at the second port according to a distance between the cursor and a center of the second item, and
wherein each of the first port and second port are one of a HDMI port, a component port, a PC port, and a USB port.

2. The image display method of claim 1, wherein the changing the property of the at least one item comprises changing a property of at least one of the first item and the second item, when the cursor is located on the first item.

3. The image display method of claim 1, wherein the changing the property of the at least one item comprises changing at least one of a size of the at least one item, a width of the at least one item, a height of the at least one item, the displayed image of the at least one item, an opacity of the displayed image of the at least one item, and a location of content included in the at least one item.

4. The image display method of claim 1, wherein the changing the property of the at least one item comprises:
when the cursor is located on a center line of the at least one item, changing a width of the at least one item to a maximum width; and
when the cursor is moved from the center line, continuously decreasing the width of the at least one item as the cursor moves farther from the center line.

5. The image display method of claim 1, wherein the changing the property of the at least one item comprises:
when the cursor is located at a center line of the first item of the plurality of items, changing a width of the first item to a maximum width,
when the cursor is moved from the center line of the first item to a center line of the second item, continuously decreasing the width of the first item as the cursor moves farther from the center line of the first item, and
when the cursor is located at the center line of the second item, changing the width of the first item to a minimum width.

6. The image display method of claim 5, wherein the changing the property of the at least one item comprises:
when the cursor is located at the center line of the first item, changing a width of the second item to the minimum width;
when the cursor is moved from the center line of the first item to the center line of the second item, continuously increasing the width of the second item as the cursor moves from the center line of the first item to the center line of the second item; and
when the cursor is located at the center line of the second item, changing the width of the second item to the maximum width.

7. The image display method of claim 1, wherein the changing the property of the at least one item comprises:
when the cursor is located on a center line of the first item, changing an opacity of the first image of the first item to a maximum value; and
when the cursor is moved from the center line of the first item, continuously decreasing the opacity of the first image as the cursor moves farther from the center line.

8. The image display method of claim 7, wherein the changing the property of the at least one item further comprises:
when the cursor is located on the center line of the first item, changing an opacity of the second image of the first item to a minimum value, and
when the cursor is moved from the center line of the at least one item, continuously increasing the opacity of the second image as the cursor moves farther from the center line.

9. The image display method of claim 1, wherein the changing of the property of the at least one item comprises:
when the cursor is located at a center line of the first item of the plurality of items, changing an opacity of the first image of the first item to a maximum value and changing an opacity of the second image of the first item to a minimum value; and
when the cursor is moved from the center line of the first item, continuously decreasing the opacity of the first image and continuously increasing the opacity of the second image as the cursor moves from the center line of the first item to a center line of the second item of the plurality of items, and
when the cursor is located on the center line of the second item, changing the opacity of the first image to the minimum value and the opacity of the second image to the maximum value.

10. The image display method of claim 9, wherein the changing the property of the at least one item further comprises:
when the cursor is located at the center line of the first item, changing an opacity of a third image to the minimum value and changing an opacity of a fourth image to the maximum value, wherein the third image and the fourth image correspond to the second item; and
when the cursor is moved from the center line of the first item, increasing the opacity of the third image and decreasing the opacity of the fourth image as the cursor moves from the center line of the first item to the center line of the second item; and
when the cursor is located on the center line of the second item, changing the opacity of the third image to the maximum value and the opacity of the fourth image to the minimum value.

11. The image display method of claim 1,
wherein the changing the property of the at least one item further comprises:
determining whether the cursor is located on the first activation area on which the plurality of items are displayed or a second activation area on which the plurality of items are not displayed; and when it is determined that the cursor is located on the first activation area, changing the at least one item to have a first property, and when it is determined that the cursor is located on the second activation area, changing the at least one item to have a second property.

12. The image display method if claim 1, wherein the changing the property of the at least one item comprises when the cursor is moved from a center line of the first item, continuously changing an opacity of at least one of the first image and the second image displayed in the first item as cursor moves farther from the center line.

13. The image display method of claim 1, wherein the first image is included in a broadcasting signal received from the first external apparatus.

14. The image display method of claim 1, wherein the first external apparatus comprises at least one from among a terrestrial broadcasting source, a cable broadcasting source, a satellite broadcasting source, and an Internet broadcasting source.

15. The image display method of claim 1, wherein the changing the image displayed in the first item, from the first image to the second image comprises changing the image displayed in the first item, from the first image to a mixture of the first image and the second image, and from the mixture of the first image and the second image to the second image, based on the spatial relationship between the first item and the cursor, and
wherein the mixture of the first image and the second image is obtained by continuously changing opacities of the first image and the second image, according to a changing distance between the first item and the cursor.

16. The image display method of claim 1, wherein the changing of the size of the at least one item further comprises:
in response to moving the cursor in the first direction into a second activation area of the plurality of items, increasing the size of the at least one item from the second size to a third size.

17. An image display apparatus comprising:
a display configured to display a plurality of items and a cursor;
a sensor configured to detect a user input for moving the cursor, and
a controller configured to control the display to move the cursor based on the user input and change a property of at least one item of the plurality of items based on a spatial relationship between the at least one item and the cursor,
wherein the controller is configured to change a size of the at least one item and change an image displayed in the at least one item,
wherein the controller is configured:
in response to moving the cursor in a first direction into a first activation area of the plurality of items, increasing the size of the at least one item from a first size to a second size,
in response to moving the cursor in a second direction different from the first direction from a first item to a second item adjacent to the first item from among the plurality of items, wherein the first item corresponds to a first port receiving an image signal from a first external apparatus and the second item corresponds to a second port receiving an image signal from a second external apparatus, continuously change an image displayed in the first item, from a first image based on the image signal received at the first port to a second image representing the first port according to a distance between the cursor and a center of the first item, and continuously change an image displayed in the second item, from a third image representing the second port to a fourth image based on the image signal received at the second port according to a distance between the cursor and a center of the second item, and
wherein each of the first port and second port are one of a HDMI port, a component port, a PC port, and a USB port.

18. The image display apparatus of claim 17, wherein the controller is configured to change a property of the first item and the second item, when the cursor is located on the first item.

19. The image display apparatus of claim 17, wherein the controller is configured to change at least one of a size of the at least one item, a width of the at least one item, a height of the at least one item, the displayed image of the at least one item, an opacity of the displayed image of the at least one item, and a location of content included in the at least one item.

20. The image display apparatus of claim 17, wherein:
when the cursor is located on a center line of the at least one item, the controller is configured to change a width of the at least one item to a maximum width; and
when the cursor is moved from the center line of the at least one item, the controller is configured to continuously decrease the width of the at least one item as the cursor moves farther from the center line.

21. The image display apparatus of claim 17, wherein:
when the cursor is located at the center line of the first item of the plurality of items, the controller is configured to change a width of the first item to a maximum width;
when the cursor is moved from the center line of the first item to a center line of the second item, the controller is configured to continuously decrease the width of the first item as the cursor moves farther from the center line of the first item; and
when the cursor is located at the center line of the second item, the controller is configured to change the width of the first item to a minimum width.

22. The image display apparatus of claim 21, wherein:
when the cursor is located at the center line of the first item, the controller is configured to change a width of the second item to the minimum width;
when the cursor is moved from the center line of the first item to the center line of the second item, the controller is configured to continuously increase the width of the second item as the cursor moves from the center line of the first item to the center line of the second item; and
when the cursor is located at the center line of the second item, the controller is configured to change the width of the second item to the maximum width.

23. The image display apparatus of claim 17, wherein:
when the cursor is located on a center line of the first item, the controller is configured to change an opacity of the first image of the first item to a maximum value; and
when the cursor is moved from the center line of the first item the controller is configured to continuously decrease the opacity of the first image as the cursor moves farther from the center line.

24. The image display apparatus of claim 23, wherein:
when the cursor is located on a center line of the first item, the controller is configured to change an opacity of the second image of the first item to a minimum value, and when the cursor is moved from the center line of the at least one item, the controller is configured to continuously increase the opacity of the second image as the cursor moves farther from the center line.

25. The image display apparatus of claim 17, wherein:
when the cursor is located at a center line of the first item of the plurality of items, the controller is configured to change an opacity of the first image of the first item to a maximum value and change an opacity of the second image of the first item to a minimum value, and
when the cursor is moved from the center line of a first item, the controller is configured to continuously decrease the opacity of the first image and continuously increase the opacity of the second image as the cursor moves from the center line of the first item to a center line of the second item; and
when the cursor is located on the center line of the second item, the controller is configured to change the opacity of the first image to the minimum value and the opacity of the second image to the maximum value.

26. The image display apparatus of claim 25, wherein:
when the cursor is located at the center line of the first item, the controller is configured to change an opacity of a third image to the minimum value and changes an opacity of a fourth image to the maximum value, wherein the third image and the fourth image correspond to the second item; and when the cursor is moved from the center line of the first item to the center line of the second item, the controller is configured to increase the opacity of the third image and decrease the opacity of the fourth image as the cursor moves from the center line of the first item to the center line of the second item; and
when the cursor is located on the center line of the second item, the controller is configured to change the opacity of the third image to the maximum value and the opacity of the fourth image to the minimum value.

27. The image display apparatus of claim 17, wherein
the controller is configured to determine whether the cursor is located on the first activation area on which the plurality of items are displayed or a second activation area on which the plurality of items are not displayed, change the at least one item to have a first property when it is determined that the cursor is located on the first activation area, and change the at least one item to have a second property when it is determined that the cursor is located on the second activation area.

28. The image display apparatus of claim 17, wherein
when the cursor is moved from a center line of the first item, the controller is configured to continuously change an opacity of at least one of the first image and the second image displayed in the first item as cursor moves farther from the center line.

* * * * *